(12) United States Patent
Harrold et al.

(10) Patent No.: US 11,747,693 B2
(45) Date of Patent: Sep. 5, 2023

(54) OPTICAL STACK FOR SWITCHABLE DIRECTIONAL DISPLAY

(71) Applicant: RealD Spark, LLC, Beverly Hills, CA (US)

(72) Inventors: Jonathan Harrold, Leamington Spa (GB); Michael G. Robinson, Boulder, CO (US); Graham J. Woodgate, Henley on Thames (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 17/352,520

(22) Filed: Jun. 21, 2021

(65) Prior Publication Data

US 2021/0382340 A1 Dec. 9, 2021

Related U.S. Application Data

(63) Continuation of application No. 16/513,223, filed on Jul. 16, 2019, now Pat. No. 11,073,735.

(60) Provisional application No. 62/700,697, filed on Jul. 19, 2018, provisional application No. 62/699,914, filed on Jul. 18, 2018.

(51) Int. Cl.
| | |
|---|---|
| *G02F 1/137* | (2006.01) |
| *G02F 1/1343* | (2006.01) |
| *G02F 1/1335* | (2006.01) |
| *G02F 1/13* | (2006.01) |

(52) U.S. Cl.
CPC ........ *G02F 1/13725* (2013.01); *G02F 1/1323* (2013.01); *G02F 1/13439* (2013.01); *G02F 1/133528* (2013.01)

(58) Field of Classification Search
CPC .............. G02F 1/13725; G02F 1/1323; G02F 1/133528; G02F 1/13439
See application file for complete search history.

(56) References Cited

U.S. PATENT DOCUMENTS

| | | |
|---|---|---|
| 3,914,022 A | 10/1975 | Kashnow |
| 4,059,916 A | 11/1977 | Tachihara et al. |

(Continued)

FOREIGN PATENT DOCUMENTS

| | | |
|---|---|---|
| CA | 2222313 A1 | 6/1998 |
| CN | 1125943 C | 10/2003 |

(Continued)

OTHER PUBLICATIONS

CN201680061632.6 Notification of the First Office Action dated Sep. 14, 2021.

(Continued)

*Primary Examiner* — James A Dudek
(74) *Attorney, Agent, or Firm* — Penny L. Lowry

(57) ABSTRACT

A privacy display comprises a spatial light modulator and a compensated switchable guest-host liquid crystal retarder arranged between first and second polarisers arranged in series with the spatial light modulator. In a privacy mode of operation, on-axis light from the spatial light modulator is directed without loss, whereas off-axis light has reduced luminance. The visibility of the display to off-axis snoopers is reduced by means of luminance reduction over a wide polar field. In a wide angle mode of operation, the switchable liquid crystal retardance is adjusted so that off-axis luminance is substantially unmodified.

49 Claims, 57 Drawing Sheets

(56) References Cited

U.S. PATENT DOCUMENTS

| | | | |
|---|---|---|---|
| 4,586,790 A * | 5/1986 | Umeda | G02F 1/133305 |
| | | | 349/158 |
| 4,621,898 A | 11/1986 | Cohen | |
| 4,974,941 A | 12/1990 | Gibbons et al. | |
| 5,005,108 A | 4/1991 | Pristash et al. | |
| 5,035,491 A | 7/1991 | Kawagishi et al. | |
| 5,126,882 A | 6/1992 | Oe et al. | |
| 5,608,550 A | 3/1997 | Epstein et al. | |
| 5,658,490 A | 8/1997 | Sharp et al. | |
| 5,671,994 A | 9/1997 | Tai et al. | |
| 5,715,028 A | 2/1998 | Abileah et al. | |
| 5,779,337 A | 7/1998 | Saito et al. | |
| 5,791,757 A | 8/1998 | O'Neil et al. | |
| 5,808,784 A | 9/1998 | Ando et al. | |
| 5,835,166 A | 11/1998 | Hall et al. | |
| 5,852,509 A | 12/1998 | Coleman | |
| 5,854,872 A | 12/1998 | Tai | |
| 5,894,361 A | 4/1999 | Yamazaki et al. | |
| 5,914,760 A | 6/1999 | Daiku | |
| 5,997,148 A | 12/1999 | Ohkawa | |
| 6,055,103 A | 4/2000 | Woodgate et al. | |
| 6,099,758 A | 8/2000 | Verrall et al. | |
| 6,144,433 A | 11/2000 | Tillin et al. | |
| 6,169,589 B1 | 1/2001 | Kaneko | |
| 6,204,904 B1 | 3/2001 | Tillin et al. | |
| 6,222,672 B1 | 4/2001 | Towler et al. | |
| 6,280,043 B1 | 8/2001 | Ohkawa | |
| 6,364,497 B1 | 4/2002 | Park et al. | |
| 6,379,016 B1 | 4/2002 | Boyd et al. | |
| 6,392,727 B1 | 5/2002 | Larson et al. | |
| 6,437,915 B2 | 8/2002 | Moseley et al. | |
| 6,731,355 B2 | 5/2004 | Miyashita | |
| 6,752,505 B2 | 6/2004 | Parker et al. | |
| 6,987,550 B2 | 1/2006 | Takato et al. | |
| 7,067,985 B2 | 6/2006 | Adachi | |
| 7,072,096 B2 | 7/2006 | Holman et al. | |
| 7,163,319 B2 | 1/2007 | Kuo et al. | |
| 7,227,602 B2 | 6/2007 | Jeon et al. | |
| 7,366,392 B2 | 4/2008 | Honma et al. | |
| 7,524,542 B2 | 4/2009 | Kim et al. | |
| 7,528,893 B2 | 5/2009 | Schultz et al. | |
| 7,528,913 B2 | 5/2009 | Kobayashi | |
| 7,633,586 B2 | 12/2009 | Winlow et al. | |
| 7,660,047 B1 | 2/2010 | Travis et al. | |
| 7,766,534 B2 | 8/2010 | Iwasaki | |
| 7,834,834 B2 | 11/2010 | Takatani et al. | |
| 7,970,246 B2 | 6/2011 | Travis et al. | |
| 7,991,257 B1 | 8/2011 | Coleman | |
| 8,070,346 B2 | 12/2011 | Maeda et al. | |
| 8,098,350 B2 | 1/2012 | Sakai et al. | |
| 8,154,686 B2 | 4/2012 | Mather et al. | |
| 8,228,476 B2 | 7/2012 | Shibazaki | |
| 8,237,876 B2 | 8/2012 | Tan et al. | |
| 8,249,408 B2 | 8/2012 | Coleman | |
| 8,262,271 B2 | 9/2012 | Tillin et al. | |
| 8,469,575 B2 | 6/2013 | Weber et al. | |
| 8,646,931 B2 | 2/2014 | Choi et al. | |
| 8,801,260 B2 | 8/2014 | Urano et al. | |
| 8,848,132 B2 | 9/2014 | O'Neill et al. | |
| 8,939,595 B2 | 1/2015 | Choi et al. | |
| 8,973,149 B2 | 3/2015 | Buck | |
| 9,195,087 B2 | 11/2015 | Terashima | |
| 9,274,260 B2 | 3/2016 | Urano et al. | |
| 9,304,241 B2 | 4/2016 | Wang et al. | |
| 9,324,234 B2 | 4/2016 | Ricci et al. | |
| 9,448,355 B2 | 9/2016 | Urano et al. | |
| 9,501,036 B2 | 11/2016 | Kang et al. | |
| 9,519,153 B2 | 12/2016 | Robinson et al. | |
| 9,541,698 B2 | 1/2017 | Wheatley et al. | |
| 9,798,169 B2 | 10/2017 | Su et al. | |
| 10,054,732 B2 | 8/2018 | Robinson et al. | |
| 10,067,726 B2 | 9/2018 | Wakamoto et al. | |
| 10,126,575 B1 | 11/2018 | Robinson et al. | |
| 10,146,093 B2 | 12/2018 | Sakai et al. | |
| 10,216,018 B2 | 2/2019 | Fang et al. | |
| 10,288,914 B2 | 5/2019 | Chung et al. | |
| 10,303,030 B2 | 5/2019 | Robinson et al. | |
| 10,401,638 B2 | 9/2019 | Robinson et al. | |
| 10,424,232 B2 | 9/2019 | Schubert et al. | |
| 10,488,705 B2 | 11/2019 | Xu et al. | |
| 10,527,775 B2 | 1/2020 | Yang et al. | |
| 10,627,670 B2 | 4/2020 | Robinson et al. | |
| 10,649,248 B1 | 5/2020 | Jiang et al. | |
| 10,649,259 B2 | 5/2020 | Lee et al. | |
| 10,712,608 B2 | 7/2020 | Robinson et al. | |
| 10,802,356 B2 | 10/2020 | Harrold et al. | |
| 10,935,714 B2 | 3/2021 | Woodgate et al. | |
| 10,948,648 B2 | 3/2021 | Ihas et al. | |
| 10,976,578 B2 | 4/2021 | Robinson et al. | |
| 11,016,341 B2 | 5/2021 | Robinson et al. | |
| 11,070,791 B2 | 7/2021 | Woodgate et al. | |
| 11,079,645 B2 | 8/2021 | Harrold et al. | |
| 11,079,646 B2 | 8/2021 | Robinson et al. | |
| 11,092,851 B2 | 8/2021 | Robinson et al. | |
| 11,099,433 B2 | 8/2021 | Robinson et al. | |
| 11,099,448 B2 | 8/2021 | Woodgate et al. | |
| 11,237,417 B2 | 2/2022 | Woodgate et al. | |
| 11,327,358 B2 | 5/2022 | Robinson et al. | |
| 11,366,358 B2 | 6/2022 | Wu et al. | |
| 11,442,316 B2 | 9/2022 | Woodgate et al. | |
| 2001/0024561 A1 | 9/2001 | Cornelissen et al. | |
| 2002/0015300 A1 | 2/2002 | Katsu et al. | |
| 2002/0024529 A1 | 2/2002 | Miller et al. | |
| 2002/0171793 A1 | 11/2002 | Sharp et al. | |
| 2003/0030764 A1 | 2/2003 | Lee | |
| 2003/0058381 A1 | 3/2003 | Shinohara et al. | |
| 2003/0089956 A1 | 5/2003 | Allen et al. | |
| 2003/0107686 A1 | 6/2003 | Sato et al. | |
| 2003/0117792 A1 | 6/2003 | Kunimochi et al. | |
| 2003/0169499 A1 | 9/2003 | Bourdelais et al. | |
| 2003/0214615 A1 | 11/2003 | Colgan et al. | |
| 2003/0222857 A1 | 12/2003 | Abileah | |
| 2004/0015729 A1 | 1/2004 | Elms et al. | |
| 2004/0100598 A1 | 5/2004 | Adachi et al. | |
| 2004/0125430 A1 | 7/2004 | Kasajima et al. | |
| 2004/0141107 A1 | 7/2004 | Jones | |
| 2004/0145703 A1 | 7/2004 | O'Connor et al. | |
| 2004/0223094 A1 | 11/2004 | Hamada et al. | |
| 2004/0240777 A1 | 12/2004 | Woodgate et al. | |
| 2004/0264910 A1 | 12/2004 | Suzuki et al. | |
| 2005/0002174 A1 | 1/2005 | Min et al. | |
| 2005/0111100 A1 | 5/2005 | Mather et al. | |
| 2005/0117186 A1 | 6/2005 | Li et al. | |
| 2005/0135116 A1 | 6/2005 | Epstein et al. | |
| 2005/0157225 A1 | 7/2005 | Toyooka et al. | |
| 2005/0190326 A1 | 9/2005 | Jeon et al. | |
| 2005/0190329 A1 | 9/2005 | Okumura | |
| 2005/0213348 A1 | 9/2005 | Parikka et al. | |
| 2005/0219693 A1 | 10/2005 | Hartkop et al. | |
| 2005/0243265 A1 | 11/2005 | Winlow et al. | |
| 2005/0259205 A1 | 11/2005 | Sharp et al. | |
| 2005/0270798 A1 | 12/2005 | Lee et al. | |
| 2006/0066785 A1 | 3/2006 | Moriya | |
| 2006/0082702 A1 | 4/2006 | Jacobs et al. | |
| 2006/0098296 A1 | 5/2006 | Woodgate et al. | |
| 2006/0146405 A1 | 7/2006 | MacMaster | |
| 2006/0203162 A1 | 9/2006 | Ito et al. | |
| 2006/0215244 A1 | 9/2006 | Yosha et al. | |
| 2006/0244884 A1 | 11/2006 | Jeon et al. | |
| 2006/0262255 A1 | 11/2006 | Wang et al. | |
| 2006/0262258 A1 | 11/2006 | Wang et al. | |
| 2006/0262558 A1 | 11/2006 | Cornelissen | |
| 2006/0268207 A1 | 11/2006 | Tan et al. | |
| 2006/0285040 A1 | 12/2006 | Kobayashi | |
| 2007/0008471 A1 | 1/2007 | Wang et al. | |
| 2007/0024970 A1 * | 2/2007 | Lub | C09K 19/60 |
| | | | 359/489.02 |
| 2007/0030240 A1 * | 2/2007 | Sumiyoshi | G02F 1/133605 |
| | | | 345/102 |
| 2007/0035964 A1 | 2/2007 | Olczak | |
| 2007/0047254 A1 | 3/2007 | Schardt et al. | |
| 2007/0064163 A1 | 3/2007 | Tan et al. | |
| 2007/0139772 A1 | 6/2007 | Wang | |
| 2007/0223251 A1 | 9/2007 | Liao | |

(56) References Cited

U.S. PATENT DOCUMENTS

| | | | |
|---|---|---|---|
| 2007/0268427 A1* | 11/2007 | Uehara | G02B 6/0038 349/86 |
| 2007/0285775 A1 | 12/2007 | Lesage et al. | |
| 2008/0008434 A1 | 1/2008 | Lee et al. | |
| 2008/0068329 A1 | 3/2008 | Shestak et al. | |
| 2008/0068862 A1 | 3/2008 | Shimura | |
| 2008/0129899 A1 | 6/2008 | Sharp | |
| 2008/0158491 A1 | 7/2008 | Zhu et al. | |
| 2008/0158912 A1 | 7/2008 | Chang et al. | |
| 2008/0205066 A1 | 8/2008 | Ohta et al. | |
| 2008/0285310 A1 | 11/2008 | Aylward et al. | |
| 2008/0316198 A1 | 12/2008 | Fukushima et al. | |
| 2009/0009894 A1 | 1/2009 | Chuang | |
| 2009/0040426 A1 | 2/2009 | Mather et al. | |
| 2009/0085894 A1 | 4/2009 | Gandhi et al. | |
| 2009/0086509 A1 | 4/2009 | Omori et al. | |
| 2009/0109381 A1 | 4/2009 | Haruyama | |
| 2009/0109703 A1 | 4/2009 | Chen et al. | |
| 2009/0128735 A1 | 5/2009 | Larson et al. | |
| 2009/0128746 A1 | 5/2009 | Kean et al. | |
| 2009/0135623 A1 | 5/2009 | Kunimochi | |
| 2009/0174843 A1 | 7/2009 | Sakai et al. | |
| 2009/0213147 A1 | 8/2009 | Sagardoyburu et al. | |
| 2009/0213298 A1 | 8/2009 | Mimura et al. | |
| 2009/0213305 A1 | 8/2009 | Ohmuro et al. | |
| 2009/0244415 A1 | 10/2009 | Ide | |
| 2010/0002296 A1 | 1/2010 | Choi et al. | |
| 2010/0014313 A1 | 1/2010 | Tillin et al. | |
| 2010/0066960 A1 | 3/2010 | Smith et al. | |
| 2010/0128200 A1 | 5/2010 | Morishita et al. | |
| 2010/0149459 A1 | 6/2010 | Yabuta et al. | |
| 2010/0177113 A1 | 7/2010 | Gay et al. | |
| 2010/0187704 A1 | 7/2010 | Hsu et al. | |
| 2010/0205667 A1 | 8/2010 | Anderson et al. | |
| 2010/0214324 A1 | 8/2010 | Broughton et al. | |
| 2010/0238376 A1 | 9/2010 | Sakai et al. | |
| 2010/0283930 A1 | 11/2010 | Park et al. | |
| 2010/0289989 A1 | 11/2010 | Adachi et al. | |
| 2010/0295755 A1 | 11/2010 | Broughton et al. | |
| 2010/0328438 A1 | 12/2010 | Ohyama et al. | |
| 2011/0018860 A1 | 1/2011 | Parry-Jones et al. | |
| 2011/0032483 A1 | 2/2011 | Hruska et al. | |
| 2011/0176089 A1 | 7/2011 | Ishikawa et al. | |
| 2011/0241573 A1 | 10/2011 | Tsai et al. | |
| 2011/0241983 A1 | 10/2011 | Chang | |
| 2011/0255304 A1 | 10/2011 | Kinoshita | |
| 2011/0286222 A1 | 11/2011 | Coleman | |
| 2011/0321143 A1 | 12/2011 | Angaluri et al. | |
| 2012/0002121 A1 | 1/2012 | Pirs et al. | |
| 2012/0020078 A1 | 1/2012 | Chang | |
| 2012/0086875 A1 | 4/2012 | Yokota | |
| 2012/0120351 A1* | 5/2012 | Kawata | G02F 1/13737 349/105 |
| 2012/0127573 A1 | 5/2012 | Robinson et al. | |
| 2012/0147026 A1 | 6/2012 | Gass et al. | |
| 2012/0147280 A1 | 6/2012 | Osterman et al. | |
| 2012/0170315 A1 | 7/2012 | Fan et al. | |
| 2012/0188792 A1 | 7/2012 | Matsumoto et al. | |
| 2012/0212414 A1 | 8/2012 | Osterhout et al. | |
| 2012/0235891 A1 | 9/2012 | Nishitani et al. | |
| 2012/0294037 A1 | 11/2012 | Holman et al. | |
| 2012/0299913 A1 | 11/2012 | Robinson et al. | |
| 2012/0314145 A1 | 12/2012 | Robinson | |
| 2012/0320311 A1 | 12/2012 | Gotou et al. | |
| 2012/0327101 A1 | 12/2012 | Blixt et al. | |
| 2013/0039062 A1 | 2/2013 | Vinther et al. | |
| 2013/0057807 A1 | 3/2013 | Goto et al. | |
| 2013/0100097 A1 | 4/2013 | Martin | |
| 2013/0107174 A1 | 5/2013 | Yun et al. | |
| 2013/0120817 A1 | 5/2013 | Yoon et al. | |
| 2013/0128165 A1 | 5/2013 | Lee et al. | |
| 2013/0242231 A1 | 9/2013 | Kurata et al. | |
| 2013/0242612 A1 | 9/2013 | Lee et al. | |
| 2013/0278544 A1 | 10/2013 | Cok | |
| 2013/0293793 A1 | 11/2013 | Lu | |
| 2013/0300985 A1 | 11/2013 | Bulda | |
| 2013/0307831 A1 | 11/2013 | Robinson et al. | |
| 2013/0308339 A1 | 11/2013 | Woodgate et al. | |
| 2013/0321340 A1 | 12/2013 | Seo et al. | |
| 2013/0328866 A1 | 12/2013 | Woodgate et al. | |
| 2014/0009508 A1 | 1/2014 | Woodgate et al. | |
| 2014/0022619 A1 | 1/2014 | Woodgate et al. | |
| 2014/0071382 A1 | 3/2014 | Scardato | |
| 2014/0098418 A1 | 4/2014 | Lin | |
| 2014/0098558 A1 | 4/2014 | Vasylyev | |
| 2014/0104147 A1 | 4/2014 | Nakahara et al. | |
| 2014/0111760 A1 | 4/2014 | Guo et al. | |
| 2014/0132887 A1 | 5/2014 | Kurata | |
| 2014/0133181 A1 | 5/2014 | Ishida et al. | |
| 2014/0140091 A1 | 5/2014 | Vasylyev | |
| 2014/0140095 A1 | 5/2014 | Yuki et al. | |
| 2014/0176873 A1 | 6/2014 | Shinohara et al. | |
| 2014/0185322 A1 | 7/2014 | Liao | |
| 2014/0201844 A1 | 7/2014 | Buck | |
| 2014/0211125 A1 | 7/2014 | Kurata | |
| 2014/0232836 A1 | 8/2014 | Woodgate et al. | |
| 2014/0232960 A1 | 8/2014 | Schwartz et al. | |
| 2014/0240344 A1 | 8/2014 | Tomono et al. | |
| 2014/0240828 A1 | 8/2014 | Robinson et al. | |
| 2014/0240839 A1 | 8/2014 | Yang et al. | |
| 2014/0268358 A1 | 9/2014 | Kusaka et al. | |
| 2014/0286043 A1 | 9/2014 | Sykora et al. | |
| 2014/0286044 A1 | 9/2014 | Johnson et al. | |
| 2014/0289835 A1 | 9/2014 | Varshavsky et al. | |
| 2014/0340728 A1 | 11/2014 | Taheri | |
| 2014/0361990 A1 | 12/2014 | Leister | |
| 2014/0367873 A1 | 12/2014 | Yang et al. | |
| 2015/0035872 A1 | 2/2015 | Shima et al. | |
| 2015/0055366 A1 | 2/2015 | Chang et al. | |
| 2015/0116212 A1 | 4/2015 | Freed et al. | |
| 2015/0177447 A1 | 6/2015 | Woodgate et al. | |
| 2015/0177563 A1 | 6/2015 | Cho et al. | |
| 2015/0185398 A1 | 7/2015 | Chang et al. | |
| 2015/0205157 A1 | 7/2015 | Sakai et al. | |
| 2015/0268479 A1 | 9/2015 | Woodgate et al. | |
| 2015/0286061 A1 | 10/2015 | Seo et al. | |
| 2015/0286817 A1 | 10/2015 | Haddad et al. | |
| 2015/0293273 A1 | 10/2015 | Chen et al. | |
| 2015/0293289 A1 | 10/2015 | Shinohara et al. | |
| 2015/0301400 A1 | 10/2015 | Kimura et al. | |
| 2015/0338564 A1 | 11/2015 | Zhang et al. | |
| 2015/0346417 A1 | 12/2015 | Powell | |
| 2015/0346532 A1 | 12/2015 | Do et al. | |
| 2015/0355490 A1 | 12/2015 | Kao et al. | |
| 2015/0378085 A1 | 12/2015 | Robinson et al. | |
| 2016/0054508 A1 | 2/2016 | Hirayama et al. | |
| 2016/0103264 A1 | 4/2016 | Lee et al. | |
| 2016/0132721 A1 | 5/2016 | Bostick et al. | |
| 2016/0147074 A1 | 5/2016 | Kobayashi et al. | |
| 2016/0154259 A1 | 6/2016 | Kim et al. | |
| 2016/0216420 A1 | 7/2016 | Gaides et al. | |
| 2016/0216540 A1 | 7/2016 | Cho et al. | |
| 2016/0224106 A1 | 8/2016 | Liu | |
| 2016/0238869 A1* | 8/2016 | Osterman | G02B 13/0075 |
| 2016/0259115 A1 | 9/2016 | Kitano et al. | |
| 2016/0291358 A1 | 10/2016 | Kikuchi et al. | |
| 2016/0334898 A1 | 11/2016 | Kwak et al. | |
| 2016/0349444 A1 | 12/2016 | Robinson et al. | |
| 2016/0356943 A1 | 12/2016 | Choi et al. | |
| 2016/0357046 A1 | 12/2016 | Choi et al. | |
| 2017/0003436 A1 | 1/2017 | Inoue et al. | |
| 2017/0031206 A1 | 2/2017 | Smith et al. | |
| 2017/0085869 A1 | 3/2017 | Choi et al. | |
| 2017/0090103 A1 | 3/2017 | Holman | |
| 2017/0090237 A1* | 3/2017 | Kim | H10K 59/50 |
| 2017/0092187 A1 | 3/2017 | Bergquist | |
| 2017/0092229 A1 | 3/2017 | Greenebaum et al. | |
| 2017/0115485 A1 | 4/2017 | Saito et al. | |
| 2017/0123241 A1 | 5/2017 | Su et al. | |
| 2017/0139110 A1 | 5/2017 | Woodgate et al. | |
| 2017/0168633 A1 | 6/2017 | Kwak et al. | |
| 2017/0205558 A1 | 7/2017 | Hirayama et al. | |
| 2017/0236494 A1 | 8/2017 | Sommerlade et al. | |
| 2017/0269283 A1 | 9/2017 | Wang et al. | |

(56) References Cited

U.S. PATENT DOCUMENTS

| | | |
|---|---|---|
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1* | 7/2018 | Xu .................. G02F 1/1393 |
| 2018/0188603 A1 | 7/2018 | Fang et al. |
| 2018/0196275 A1 | 7/2018 | Robinson et al. |
| 2018/0210243 A1* | 7/2018 | Fang .................. G02F 1/137 |
| 2018/0210253 A1* | 7/2018 | Kashima .......... G02F 1/1334 |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101454712 A | 6/2009 |
| CN | 101518095 A | 8/2009 |
| CN | 101681061 A | 3/2010 |
| CN | 103473494 A | 12/2013 |
| CN | 103688211 A | 3/2014 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 105842909 A | 8/2016 |
| CN | 106104372 A | 11/2016 |
| CN | 106415342 A | 2/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H11174489 A | 7/1999 |
| JP | 2005316470 A | 11/2005 |
| JP | 2005345799 A | 12/2005 |
| JP | 2006139160 A | 6/2006 |
| JP | 2007501966 A | 2/2007 |
| JP | 2007148279 A | 6/2007 |
| JP | 2007273288 A | 10/2007 |
| JP | 2009020293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018035492 A1 | 2/2018 |
| WO | 2018178790 A1 | 10/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

CN201880073578.6 Notification of the First Office Action dated Aug. 27, 2021.

EP-19743619.9 Extended European Search of European Patent Office dated Nov. 23, 2021.

EP-19743701.5 Extended European Search Report of European Patent Office dated Nov. 24, 2021.

EP19771688.9 Extended European Search Report of European Patent Office dated Dec. 2, 2021.

PCT/US2021/043435 International search report and written opinion of the international searching authority dated Nov. 1, 2021.

PCT/US2021/043444 International search report and written opinion of the international searching authority dated Nov. 1, 2021.

Adachi, et al. "P-228L: Late-News Poster: Controllable Viewing-Angle Displays using a Hybrid Aligned Nematic Liquid Crystal Cell", ISSN, SID 2006 Digest, pp. 705-708.

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

(56) References Cited

OTHER PUBLICATIONS

Cheng, et al., "Fast-Response Liquid Crystal Variable Optical Retarder and Multilevel Attenuator," Optical Engineerinc 52 (10), 107105 (Oct. 16, 2013). (Year: 2013).
CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
CN-201980020303.0—Notification of the First Office Action dated Dec. 16, 2021.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
CN-201880042320.X Notification of the Third Office Action from the Chinese Patent Office dated Dec. 30, 2022.
CN-201980082757.0 Notification of the 1st Office Action of the Chinese Patent Office dated Dec. 5, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
PCT/US2022/045030 International search report and written opinion of the international searching authority dated Jan. 3, 2023.
EP-20754927.0 Extended European Search Report of European Patent Office dated Sep. 19, 2022.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books LTD, London, 1970.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection dated Feb. 17, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
EP-20835231.0 Extended European Search Report of European Patent Office dated May 15, 2023.
PCT/US2023/012240 International search report and written opinion of the international searching authority dated Apr. 27, 2023.
PCT/US2023/012243 International search report and written opinion of the international searching authority dated May 10, 2023.

\* cited by examiner

OPTICAL STACK FOR SWITCHABLE DIRECTIONAL DISPLAY

TECHNICAL FIELD

This disclosure generally relates to illumination from light modulation devices, and more specifically relates to switchable optical stacks for providing control of illumination for use in a display including a privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

BRIEF SUMMARY

According to a first aspect of the present disclosure there is provided a display device comprising: a spatial light modulator comprising a layer of addressable pixels; a display polariser arranged on a side of the spatial light modulator; the display polariser being a linear polariser; and a guest-host liquid crystal retarder comprising a liquid crystal layer comprising a guest material and a host material; wherein the guest material is an anisotropic material and the host material is a liquid crystal material; the gust-host liquid crystal retarder being arranged on the same side of the spatial light modulator as the display polariser with the display polariser arranged between the guest-host liquid crystal retarder and the spatial light modulator; wherein the optical axis of the guest-host liquid crystal retarder has an alignment component perpendicular to the plane of the guest-host liquid crystal retarder in at least a state of the host material. Advantageously a display may be provided with a privacy function.

The anisotropic material may be an anisotropic absorber. The anisotropic absorber may be a dichroic dye or a pleochroic dye and the anisotropic material may be a dichroic dye or a pleochroic dye. Advantageously a low stray light display may be provided, and off-axis luminance may be reduced for a privacy display.

The anisotropic material may comprise metallic nanomaterial such as silver nanowires. The metallic nanomaterial may comprise a transparent electrically insulating surface layer. The insulating surface layer may be coating or may be formed chemically such as a transparent oxide for example. Advantageously off-axis ambient light may be reflected to provide reduced image contrast to an off-axis observer and increase the privacy effect. In a backlight, off-axis light may be recirculated into the backlight, increasing efficiency.

The guest material may comprise less than 3%, preferably less than 2% and most preferably less than 1% of the host material by volume. Alternatively, the guest material may comprise less than 3%, preferably less than 2% and most preferably less than 1% of the host material by weight. Advantageously when the guest material is a solid the relative proportions may be more conveniently measured. The guest material may comprise a positive dichroic dye material or a positive pleochroic dye material and the optical axis of the guest-host liquid crystal layer has an alignment component in the plane of the guest-host liquid crystal layer that is orthogonal to the electric vector transmission direction of the display polariser. The on-axis extinction coefficient of the guest-host liquid retarder in at least one state of the host material in a mode of operation may be at least 60%, preferably at least 80% and most preferably at least 90%.

The display device may further comprise at least one passive retarder arranged between the display polariser and the guest-host liquid crystal retarder. Advantageously the field of view of a privacy display may be reduced.

The guest material may comprise liquid crystal material that is cured. Advantageously cost and thickness may be reduced.

The display device may further comprise an additional polariser; that is a linear polariser and is arranged on the same side of the spatial light modulator as the display polariser with the guest-host liquid crystal retarder arranged between the display polariser and the additional polariser. The display polariser and the additional polariser may have electric vector transmission directions that are parallel. The display device may further comprise at least one passive retarder arranged between the guest-host liquid crystal layer and the additional polariser. Advantageously the field of view of a privacy display may be reduced.

The guest-host liquid crystal retarder may comprise a switchable liquid crystal retarder further comprising transparent electrodes arranged to apply a voltage capable of switching host material between at least two states, in one of which states the optical axis of the guest-host liquid crystal retarder has an alignment component perpendicular to the plane of the guest-host liquid crystal retarder. The electrodes may be on opposite sides of the layer of liquid crystal layer. The display device may further comprise a control system arranged to control the voltage applied across the electrodes of the at least one switchable liquid crystal retarder.

The switchable liquid crystal retarder may comprise two surface alignment layers disposed adjacent to the layer liquid crystal material and on opposite sides thereof and each arranged to provide homeotropic alignment in the adjacent liquid crystal material. By the application of an electric field, advantageously a display may be switched between a low stray light display mode such as a privacy mode to a wide angle mode for multiple display users and increased image uniformity. In that case, the following features may be present.

The host material may be a liquid crystal material with a negative dielectric anisotropy.

The liquid crystal layer may have a retardance for light of a wavelength of 550 nm in a range from 500 nm to 1000 nm, preferably in a range from 600 nm to 900 nm and most preferably in a range from 700 nm to 850 nm.

The at least one passive retarder may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm. Alternatively, the at least one passive retarder may comprise a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm. Advantageously low voltage operation may be provided in a wide angle mode of operation, reducing power consumption.

The switchable liquid crystal retarder may comprise two surface alignment layers disposed adjacent to the layer of liquid crystal material and on opposite sides thereof and each arranged to provide homogeneous alignment in the adjacent liquid crystal material. In that case, the following features may be present.

The layer of liquid crystal material of the switchable liquid crystal retarder may comprise a liquid crystal material with a positive dielectric anisotropy.

The layer of liquid crystal material may have a retardance for light of a wavelength of 550 nm in a range from 500 nm to 1000 nm, preferably in a range from 600 nm to 850 nm and most preferably in a range from 700 nm to 800 nm.

The at least one passive compensation retarder may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm. Alternatively, the at least one passive compensation retarder may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm. Advantageously the visibility of material flow may be reduced.

The switchable liquid crystal retarder may comprise two surface alignment layers disposed adjacent to the layer of liquid crystal material and on opposite sides thereof, one of the surface alignment layers being arranged to provide homeotropic alignment in the adjacent liquid crystal material and the other of the surface alignment layers being arranged to provide homogeneous alignment in the adjacent liquid crystal material. In that case, the following features may be present.

The surface alignment layer may be arranged to provide homogeneous alignment is between the layer of liquid crystal material and the compensation retarder.

The layer of liquid crystal material may have a retardance for light of a wavelength of 550 nm in a range from 700 nm to 2000 nm, preferably in a range from 1000 nm to 1500 nm and most preferably in a range from 1200 nm to 1500 nm.

The at least one passive compensation retarder may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm. Alternatively, the at least one passive compensation retarder may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

Each alignment layer may have a pretilt having a pretilt direction with a component in the plane of the liquid crystal layer that is parallel or anti-parallel or orthogonal to the electric vector transmission direction of the display polariser. The display device may further comprise: an additional polariser arranged on the same side of the spatial light modulator as the display polariser; and plural retarders arranged between the additional polariser and the display polariser, wherein the plural retarders comprise: a switchable liquid crystal retarder comprising a layer of liquid crystal material; and at least one passive compensation retarder.

The at least one passive retarder may be arranged to introduce no phase shift to polarisation components of light passed by the one of the display polariser and the additional polariser on the input side of the plural retarders along an axis along a normal to the plane of the at least one passive compensation retarder. The at least one passive retarder may be arranged to introduce a phase shift to polarisation components of light passed by the one of the display polariser and the additional polariser on the input side of the plural retarders along an axis inclined to a normal to the plane of the at least one passive compensation retarder.

The guest-host liquid crystal retarder may be arranged to introduce no phase shift to polarisation components of light passed by the one of the display polariser and the additional polariser on the input side of the plural retarders along an axis along a normal to the plane of the guest-host liquid crystal retarder.

The guest-host liquid crystal retarder may be arranged to introduce a phase shift to polarisation components of light passed by the one of the display polariser and the additional polariser on the input side of the plural retarders along an axis inclined to a normal to the plane of the switchable liquid crystal retarder in at least a state of the guest-host liquid crystal retarder.

The guest-host liquid crystal retarder may be arranged to not affect the luminance of light passing through the display polariser and the guest-host liquid crystal retarder along an axis along a normal to the plane of the guest-host liquid crystal retarder. The guest-host liquid crystal retarder may be arranged to reduce the luminance of light passing through the display polariser and the guest-host liquid crystal retarder along an axis inclined to a normal to the plane of the retarders.

The display device may further comprise at least one further retarder and a further additional polariser, wherein the at least one further retarder is arranged between the first-mentioned additional polariser and the further additional polariser.

The display device may further comprise a backlight arranged to output light, wherein the spatial light modulator is a transmissive spatial light modulator arranged to receive output light from the backlight.

The backlight may provide a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator. Advantageously a low luminance off-axis image may be seen in privacy mode.

The backlight may comprise: an array of light sources; a directional waveguide comprising: an input end extending in a lateral direction along a side of the directional waveguide, the light sources being disposed along the input end and arranged to input input light into the waveguide; and opposed first and second guide surfaces extending across the directional waveguide from the input end for guiding light input at the input end along the waveguide, the waveguide being arranged to deflect input light guided through the directional waveguide to exit through the first guide surface. The backlight may further comprise a light turning film and the directional waveguide is a collimating waveguide. The collimating waveguide may comprise (i) a plurality of elongate lenticular elements; and (ii) a plurality of inclined light extraction features, wherein the plurality of elongate lenticular elements and the plurality of inclined light extraction features are oriented to deflect input light guided through the directional waveguide to exit through the first guide surface.

The directional waveguide may be an imaging waveguide arranged to image the light sources in the lateral direction so that the output light from the light sources is directed into respective optical windows in output directions that are distributed in dependence on the input positions of the light sources.

The imaging waveguide may comprise a reflective end for reflecting the input light back along the imaging waveguide, wherein the second guide surface is arranged to deflect the reflected input light through the first guide surface as output light, the second guide surface comprises light extraction features and intermediate regions between the light extraction features, the light extraction features being oriented to deflect the reflected input light through the first guide surface as output light and the intermediate regions being arranged to direct light through the waveguide without extracting it; and the reflective end has positive optical power in the lateral direction extending between sides of the waveguide that extend between the first and second guide surfaces.

The display polariser may be an input display polariser arranged on the input side of the spatial light modulator between the backlight and the spatial light modulator, and the guest-host liquid crystal retarder may be arranged between the input display polariser and the backlight. The additional polariser may be a reflective polariser. The display device may further comprise an output polariser arranged on the output side of the spatial light modulator.

The display polariser may be an output polariser arranged on the output side of the spatial light modulator. The display device may further comprise an input polariser arranged on the input side of the spatial light modulator. The display device may further comprise a further additional polariser arranged on the input side of the spatial light modulator and at least one further retarder arranged between the at least one further additional polariser and the input polariser.

The spatial light modulator may comprise an emissive spatial light modulator arranged to output light and the display polariser may be an output display polariser arranged on the output side of the emissive spatial light modulator.

The display device may further comprise at least one further retarder and a further additional polariser, wherein the at least one further retarder may be arranged between the first-mentioned additional polariser and the further additional polariser.

The various features and alternatives set out above with respect to the first aspect of the present disclosure may similarly be applied to the second aspect of the present disclosure.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
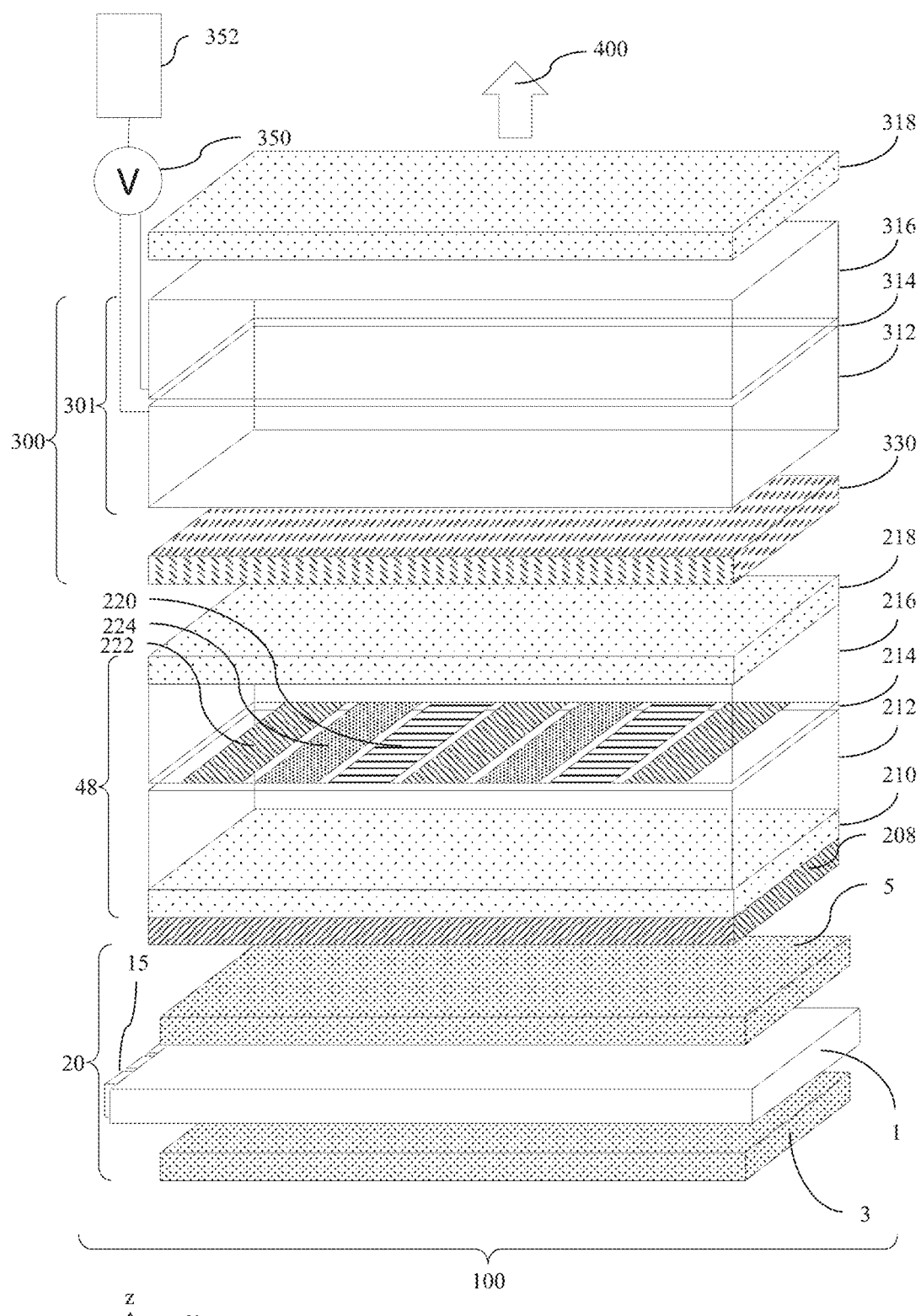
FIG. 1A is a schematic diagram illustrating in side perspective view an optical stack of a directional display device comprising a front switchable guest-host liquid crystal retarder and an additional polariser.

Terms related to optical retarders for the purposes of the present disclosure will now be described.

In a layer comprising a uniaxial birefringent material there is a direction governing the optical anisotropy whereas all directions perpendicular to it (or at a given angle to it) are optically equivalent.

Optical axis refers to the direction of propagation of an unpolarised light ray in the uniaxial birefringent material in which no birefringence is experienced by the ray. For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive optical anisotropy uniaxial birefringent materials the slow axis direction is the extraordinary axis of the birefringent material. For negative optical anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 450 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \quad \text{eqn. 1}$$

In eqn. 1, $\Delta n$ is defined as the difference between the extraordinary and the ordinary index of refraction, i.e.

$$\Delta n = n_e - n_o \quad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer. The plane of the retarders refers to the slow axis of the retarders extend in a plane, that is the x-y plane.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

In the present disclosure an 'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with an retardance $\Delta n \cdot d$ that varies with wavelength $\lambda$ as $$\Delta n \cdot d / \lambda = \kappa \quad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, in the context of liquid crystal orientation, state refers to the orientation of the liquid crystal director at a particular applied voltage i.e. a voltage applied state. The state may be the zero voltage applied state.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

A dichroic material has different absorption coefficients for light polarized in different directions. A pleochroic material absorbs different wavelengths of light differently depending on the direction of incidence of the rays or their plane of polarization, often resulting in the appearance of different colours according to the direction of view.

Guest-host liquid crystal materials comprise a liquid crystal host material and a guest material comprising an anisotropic absorbing dye. The liquid crystal host material has a director direction that represents the direction of the preferred orientation of molecules in the neighbourhood of any point. By way of comparison with the present embodiments, in the standard type of guest host display, linearly polarized input light is absorbed by the dye molecules which are homogeneously aligned with the polarizer transmission direction resulting in a black display state to the head-on viewer. When an electric field is applied to the guest host liquid crystal cell, the liquid crystal host re-orientation causes the dye guest to reorient with it so that it is parallel to the applied electric field and so the input polarized light passes substantially without attenuation resulting in a white display state to the head-on viewer. In both cases the off-axis viewer sees the same display state as the head-on viewer.

This is completely different from the guest host configuration used in this specification where the head-on display brightness state of the guest host system is substantially unchanged by the application of the electric field and only the off-axis viewing properties are altered.

When the liquid crystal host re-orients as described above there is a change in the retardance imparted to input light that arises from the optical anisotropy of the liquid crystal molecules. In some (but not all) embodiments of a guest host system described herein the main operating effect is the re-orientation of the light absorbing dye molecules and the retardance effect may be small so that only a negligible retardance is imparted to input light in the visible wavelengths. This means liquid crystal host materials with low optical anisotropy may be used.

In positive dichroic and pleochroic guest-host materials the major absorption axis of the dichroic material aligns with the liquid crystal host director direction. In negative dichroic and pleochroic guest-host materials the major absorption axis aligns perpendicular to the liquid crystal host director direction.

The present description typically refer to positive dichroic dye materials, however pleochroic and negative dichroic and pleochroic materials may also be used in the present embodiments as will be further described.

The order parameter is used to describe the ordering of a liquid crystal and for liquid crystals in the nematic phase is typically less than 0.8, where an order parameter of 1 is for a perfectly aligned arrangement of liquid crystal molecules and an order parameter of 0 is for an isotropic arrangement.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

Optical isolation retarders provided between the display polariser and an OLED display emission layer are described further in U.S. Pat. No. 7,067,985. Optical isolation retarders are in a different place to the passive retarders of the present embodiments. Isolation retarder reduces frontal reflections of ambient light from the OLED display emission layer which is a different effect to the luminance reduction of emitted light for off-axis viewing positions of the present embodiments.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

FIG. 1A is a schematic diagram illustrating in side perspective view an optical stack of a display device.

Display device 100 comprises a spatial light modulator 48 comprising at least one display polariser, that is the output polariser 218. The output polariser 218 is a linear polariser. Backlight 20 is arranged to output light and the spatial light modulator 48 comprises a transmissive spatial light modulator 48 arranged to receive output light from the backlight 20. The display device 100 is arranged to output light 400 with angular luminance properties as will be described herein.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. The input display polariser 210 and the output display polariser 218 are each linear polarisers. Typical polarisers 210, 218 may be linear absorbing polarisers such as stretched PVA iodine based polarisers between TAC layers.

Optionally a reflective polariser 208 may be provided between the dichroic input display polariser 210 and backlight 210 to provide recirculated light and increase display efficiency. Advantageously efficiency may be increased.

Backlight 20 may comprise input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

In the present embodiments, the backlight 20 may be arranged to provide an angular light distribution that has reduced luminance for off-axis viewing positions in comparison to head-on luminance as will be described in FIGS. 26A to 28C below. Backlight 20 may further comprise a switchable backlight arranged to switch the output angular luminance profile in order to provide reduced off-axis luminance in a privacy mode of operation and higher off-axis luminance in a wide angle mode of operation. Such switching backlight 20 may cooperate with the switchable guest-host retarder 300 of the present embodiments.

Additional polariser 318 is arranged on the same output side of the spatial light modulator 48 as the display output polariser 218. The additional polariser is a linear polariser and may be a linear absorbing polariser.

The display polariser 218 and the additional polariser 318 have electric vector transmission directions 219, 319 that are parallel. As will be described below, such parallel alignment provides high transmission for central viewing locations.

Plural retarders which together are referred to herein as a switchable guest-host retarder 300 are arranged between the additional polariser 318 and the display polariser 218 and comprise: (i) a switchable guest-host liquid crystal retarder 301 comprising a liquid crystal layer 314 of comprising a guest material and a host material arranged between the display polariser 218 and the additional polariser 318; and (ii) a passive compensation retarder 330.

Thus at least one passive retarder 330 is arranged between the display polariser 218 and the guest-host liquid crystal retarder 301.

Figure 1B:
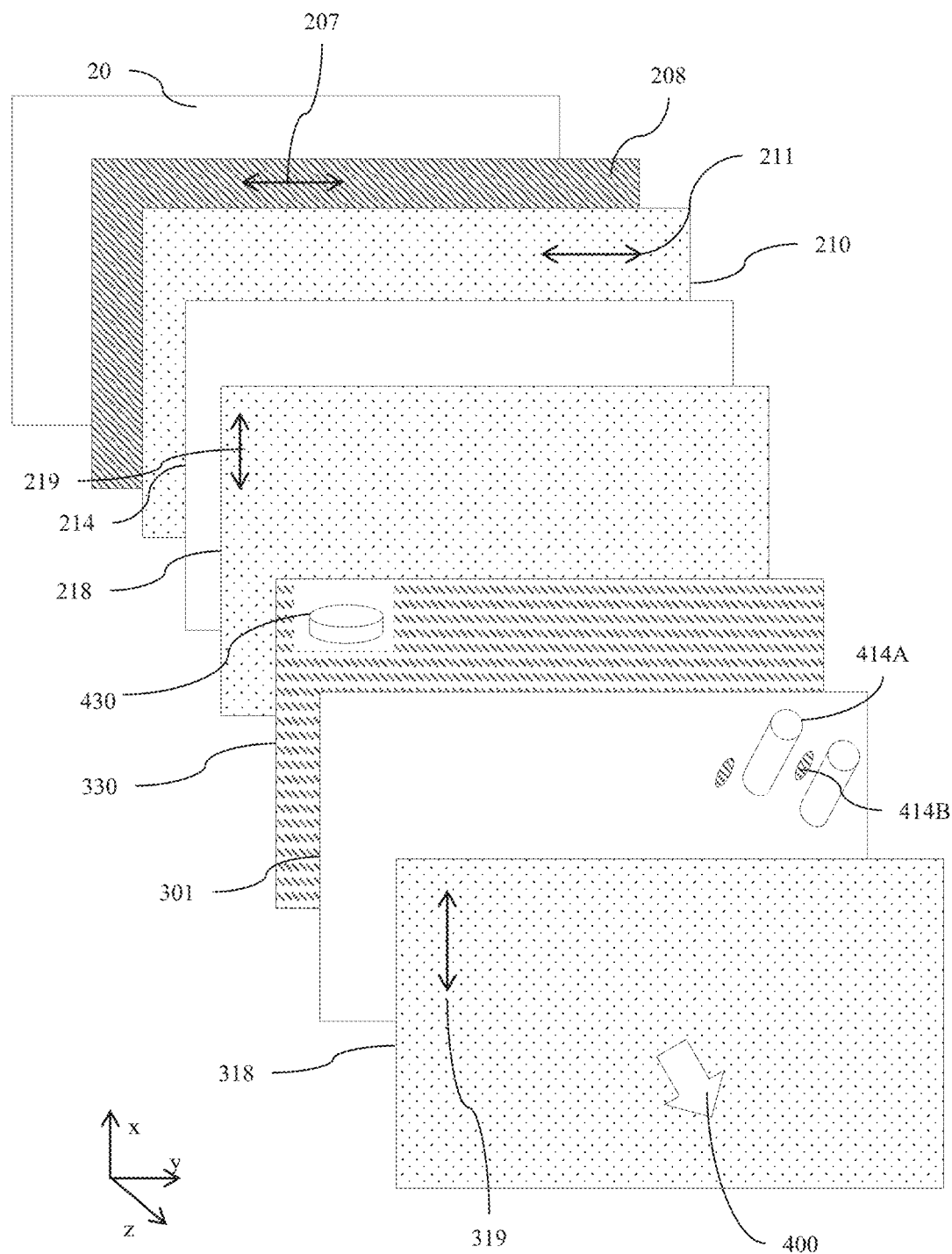
FIG. 1B is a schematic diagram illustrating in front view alignment of optical layers in the optical stack of FIG. 1A.

FIG. 1B is a schematic diagram illustrating in front view alignment of optical layers in the optical stack of FIG. 1A. The input electric vector transmission direction 211 at the input display polariser 210, of the spatial light modulator 48 provides an input polarisation component that may be transformed by the liquid crystal layer 214 to provide output polarisation component determined by the electric vector transmission direction 219 of the output display polariser 218. Passive compensation retarder 330 may comprise retardation layer with a discotic birefringent material 430, while switchable guest-host liquid crystal retarder 301 may comprise liquid crystal material.

Switchable guest-host retarder 300 thus comprises a switchable guest-host liquid crystal retarder 301 comprising a switchable guest-host liquid crystal layer 314, substrates 312, 316 and passive compensation retarder 330 arranged between and additional polariser 318 and display polariser 218.

Substrates 312, 316 may be glass substrates or polymer substrates such as polyimide substrates. Flexible substrates that may be conveniently provided with transparent electrodes may be provided. Advantageously curved, bent and foldable displays may be provided.

The display device 100 further comprises a control system 352 arranged to control the voltage applied by voltage driver 350 across the electrodes of the switchable guest-host liquid crystal retarder 301.

It may be desirable to provide reduced stray light or privacy control of an emissive display.

Figure 1C:
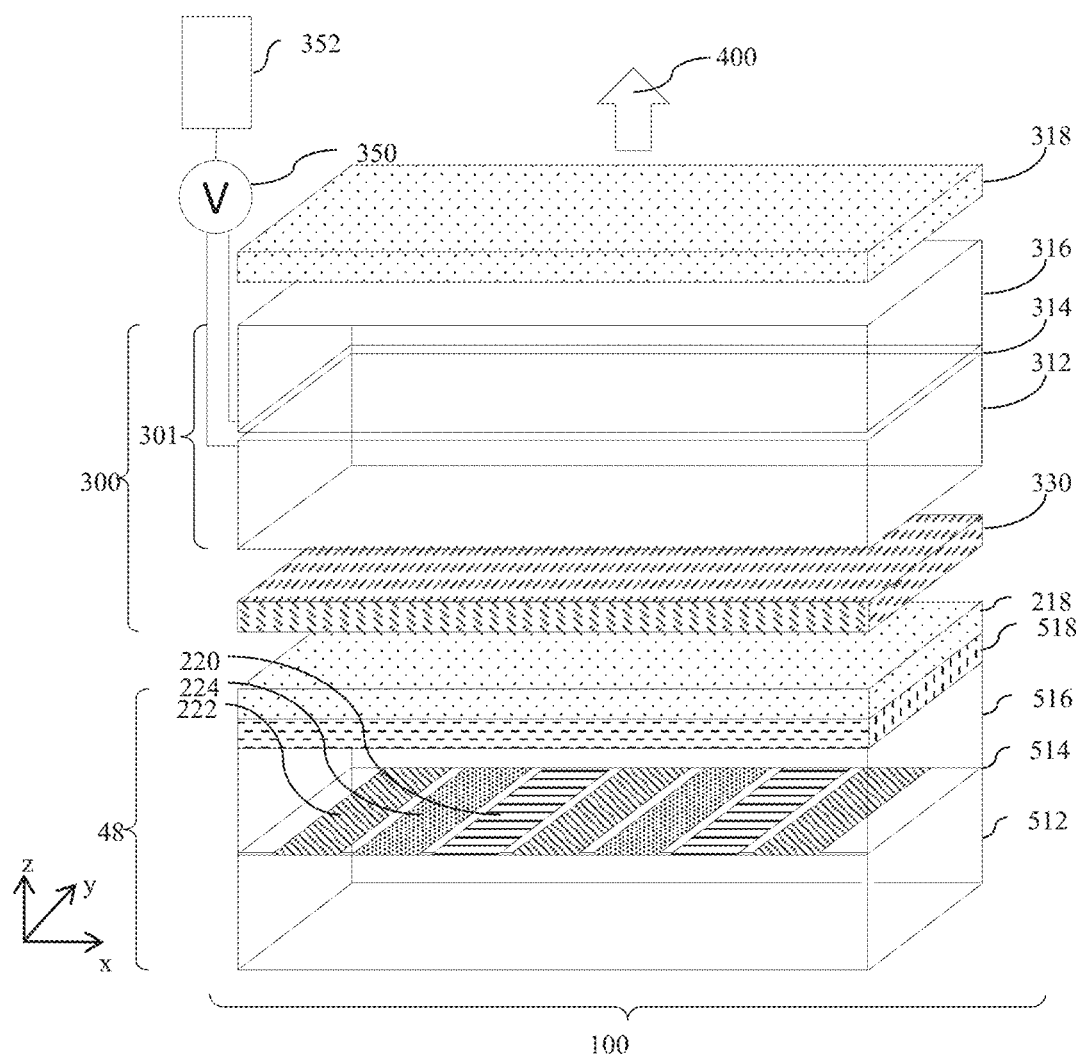
FIG. 1C is a schematic diagram illustrating in side perspective view an optical stack of a directional display device comprising an emissive spatial light modulator and a switchable guest-host liquid crystal retarder arranged on the output side of the emissive spatial light modulator.

FIG. 1C is a schematic diagram illustrating in side perspective view an optical stack of a directional display device comprising an emissive spatial light modulator 48 and a switchable guest-host retarder 300 arranged on the output side of the emissive spatial light modulator 48.

Spatial light modulator 48 may alternatively be provided by other display types that provide output light 400 by emission, such as organic LED displays (OLED), with output display polariser 218, substrates 512, 516 and light emission layer 514. Output polariser 218 may provide reduction of luminance for light reflected from the OLED pixel plane by means of one of more retarders 518 inserted between the output display polariser 218 and OLED pixel plane. The one or more retarders 518 may be a quarter waveplate and is different to the compensation retarder 330 of the present disclosure.

In the embodiment of FIG. 1C, the spatial light modulator 48 thus comprises an emissive spatial light modulator and the display polariser is output display polariser 218.

Otherwise, the directional display device of FIG. 1C is the same as that of FIG. 1A, as described above.

A view angle control optical element 260 for application to a display device will now be described. View angle control optical elements 260 may be added to spatial light modulators comprising a display polariser 210, 218 to achieve switchable field-of-view characteristics.

Figure 1D:
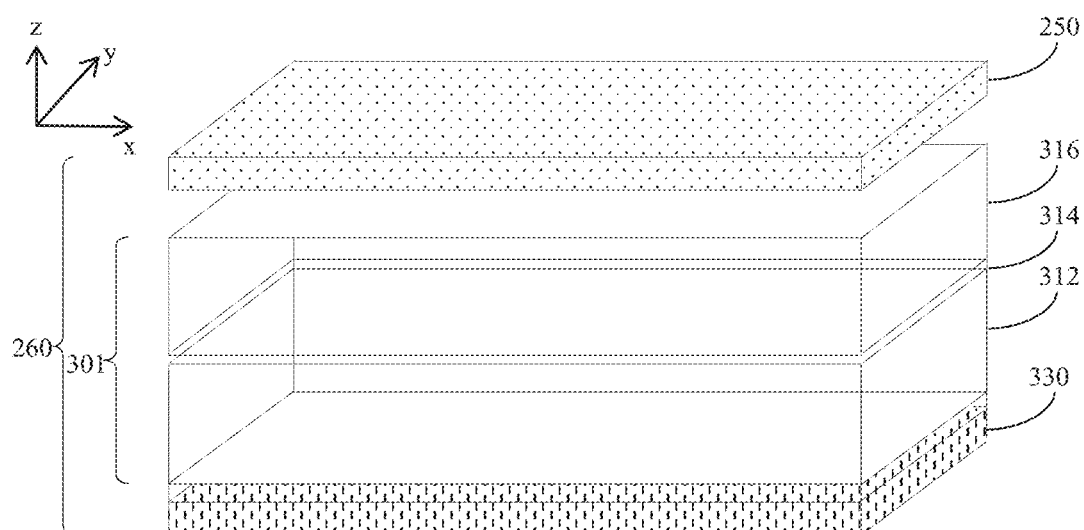
FIG. 1D is a schematic diagram illustrating in side perspective view a view angle control optical element comprising a passive guest-host liquid crystal retarder, a switchable guest-host liquid crystal retarder and a control polariser.

FIG. 1D is a schematic diagram illustrating in side perspective view a view angle control optical element 260 for application to a display device comprising a passive compensation retarder 330, a switchable guest-host liquid crystal retarder 301 and a control polariser 250.

In use, view angle control optical element 260 may be attached by a user or may be factory fitted to a polarised output spatial light modulator 48. View angle control optical element 260 may be provided as a flexible film for curved and bent displays. Alternatively the view angle control optical element 260 may be provided on a rigid substrate such as a glass substrate.

Advantageously, an after-market privacy control element and/or stray light control element may be provided that does not require matching to the panel pixel resolution to avoid Moiré artefacts. View angle control optical element 260 may be further provided for factory fitting to spatial light modulator 48.

By attaching the view angle control optical element 260 of FIG. 1D to an existing display device, it is possible to form a display device as shown in any of FIGS. 1A-C.

The embodiments of FIGS. 1A-D provide polar luminance control for light 400 that is output from the spatial light modulator 48. That is, the switchable guest-host retarder 300 (comprising the switchable guest-host liquid crystal retarder 301 and the passive compensation retarder 330) does not affect the luminance of light passing through the input display polariser 210, the switchable guest-host retarder 300 and the additional polariser 318 along an axis along a normal to the plane of the switchable guest-host retarder 300 but the switchable guest-host retarder 300 does reduce the luminance of light passing therethrough along an axis inclined to a normal to the plane of the switchable guest-host retarder 300, at least in one of the switchable states of the compensated switchable retarder 300. The principles leading to this effect are described in greater detail below with reference to FIGS. 29A-31E and arises from the presence or absence of a phase shift introduced by the switchable guest-host liquid crystal retarder 301 and the passive compensation retarder 330 to light along axes that are angled differently with respect to the liquid crystal material of the switchable guest-host liquid crystal retarder 301 and the passive compensation retarder 330. A similar effect is achieved in all the devices described below.

Furthermore, the provision of the passive compensation retarder 330 in addition to the switchable guest-host liquid crystal retarder 301 improves the performance, as will be described in more detail with reference to some specific display devices, and by comparison to some comparative examples described with reference to FIGS. 19A-E.

It may be desirable to reduce the thickness and increase the efficiency of the display apparatus.

Figure 1E:
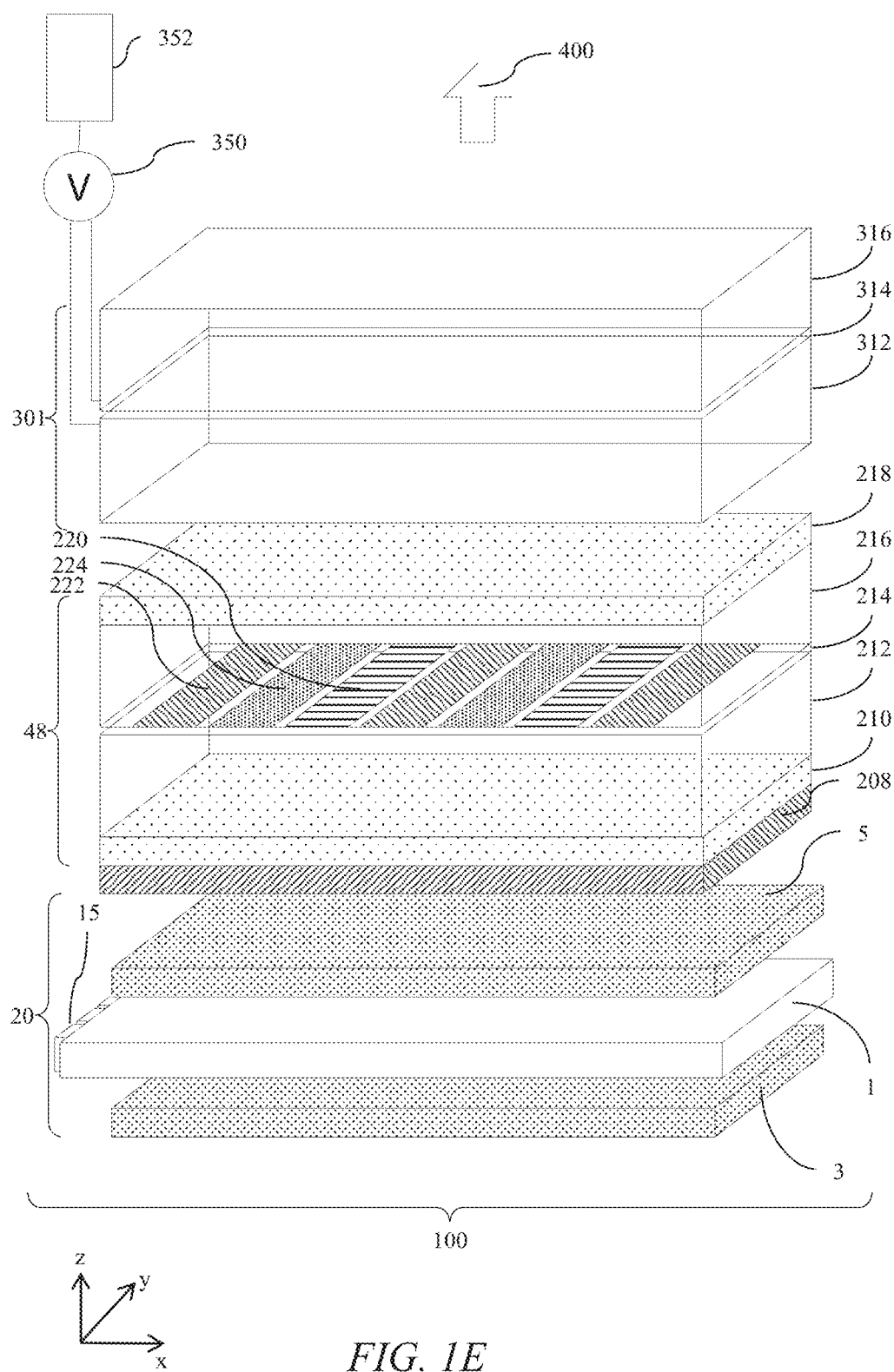
FIG. 1E is a schematic diagram illustrating in side perspective view an optical stack of a directional display device comprising a front switchable guest-host liquid crystal retarder.
Figure 1F:
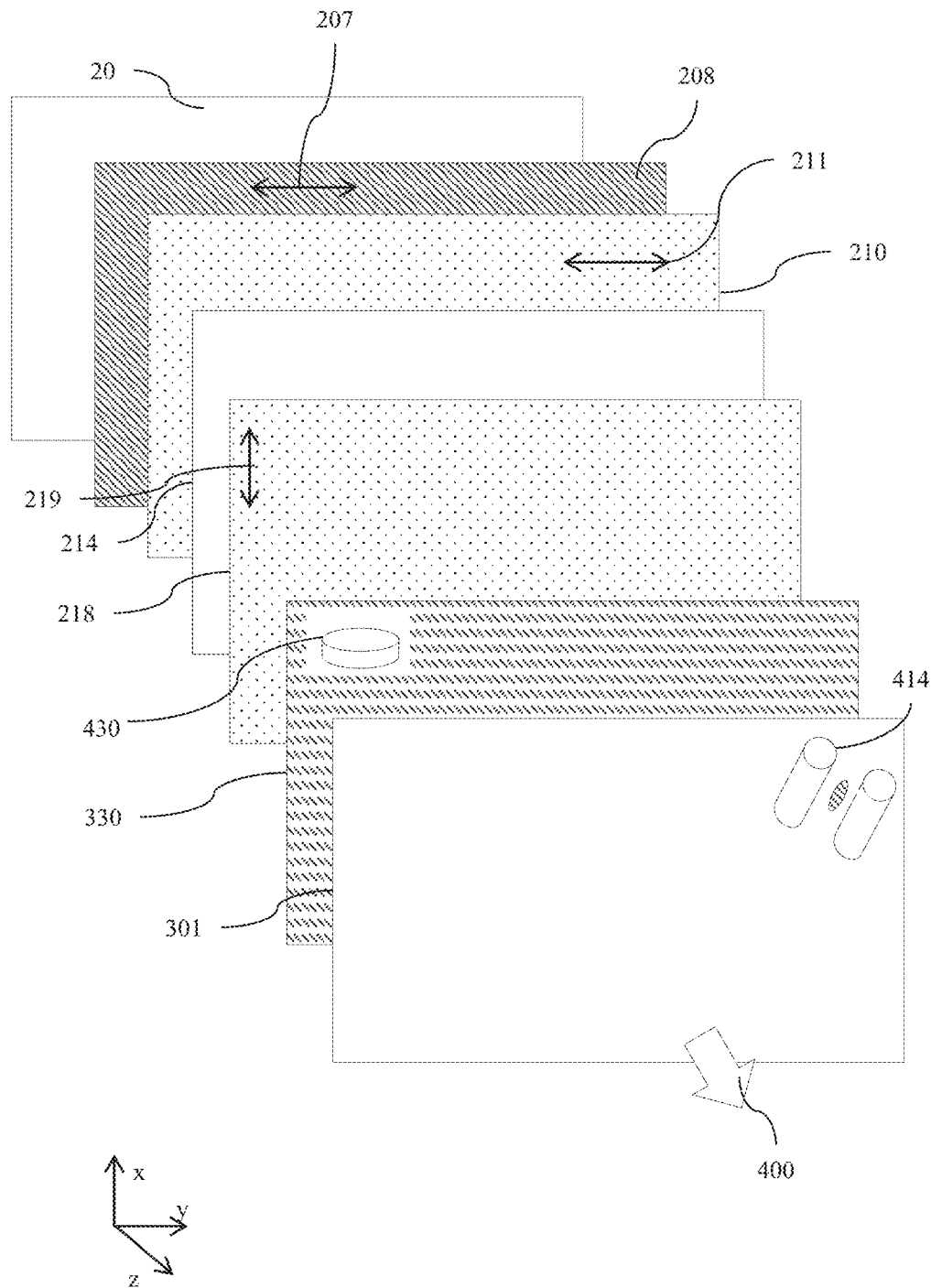
FIG. 1F is a schematic diagram illustrating in front view alignment of optical layers in the optical stack of FIG. 1E.

FIG. 1E is a schematic diagram illustrating in side perspective view an optical stack of a directional display device 100 comprising a front switchable guest-host liquid crystal retarder 301; and FIG. 1F is a schematic diagram illustrating in front view alignment of optical layers in the optical stack of FIG. 1E.

A display device comprises a spatial light modulator 48 comprising a layer 214 of addressable pixels 220, 222, 224; a display polariser 218 arranged on the output side of the spatial light modulator 48; a guest-host liquid crystal retarder 301 comprising a liquid crystal layer comprising a guest material 414B and a host material 414A.

The display polariser 218 is arranged between the guest-host liquid crystal retarder 301 and the layer 214 of addressable pixels.

In the embodiment of FIG. 1A, a passive compensation retarder 330 is arranged to provide control of incident polarisation state onto the guest-host liquid crystal retarder 301. By way of comparison FIG. 1E illustrates that the retarder 330 may be omitted. Further in comparison to the arrangement of FIG. 1A, additional polariser 318 is eliminated. Advantageously thickness and cost may be reduced.

It may be desirable to reduce the number of optical layers between a spatial light modulator 48 and an observer. An arrangement wherein the plural retarders 300 are arranged on the input side of the spatial light modulator 48 will now be described.

Figure 2A:
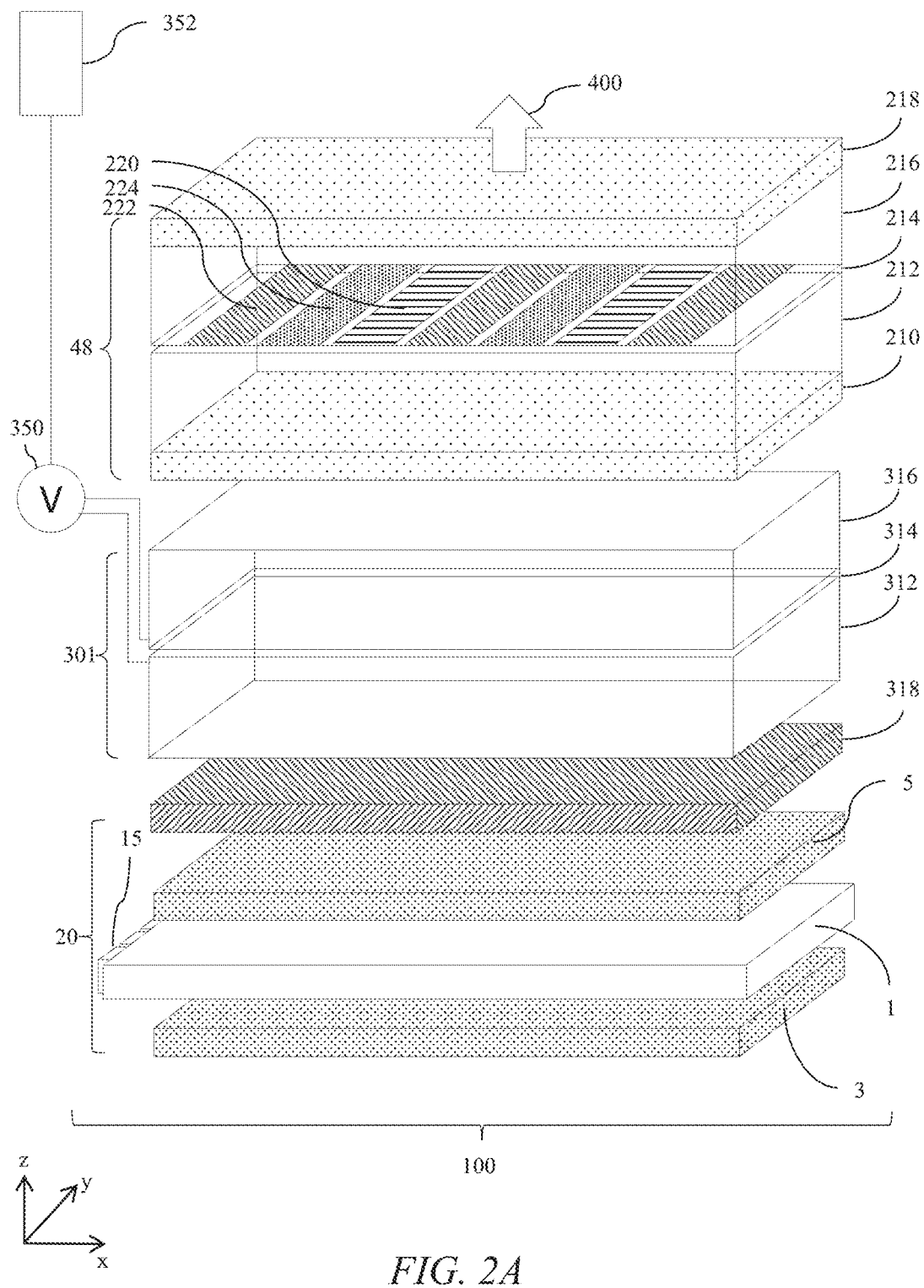
FIG. 2A is a schematic diagram illustrating in side perspective view an optical stack of a directional display device comprising a backlight, a rear switchable guest-host liquid crystal retarder, and a transmissive spatial light modulator.

FIG. 2A is a schematic diagram illustrating in side perspective view an optical stack of a directional display device comprising a backlight 20, a switchable rear guest-host retarder 301, a transmissive spatial light modulator 48 wherein the additional polariser 318 comprises a reflective polariser.

The display device 100 comprises a spatial light modulator 48; an input display polariser 210 arranged on the input side of the spatial light modulator 48. The switchable rear guest-host retarder 301 is also arranged on the input side of the spatial light modulator 48, the input display polariser 210 being between the switchable rear guest-host retarder 300 and the spatial light modulator 48.

Additional polariser 318 is arranged on the same side of the spatial light modulator 48 as the display polariser 210 with the guest-host liquid crystal retarder 301 between the input display polariser 210 and the additional polariser 318. Additional polariser 318 is a reflective polariser that operates in cooperation with the backlight 20 to achieve increased efficiency.

Plural retarders 300 are arranged between the reflective additional polariser 318 and the display polariser 210. As for FIG. 1A, the plural retarders 300 comprise: a switchable guest-host liquid crystal retarder 301 comprising a layer 314 of liquid crystal material arranged between the display polariser 210 and the reflective additional polariser 318; and a passive compensation retarder 330. Thus the reflective additional polariser 318 is arranged on the input side of the input display polariser 210 between the input display polariser 210 and the backlight 20 and the plural retarders 300 are arranged between the reflective additional polariser 318 and the input display polariser 210.

The electric vector transmission direction 319 of the reflective additional polariser 318 is parallel to the electric vector transmission direction 211 of input polariser 210 to achieve the switchable directional properties as will be described hereinbelow.

In alternative embodiments the additional polariser 318 may comprise both a reflective polariser and a linear absorbing polariser or may comprise only a linear absorbing polariser.

The reflective additional polariser 318 may for example be a multilayer film such as DBEF™ from 3M Corporation, or may be a wire grid polariser. Advantageously display efficiency may be improved due to light recycling from the polarised reflection from the polariser 372. Further cost and thickness may be reduced in comparison to using both a linear absorbing polariser and a reflective polariser as additional polariser 318.

In comparison to the arrangement of FIG. 1A, FIG. 2A may provide improved front of screen image contrast due to the reduced number of layers between the pixels 220, 222, 224 and an observer.

It may be desirable to provide a display with a fixed privacy mode of operation.

Figure 2B:
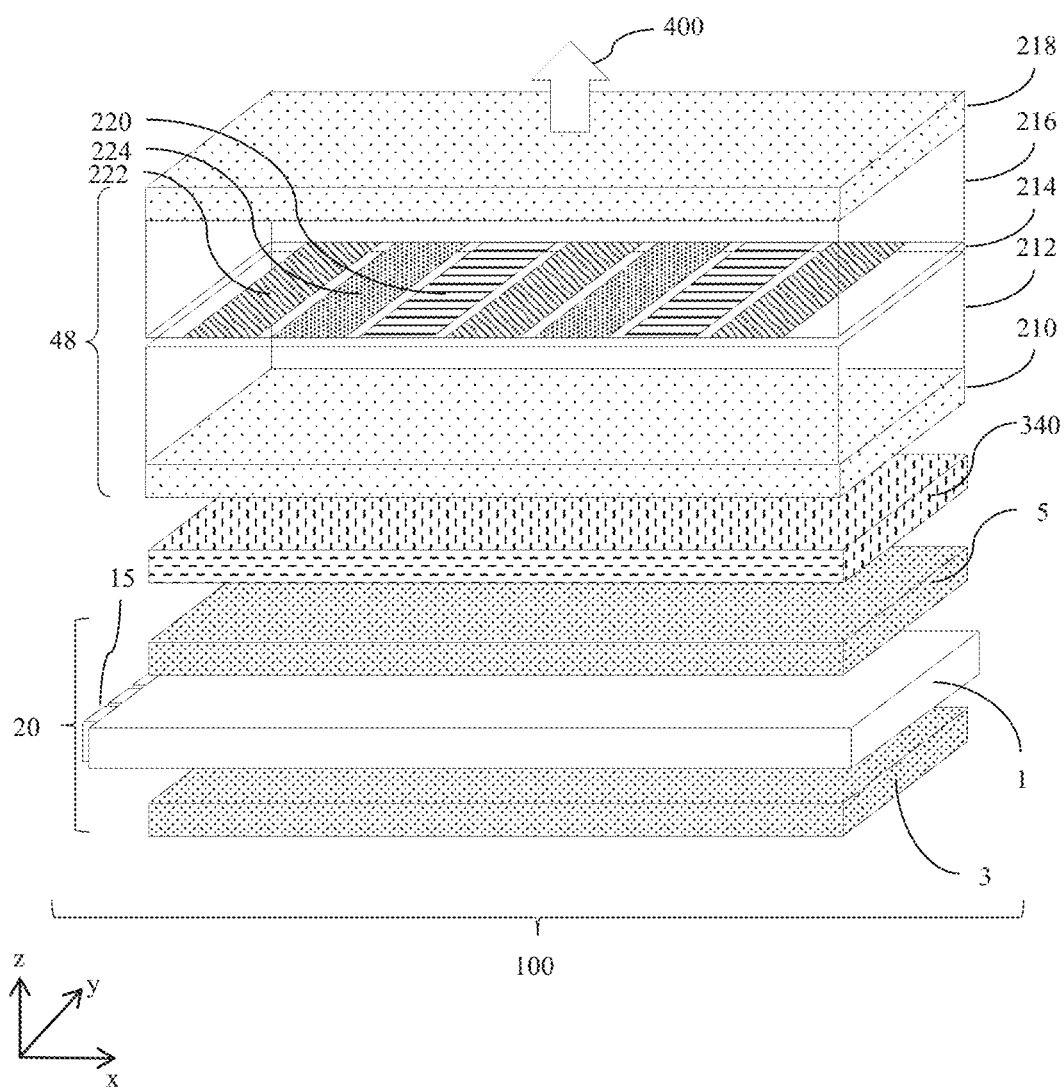
FIG. 2B is a schematic diagram illustrating in side perspective view an optical stack of a directional display device comprising a backlight, a rear passive guest-host liquid crystal retarder, and a transmissive spatial light modulator.

FIG. 2B is a schematic diagram illustrating in side perspective view an optical stack of a directional display device comprising a backlight 20, a rear passive guest-host liquid crystal retarder 340, and a transmissive spatial light modulator 48.

Figure 2C:
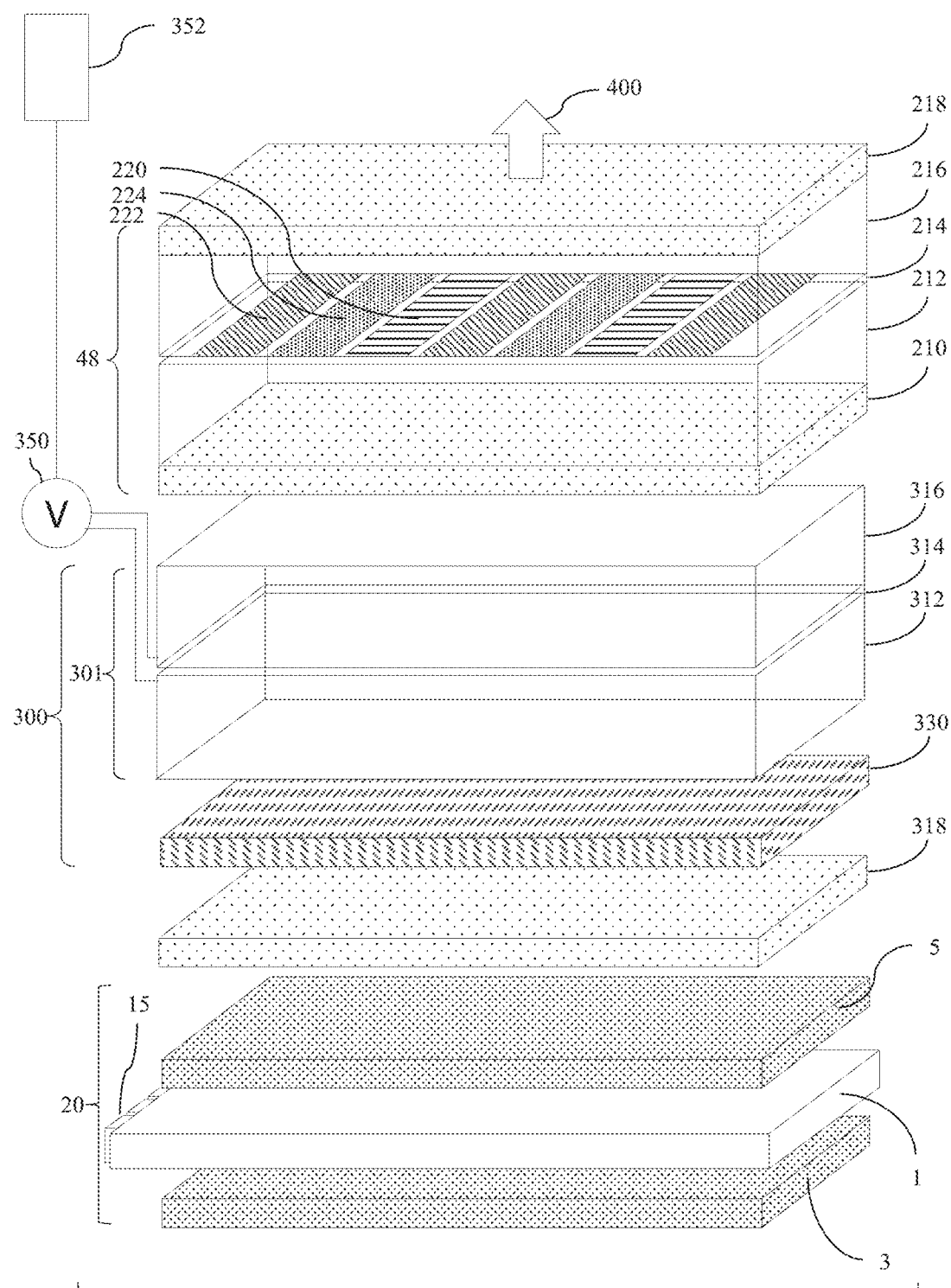
FIG. 2C is a schematic diagram illustrating in side perspective view an optical stack of a directional display device comprising a backlight, a rear switchable guest-host liquid crystal retarder, and a transmissive spatial light modulator wherein the additional polariser comprises a linear absorbing polariser.

FIG. 2C is a schematic diagram illustrating in side perspective view an optical stack of a directional display device comprising a backlight 20, a rear switchable guest-host retarder 300, and a transmissive spatial light modulator 48 wherein the additional polariser 318 comprises a linear absorbing polariser. In comparison to the reflective additional polariser 318 of FIG. 2A, the dichroic additional polariser 318 does not recycle high angle light into the backlight and thus may reduce the off-axis luminance in comparison to the arrangement of FIG. 2A. Advantageously privacy performance is improved.

The operation of the guest-host liquid crystal retarder 301 will now be described with reference to the guest-host liquid crystal retarder 301 shown in FIG. 3A. The guest-host liquid crystal retarder 301 has the same structure as described above but in this example the guest-host retarder 301 is arranged on the output side of the spatial light modulator 48, the output display polariser 218 being between the guest-host retarder 301 and the spatial light modulator 48. In general, the guest-host retarder 301 may be on either side of the spatial light modulator 48 and the same operation is provided as described below.

Figure 3A:
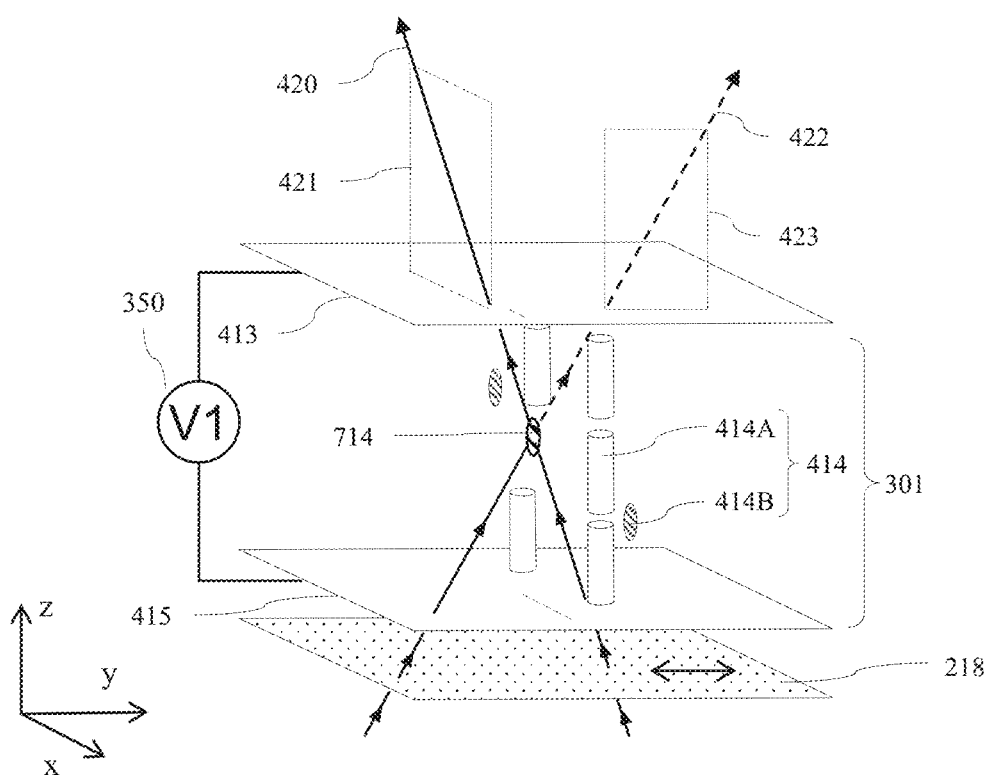
FIG. 3A is a schematic diagram illustrating in side perspective view a switchable guest-host liquid crystal retarder in a privacy mode of operation.
Figure 3B:
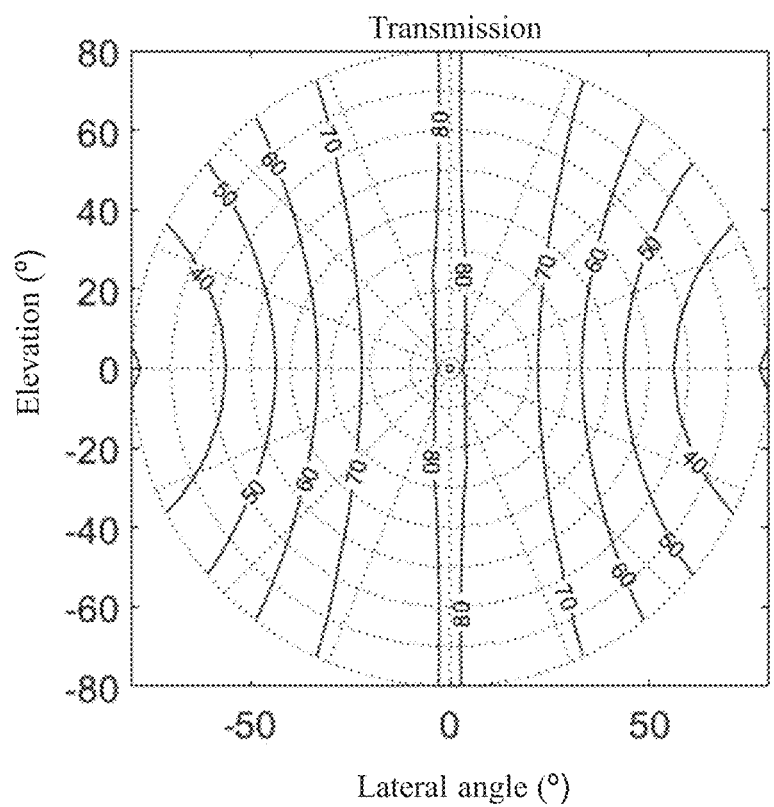
FIG. 3B is a schematic graph illustrating the simulated variation of output transmission with polar direction for the transmitted light rays in FIG. 3A.
Figure 3C:
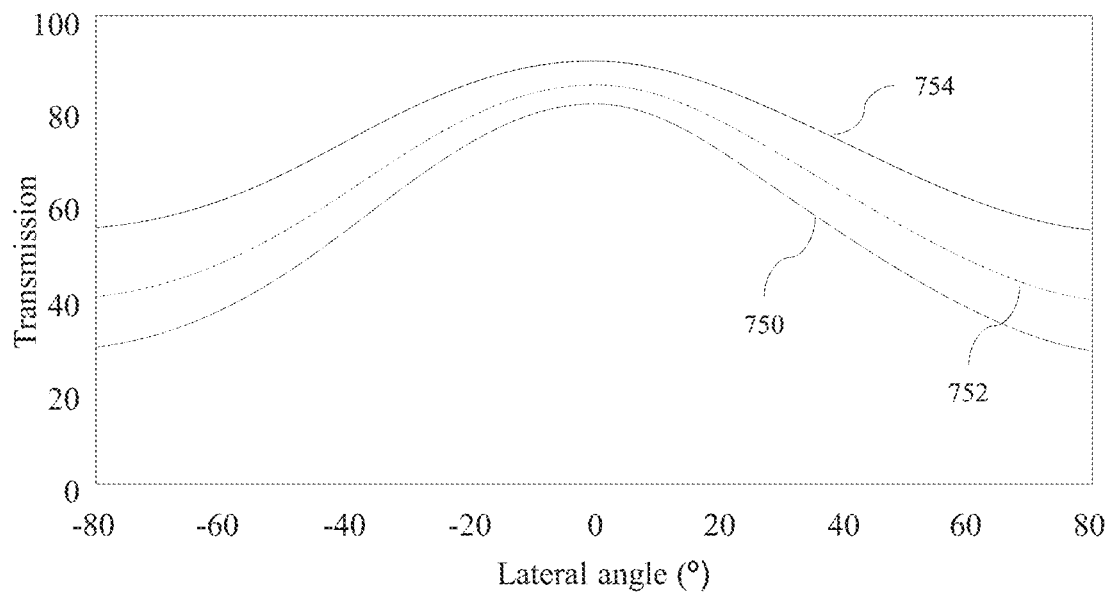
FIG. 3C is a schematic graph illustrating the simulated variation of output transmission with lateral angle at zero elevation with varying concentration of dichroic dye for the transmitted light rays in FIG. 3A.
Figure 3D:
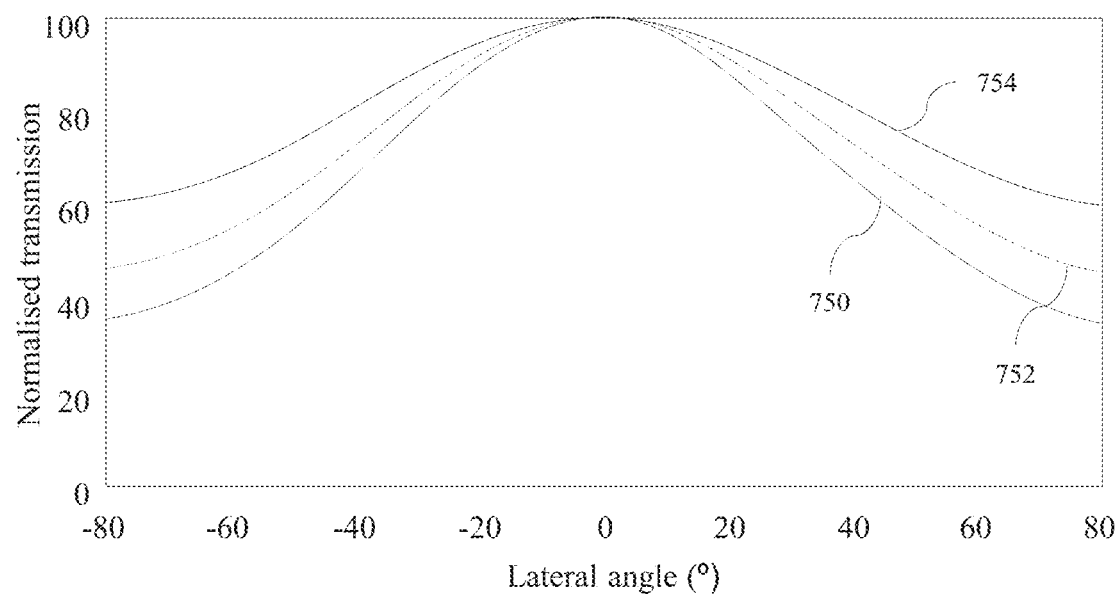
FIG. 3D is a schematic graph illustrating the simulated variation of normalised output transmission with lateral angle at zero elevation with varying concentration of dichroic dye for the transmitted light rays in FIG. 3A.

FIG. 3A is a schematic diagram illustrating in side perspective view a switchable guest-host liquid crystal retarder 301 in a privacy mode of operation with a first drive voltage V1; FIG. 3B is a schematic graph illustrating the variation of output transmission with polar direction for the transmitted light rays in FIG. 3A; FIG. 3C is a schematic graph illustrating the simulated variation of output transmission with lateral angle at zero elevation with varying concentration of dichroic dye for the transmitted light rays in FIG. 3A; and FIG. 3D is a schematic graph illustrating the simulated variation of normalised output transmission with lateral angle at zero elevation with varying concentration of dichroic dye for the transmitted light rays in FIG. 3A, with the parameters described in TABLE 1.

as a consequence of the order parameter of the liquid crystal molecules limiting the alignment to the polariser 218 of the absorbing dichroic dye molecules that can be achieved.

Advantageously, reduced off-axis luminance can be achieved, providing increased privacy performance.

Desirable ranges for guest-host materials have been established by means of simulation of retarder stacks and experiment with display optical stacks.

In order to achieve desirable off-axis luminance reduction while minimising absorption, the volume of the guest material may comprise less than 3%, preferably less than 2% and most preferably less than 1% of the volume of the host material. Alternatively, in order to achieve desirable off-axis luminance reduction while minimising absorption, the weight of the guest material may comprise less than 3%, preferably less than 2% and most preferably less than 1% of the weight of the host material. Advantageously reducing the guest concentration provides increased efficiency in the direction normal to the retarder 301 while providing some off-axis luminance reduction.

TABLE 1

| FIG. | Mode | Passive compensation retarder(s) 330 | | Guest-host liquid crystal retarder | | | | |
|---|---|---|---|---|---|---|---|---|
| | | Type | Δn.d/ nm | Order parameter | Guest-host concentration | LC tilt/ deg | Δn.d/ nm | Additional polariser |
| 3B | Privacy | None | 0 | 0.8 | 1% | 90 | 810 | No |
| 3C&3D profile 750 | | | | | | | | |
| 3C&3D profile 752 | | | | | 0.75% | | | |
| 3C&3D profile 754 | | | | | 0.5% | | | |
| 3F | Wide | | | | 0.5% | 0 | | |

In FIG. 3A and other schematic diagrams below, some layers of the optical stack are omitted for clarity. For example the switchable guest-host liquid crystal retarder 301 is shown omitting the substrates 312, 316.

The guest-host liquid crystal retarder 301 comprises guest material 414B which is an anisotropic absorber and host material 414A which is a liquid crystal material. Guest material 414B may be a dichroic dye or pleochroic dye and typically may be a positive dichroic dye, with absorption of polarisation state that is parallel to the long axis of the dichroic guest material 414B.

The dichroic dye is oriented by the aligned liquid crystal material 414A when voltage V1 is applied such that in at least one state of the material as illustrated in FIG. 3A the optical axis direction of the guest-host liquid crystal retarder 301 has an alignment component perpendicular to the plane of the retarder 301.

In operation light ray 420 that is propagating in the x-z plane 421 has a linear polarisation component imparted by display polariser 218. Such polarisation component is incident on a molecule 714 of the guest material 414B at an orientation that is orthogonal to the absorption axis of the molecule 714. Thus light rays 420 in the elevation direction are substantially transmitted.

By way of comparison light ray 422 that is propagating in the y-z plane 423 has a polarisation component that is parallel to the absorption axis of the dichroic dye molecule 714, and thus undergoes some absorption. Thus light rays 420 in the lateral direction are substantially transmitted.

FIG. 3C and FIG. 3D illustrate that as the guest-host concentration is increased, the head-on luminance reduces, The on-axis extinction coefficient of the guest-host liquid crystal retarder 301 may be determined by aligning the retarder 301 to a linear absorbing polariser that has an electric vector transmission direction that is (i) perpendicular and (ii) parallel with the absorption axis of the retarder 301. The extinction coefficient is the ratio of the measurements for the perpendicular and parallel orientations. The on-axis extinction coefficient of the guest-host liquid retarder 301 in at least one state of operation is at least 60%, preferably at least 80% and most preferably at least 90%.

Figure 3E:
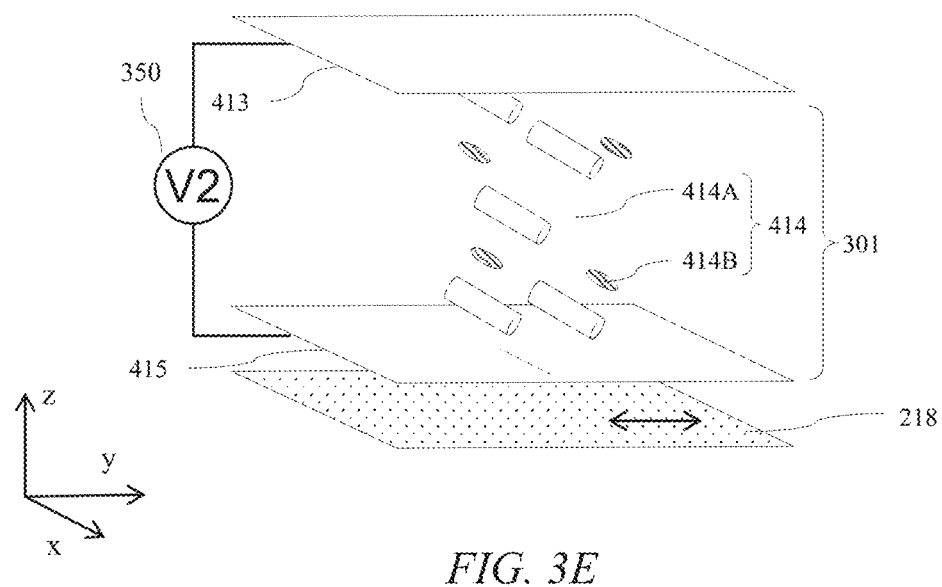
FIG. 3E is a schematic diagram illustrating in side perspective view a switchable guest-host liquid crystal retarder in a wide angle mode of operation.
Figure 3F:
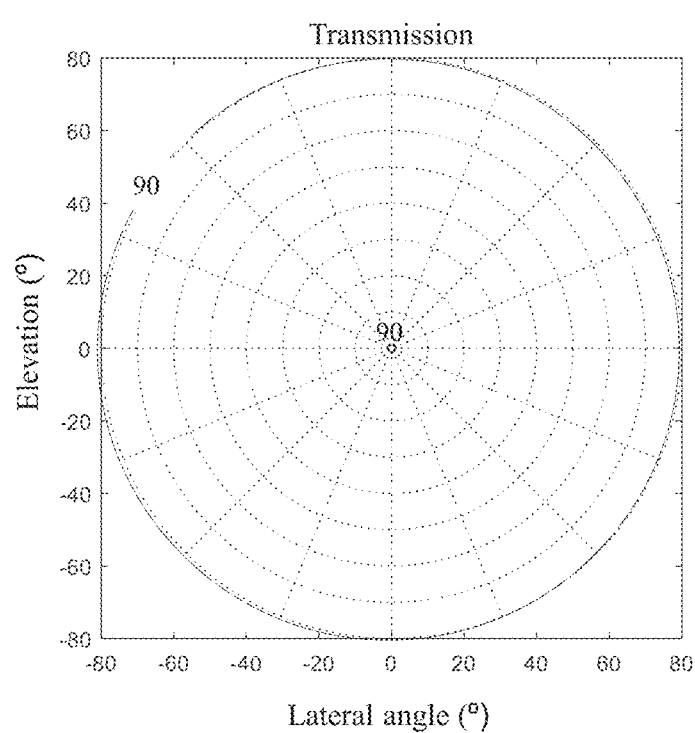
FIG. 3F is a schematic graph illustrating the variation of output transmission with polar direction for the transmitted light rays in FIG. 3E.

FIG. 3E is a schematic diagram illustrating in side perspective view a switchable guest-host liquid crystal retarder in a wide angle mode of operation with a second drive voltage V2; and FIG. 3F is a schematic graph illustrating the variation of output transmission with polar direction for the transmitted light rays in FIG. 3E.

The guest material comprises a positive dichroic material or a positive pleochroic material and the optical axis of the guest-host liquid crystal layer has an alignment component in the plane of the guest-host liquid crystal layer that is orthogonal to the electric vector transmission direction of the display polariser. Thus the transmission axis of the host material 414B is aligned to the transmission axis of the linear absorbing polariser 218. The field of the view of the input light is substantially unmodified by the dichroic guest material 414B. Advantageously a wide angle mode may be provided.

It may be desirable to provide a passive guest-host liquid crystal retarder 340.

Figure 3G:
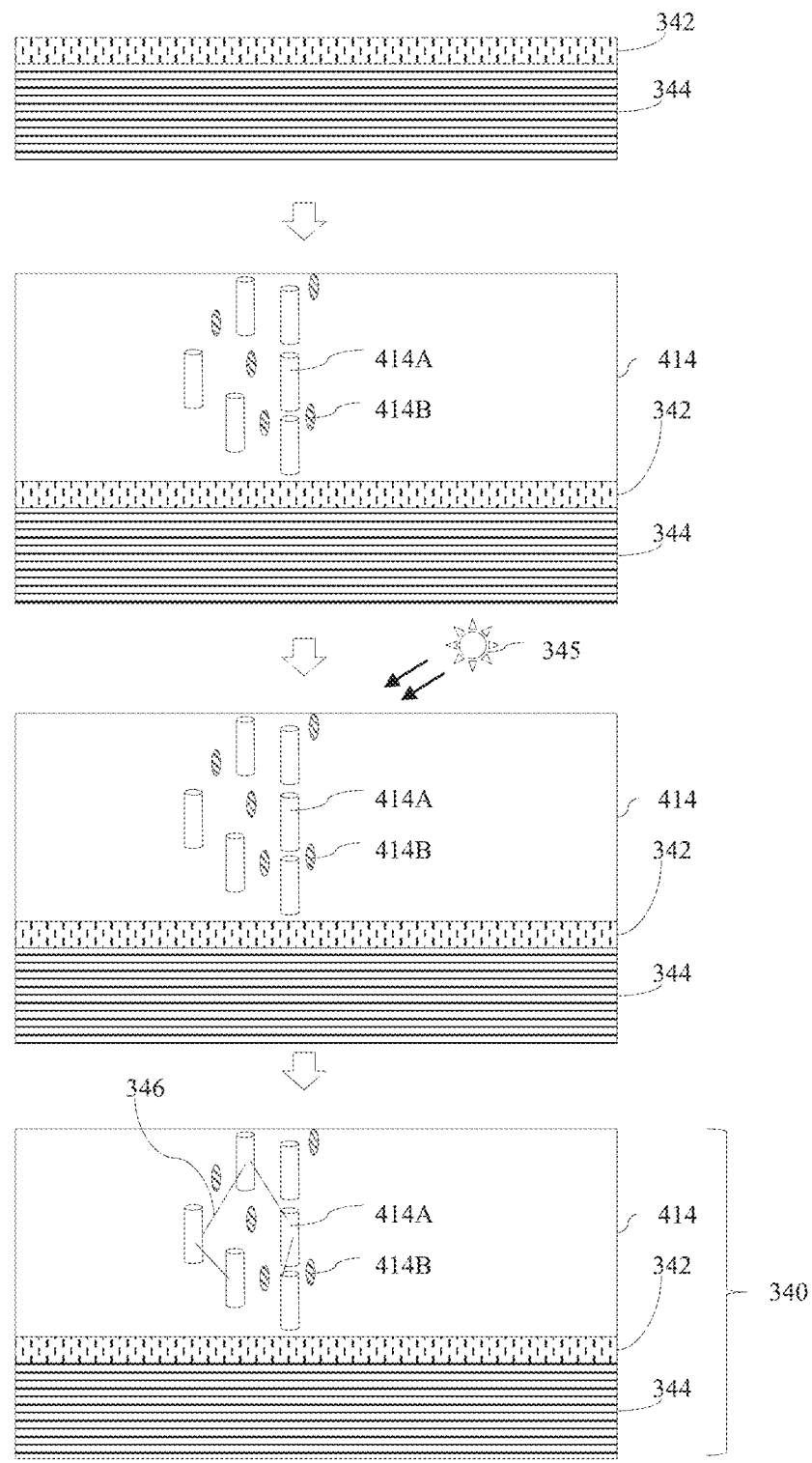
FIG. 3G is a schematic diagram illustrating in side view a method to form a passive guest-host liquid crystal retarder.

FIG. 3G is a schematic diagram illustrating in side view a passive guest-host liquid crystal retarder. The guest-host liquid crystal retarder is a cured liquid crystal layer.

Such a retarder may be provided in a first step by providing a homeotropic alignment layer 342 on the surface of a substrate 344. Substrate 344 is a transparent substrate that may be birefringent substrate to provide a compensation retarder 330 or may be a reflective additional polariser 318 similar to that illustrated in FIG. 2A for example.

In a second step guest-host liquid crystal material 414A, 414B is provided on the homeotropic alignment layer 342 by means of spinning, slot coating or other known coating method. The upper surface may self-align with homeotropic alignment to air, by means of surface tension forces for example. The liquid crystal material 414A may be provided by a curable liquid crystal material such as a reactive mesogen.

In a third step, a UV light source 345 is provided to illuminate the guest-host liquid crystal material 414A, 414B, to provide a cross linkages 346 between the liquid crystal molecules 414A.

Such elements 340 can also be incorporated in other embodiments described herein to provide a contribution to off-axis luminance reduction. Advantageously a low cost passive view angle control element may be provided with low thickness, and off-axis stray light reduction may be increased.

Figure 3H:
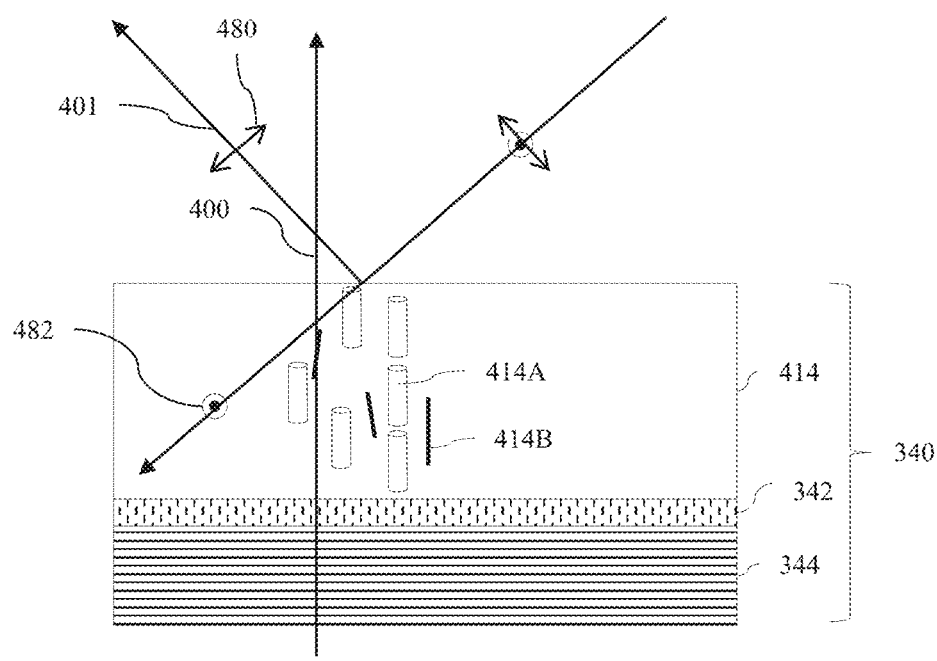
FIG. 3H is a schematic diagram illustrating in side view a passive guest-host liquid crystal retarder wherein the guest material comprises silver nanowires.

FIG. 3H is a schematic diagram illustrating in side view a passive guest-host liquid crystal retarder wherein the guest material 414B comprises silver nanowires. Alternatively or additionally to the absorbing dichroic materials described, the anisotropic material 414B may comprise metallic nanomaterials that may be nanowires, nanorods, nanoplatelets or other nanoscale anisotropic particles.

In comparison to the absorbing dichroic materials described elsewhere, the nanoparticles may provide some reflective properties that is polarisation dependent, in a similar manner to wire grid polarisers, although with homeotropic alignment introduced by the liquid crystal alignment. In particular the complex refractive index of the layer may provide the effect of a bulk specular reflector for a first polarisation component 480 and transmit the orthogonal polarisation component 482. On-axis incident light rays 400 may be transmitted by the guest-host liquid crystal material 414A, 414B for both polarisation components 480, 482 but off-axis light rays 401 may be reflected for polarisation component 480.

The metallic nanowires 414B may further comprise an electrically insulating and optically transparent layer 474 that prevents an electrical path between the electrodes 413, 415. This may be achieved by chemical treatment or processing so that an optically transparent electrically insulating coating or layer 474 is present on all or just the end part of the nanowires. The chemical treatment or processing may for example comprise oxidation of nanowires, which may be aluminium. This achieves off-axis reflection from metal nanowires with essentially no DC electrical conductivity path within the liquid crystal material 414.

Figure 3I:
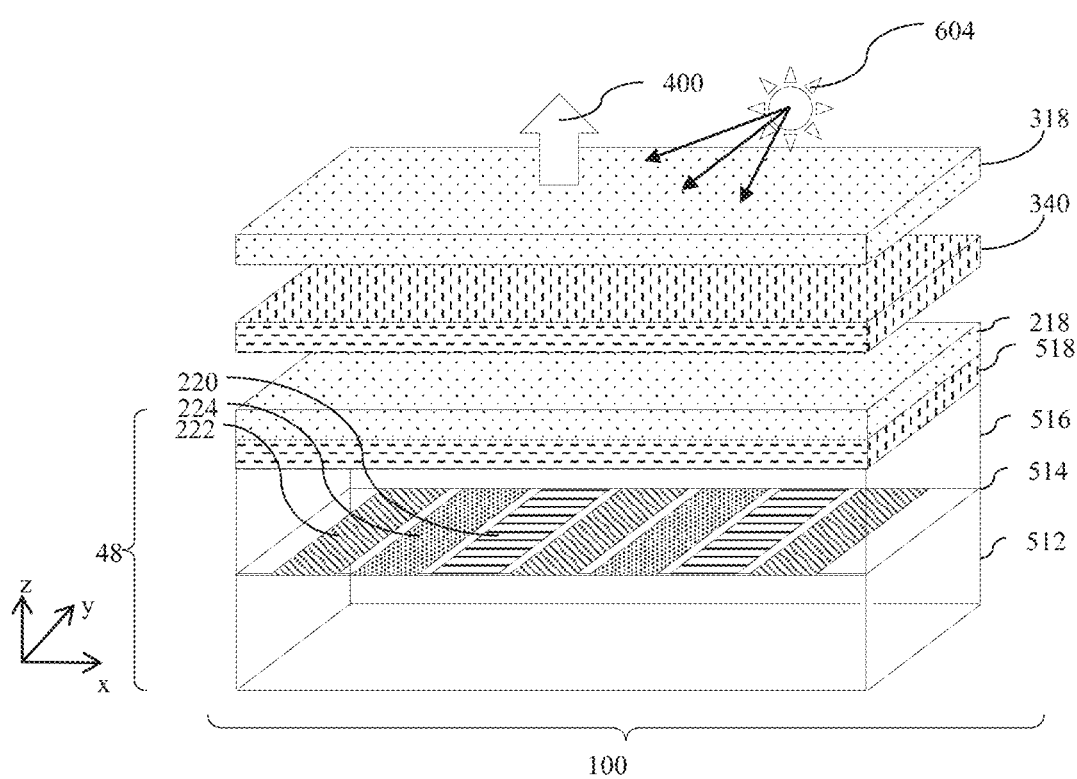
FIG. 3I is a schematic diagram illustrating in perspective side view a display comprising a passive guest-host liquid crystal retarder wherein the guest material comprises silver nanowires and an additional polariser.

FIG. 3I is a schematic diagram illustrating in perspective side view a display comprising a passive guest-host liquid crystal retarder 340 wherein the guest material 414B comprises silver nanowires; and an additional polariser 318 with the guest-host liquid crystal retarder 340 between the output display polariser 218 and the additional polariser 318. The substrate 344 of the passive guest-host liquid crystal retarder 340 may further comprise passive retarder 330 in order to reduce off-axis luminance over an increased field of view as described elsewhere herein.

In operation, light rays 400 from the spatial light modulator 48 are transmitted whereas off-axis light rays have a modified polarisation state and are absorbed by the additional polariser 318 for off-axis locations. Further the silver nanowires provide reflection of light rays 401 from ambient light source 604.

Ambient reflections increase the perceived background level of the image as seen by an observer and thus reduce perceived image contrast. Advantageously privacy performance is increased.

Returning to the description of FIG. 2B, the passive guest-host retarder 340 may alternatively be provided as the type of FIG. 3H. Light rays 401 that are reflected into the backlight may be recirculated rather than absorbed. Advantageously, increased efficiency may be obtained in addition to some collimation of the light rays from the backlight 20.

It would be desirable to increase the off-axis luminance reduction while achieving high on-axis transmission.

Figure 4A:
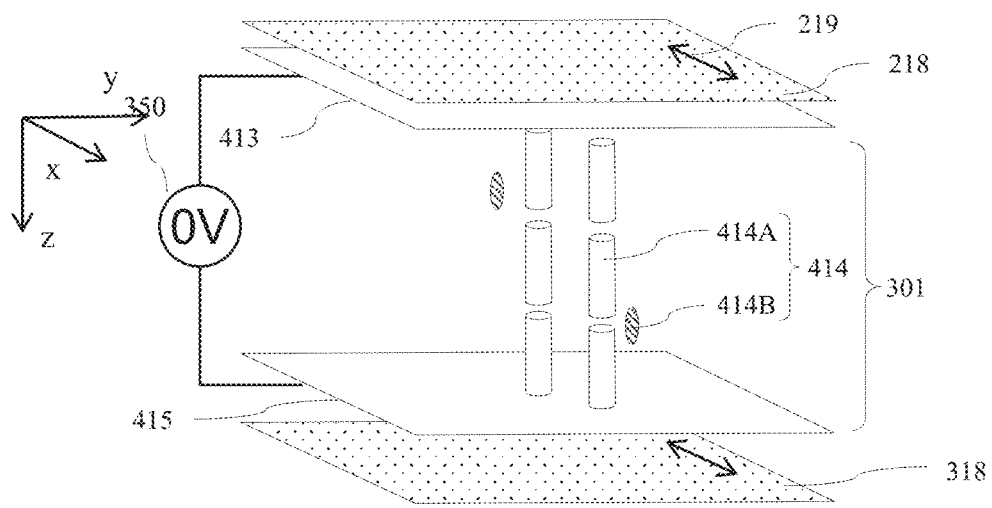
FIG. 4A is a schematic diagram illustrating in side perspective view a switchable guest-host liquid crystal retarder and an additional polariser in a privacy mode of operation.

FIG. 4A is a schematic diagram illustrating in side perspective view a switchable guest-host liquid crystal retarder 301 and an additional polariser 318 in a privacy mode of operation. In comparison to FIG. 3A, additional polariser 318 provides increased off-axis absorption and modifies the nature of the output transmission profile.

Figure 4B:
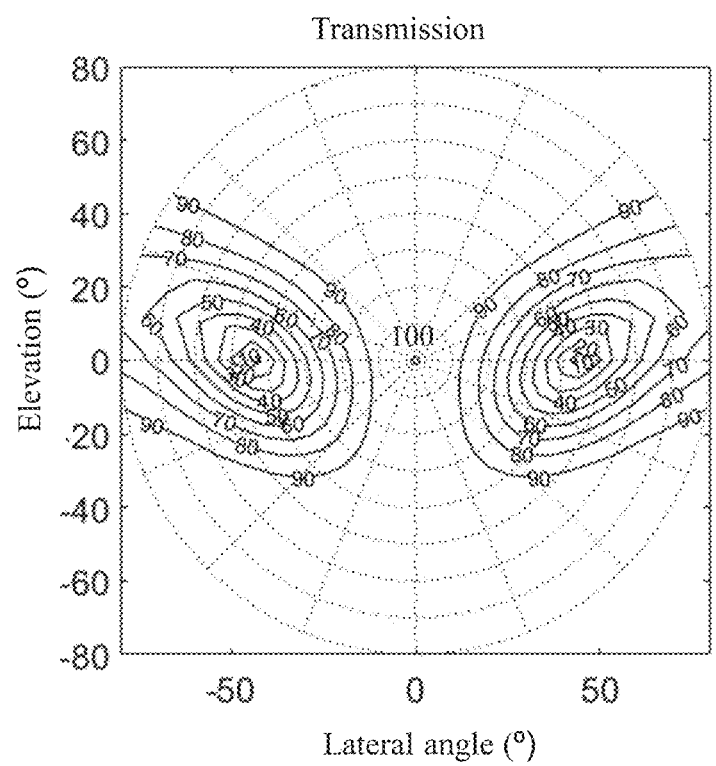
FIG. 4B is a schematic graph illustrating the simulated variation of output transmission with polar direction for the transmitted light rays in FIG. 4A with no guest dichroic dye material.

FIG. 4B is a schematic graph illustrating the simulated variation of output transmission with polar direction for the transmitted light rays in FIG. 4A with no guest dichroic dye material. For convenience, the absorption of the additional polariser 318 has not been included in the present FIGURES.

Figure 4C:
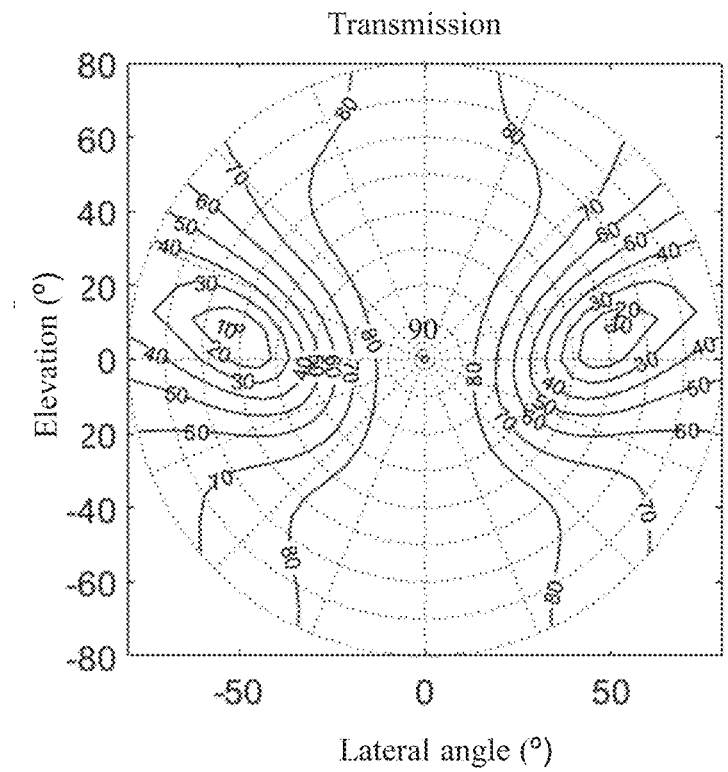
FIG. 4C is a schematic graph illustrating the simulated variation of output transmission with polar direction for the transmitted light rays in FIG. 4A with a first concentration of guest dichroic dye material.
Figure 4D:
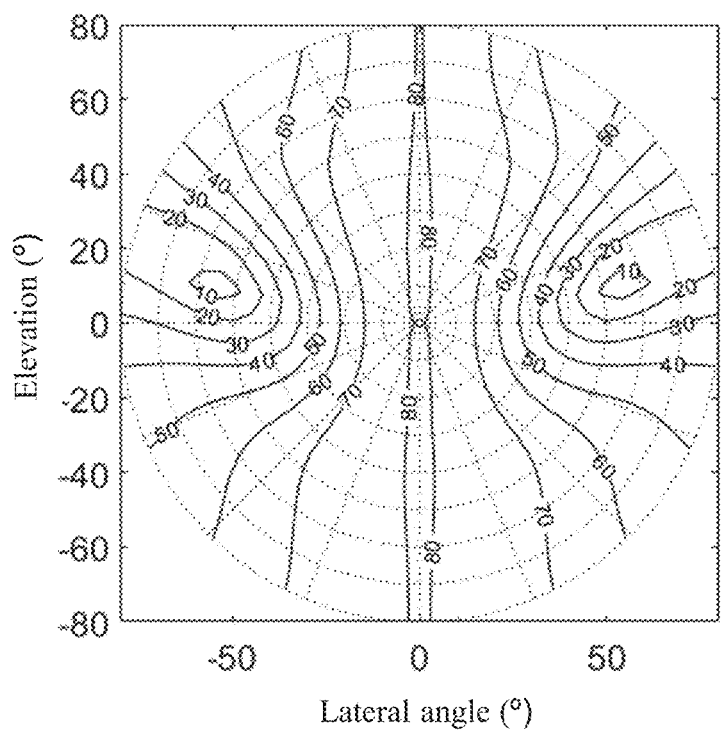
FIG. 4D is a schematic graph illustrating the simulated variation of output transmission with polar direction for the transmitted light rays in FIG. 4A with a second concentration of guest dichroic dye material.
Figure 4E:
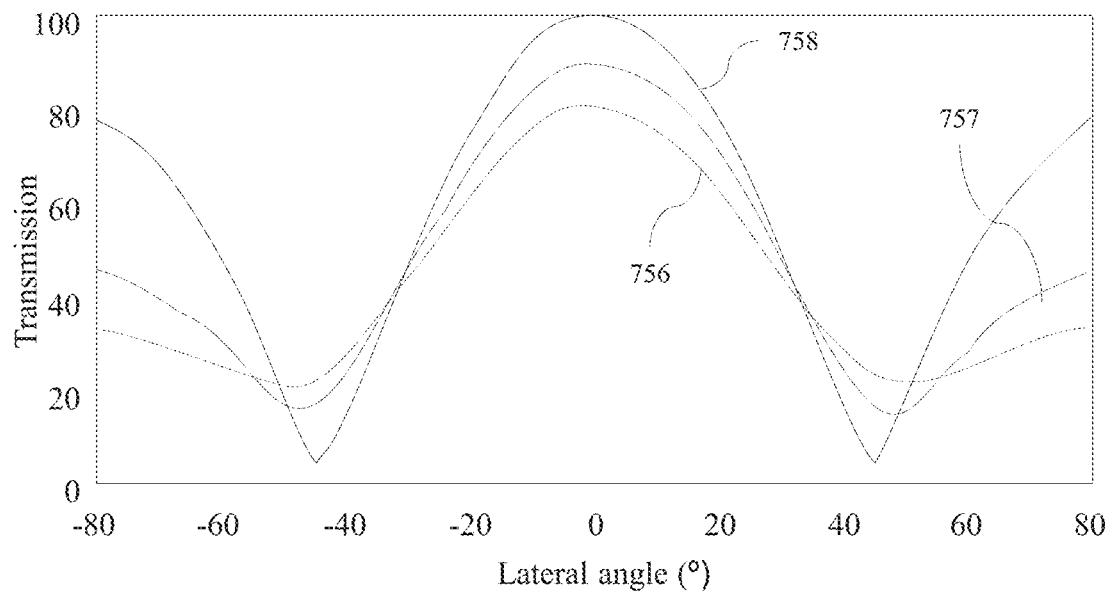
FIG. 4E is a schematic graph illustrating the simulated variation of output transmission with lateral angle at zero elevation with varying concentration of dichroic dye for the transmitted light rays in FIG. 4A.
Figure 4F:
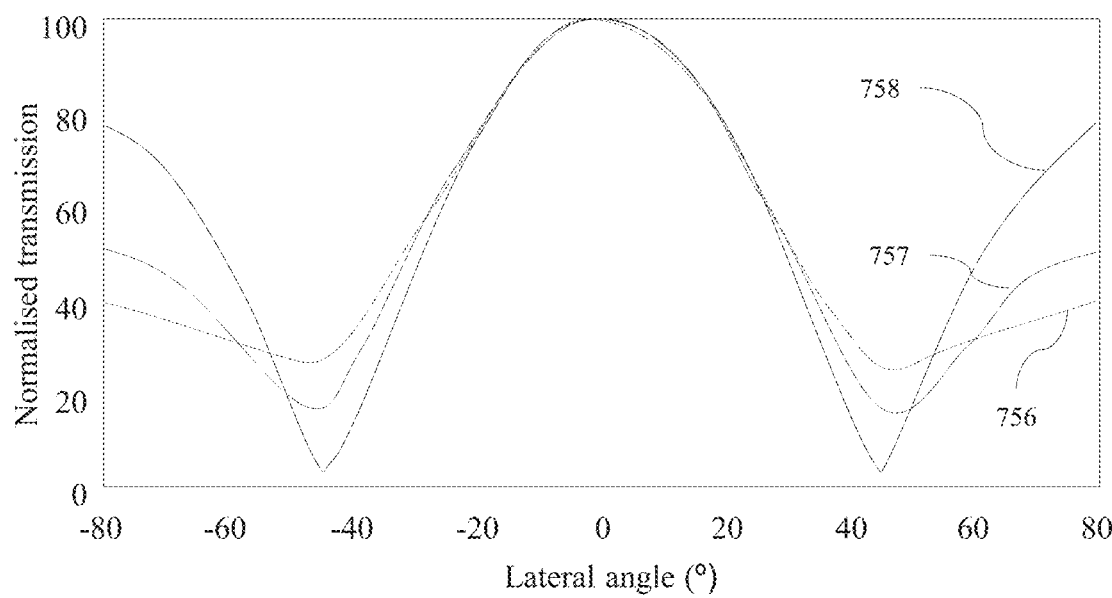
FIG. 4F is a schematic graph illustrating the simulated variation of normalised output transmission with lateral angle at zero elevation with varying concentration of dichroic dye for the transmitted light rays in FIG. 4A.

FIG. 4C is a schematic graph illustrating the simulated variation of output transmission with polar direction for the transmitted light rays in FIG. 4A with a first concentration of guest dichroic dye material; FIG. 4D is a schematic graph illustrating the simulated variation of output transmission with polar direction for the transmitted light rays in FIG. 4A with a second concentration of guest dichroic dye material; FIG. 4E is a schematic graph illustrating the simulated variation of output transmission with lateral angle at zero elevation with varying concentration of dichroic dye for the transmitted light rays in FIG. 4A; and FIG. 4F is a schematic graph illustrating the simulated variation of normalised output transmission with lateral angle at zero elevation with varying concentration of dichroic dye for the transmitted light rays in FIG. 4A, with the parameters described in TABLE 2.

TABLE 2

| FIG. | Mode | Passive compensation retarder(s) | | Guest-host liquid crystal retarder | | | | Additional polariser |
|---|---|---|---|---|---|---|---|---|
| | | Type | $\Delta n.d/$ nm | Order parameter | Guest-host concentration | LC tilt/ deg | $\Delta n.d/$ nm | |
| 4B 4E & 4F profile 758 | Privacy | None | 0 | 0.8 | 0% | 65 | 810 | Yes |

TABLE 2-continued

| FIG. | Mode | Passive compensation retarder(s) Type | Δn.d/ nm | Guest-host liquid crystal retarder Order parameter | Guest-host concentration | LC tilt/ deg | Δn.d/ nm | Additional polariser |
|---|---|---|---|---|---|---|---|---|
| 4C |  |  |  |  | 0.5% |  |  |  |
| 4E & 4F profile 757 |  |  |  |  |  |  |  |  |
| 4D |  |  |  |  | 1.0% |  |  |  |
| 4E & 4F profile 756 |  |  |  |  |  |  |  |  |

In comparison to the output of FIG. 4B, the dichroic dye 414B advantageously reduces the visibility of the 'bulls-eye' structure and increases the angular field of view over which privacy performance is maintained. Further in comparison to the arrangement of FIG. 3A, off-axis transmission is further reduced.

It would be desirable to further reduce the off-axis visibility of the display in privacy mode of operation while maintaining wide angle operation. The operation of the display of FIG. 1A in wide angle mode representing a first state will now be further described, in which an additional compensation retarder 330 is provided.

Figure 4G:
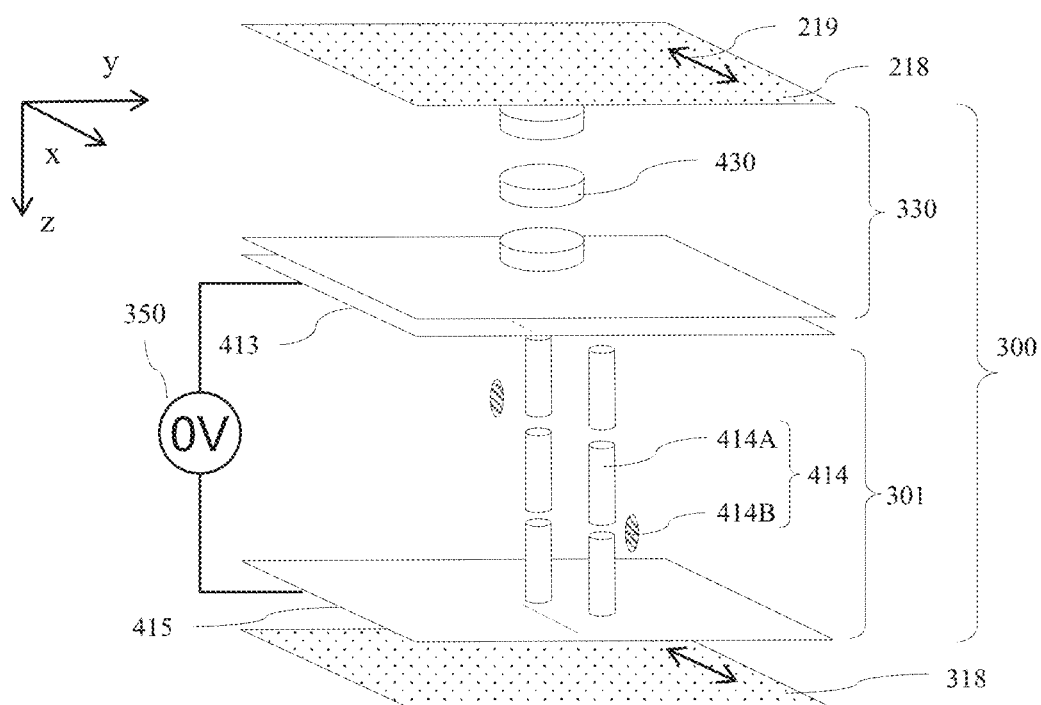
FIG. 4G is a schematic diagram illustrating in perspective side view an arrangement of a switchable compensated retarder comprising a negative C-plate in a wide angle mode of operation.

FIG. 4G is a schematic diagram illustrating in perspective side view an arrangement of the switchable guest-host retarder 300 in a wide angle mode of operation.

The switchable guest-host liquid crystal retarder 301 comprises two surface alignment layers disposed adjacent to the liquid crystal material 414 on opposite sides thereof and arranged to provide homeotropic alignment at the adjacent liquid crystal material 414. As described above, the liquid crystal material 414 may be provided with a pretilt, for example 88 degrees from the horizontal to remove degeneracy of liquid crystal material 414 alignment.

The passive compensation retarder 330 comprises a negative C-plate retarder having an optical axis that is a fast axis perpendicular to the plane of the retarder. Thus the material 430 of the C-plate retarder may have a negative dielectric anisotropy. C-plates may comprise transparent birefringent materials such as: polycarbonates or reactive mesogens that are cast onto a substrate that provides homeotropic alignment for example; Zeonex™ Cyclo Olefin Polymer (COP); discotic polymers; and Nitto Denko double stretched polycarbonates.

Such arrangements not incorporating dye materials 414B are illustrated in U.S. Patent Publ. No. 2019-0086706, which is herein incorporated by reference in its entirety.

The present embodiments achieve substantially similar off-axis luminance reductions due to the bulk retardance properties of the host liquid crystal material 414A. Further the off-axis luminance reductions due to the aligned guest dye materials 414B are provided in such embodiments. Advantageously off-axis luminance may be further reduced.

Figure 4H:
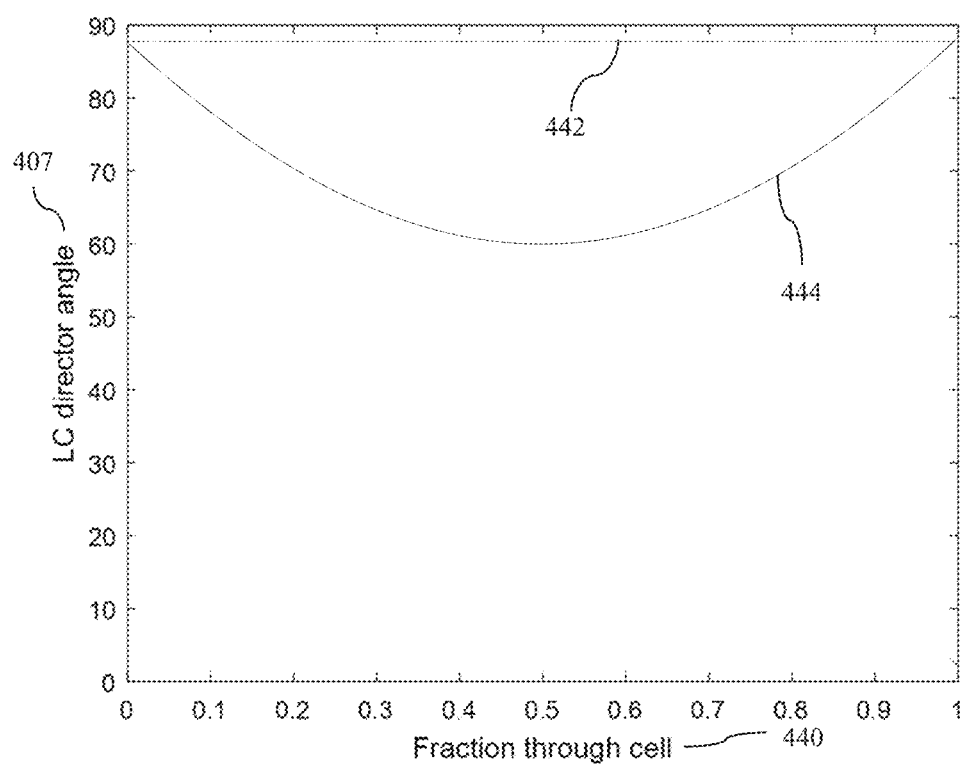
FIG. 4H is a schematic diagram illustrating a graph of liquid crystal director angle against fractional location through the switchable liquid crystal retarder cell.

FIG. 4H is a schematic diagram illustrating a graph of liquid crystal director angle 407 against fractional location 440 through the switchable liquid crystal retarder cell, where the fractional location 440 varies between 0 for a location at the surface alignment layer 409 and 1 for a location at the surface alignment layer 411.

For a vertically aligned state with no voltage applied as illustrated in FIG. 4G, the liquid crystal directors are at a tilt 407 of 88 degrees through the thickness of the cell as indicated by tilt profile 442. The tilt profile for the layer 314 may be the same as the profile 442. The compensation retarder 330 may provide correction for the pretilt direction of the switchable guest-host liquid crystal retarder 301. The compensation retarder 330 may alternatively have a uniform tilt angle of 90 degrees, such difference from the pretilt of the liquid crystal layer providing only small difference in off-axis viewing properties.

Thus the off-axis retardance of the compensation retarder 330 is substantially equal and opposite to the off-axis retardance of the switchable guest-host liquid crystal retarder 301 when no voltage is applied.

Figure 4I:
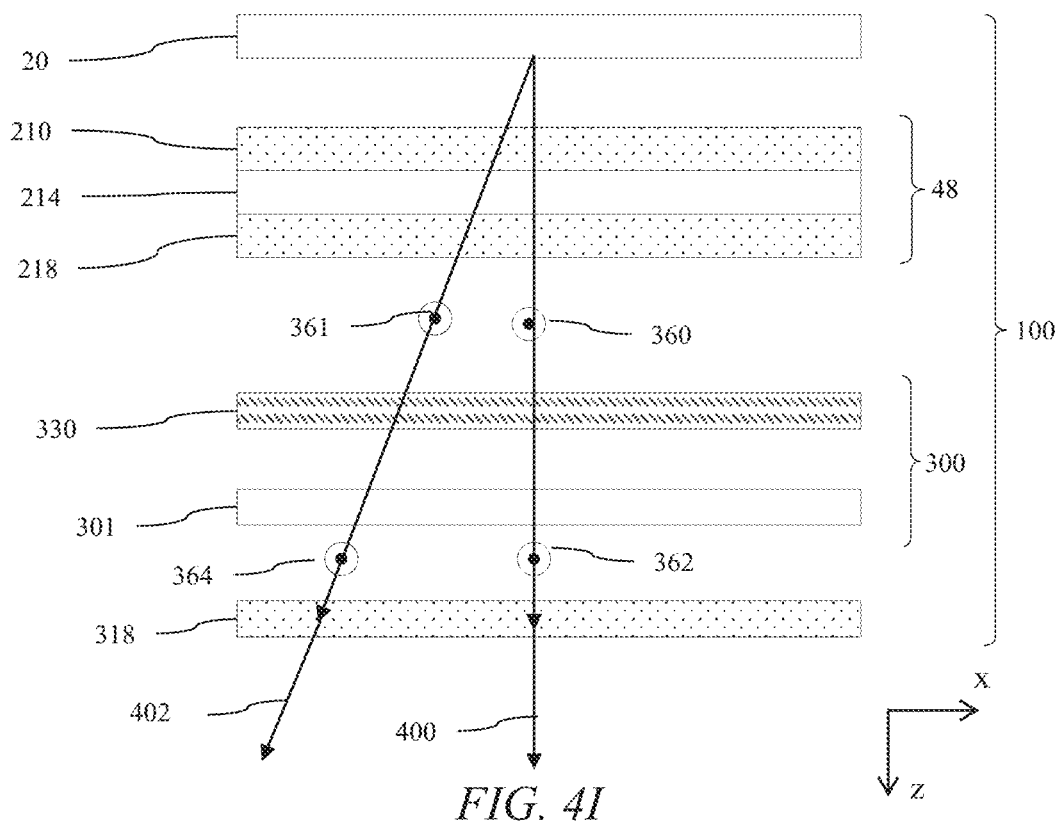
FIG. 4I is a schematic diagram illustrating in side view propagation of output light from a spatial light modulator through the optical stack of FIG. 4G in a wide angle mode of operation.
Figure 4J:
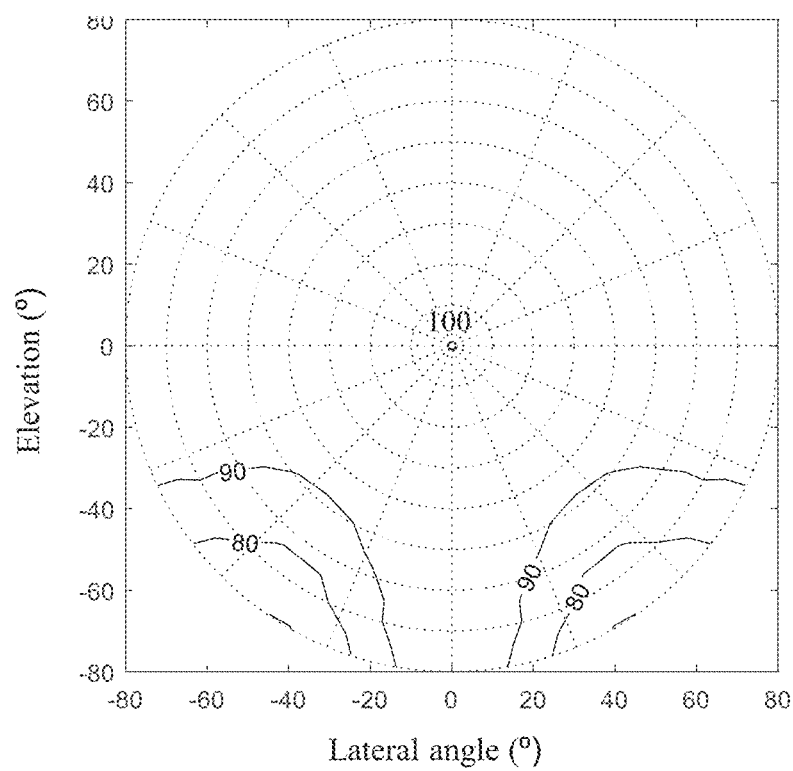
FIG. 4J is a schematic graph illustrating the variation of output transmission with polar direction for the transmitted light rays in FIG. 4I.

FIG. 4I is a schematic diagram illustrating in side view propagation of output light from the spatial light modulator 48 through the optical stack of FIG. 1A in a wide angle mode of operation; and FIG. 4J is a schematic graph illustrating the variation of output transmission with polar direction for the transmitted light rays in FIG. 4I in a wide angle mode of operation.

An ideal compensated switchable retarder 300 comprises compensation retarder 330 in combination with a variable switchable guest-host liquid crystal retarder 301 wherein the dielectric constants, anisotropy and dispersion of anisotropy of the compensation retarder 330 have the equal and opposite dielectric constants, anisotropy and dispersion of anisotropy to that of the layer 314. The retardance of the passive compensation retarder 330 is equal and opposite to the retardance of the switchable guest-host liquid crystal retarder 301.

Such an ideal compensated switchable retarder achieves compensation for transmitted light in a first wide angle state of the layer 314 of liquid crystal material 414 for all polar angles; and narrow field of view in a lateral direction in a second privacy state of the switchable guest-host liquid crystal retarder 301.

Further the optical axis of compensation retarder 330 has the same direction as that of the optical axis of the guest-host liquid crystal retarder 301 in its wide angle state. Such a compensation retarder 330 cancels out the retardation of the liquid crystal retarder for all viewing angles, and provides an ideal wide angle viewing state with no loss of luminance for all viewing directions.

The wide angle transmission polar profile for non-ideal material selections will now be described.

The illustrative embodiments of the present disclosure illustrate compensation retarders 330 that may not exactly compensate the retardation of the switchable guest-host liquid crystal retarder 301 because of small differences in material properties that are typical for the retarders 330, 301. However, advantageously such deviations are small and high performance wide and narrow angle states can be achieved with such deviations that may be close to ideal performance.

Thus when the switchable guest-host liquid crystal retarder 301 is in a first state of said two states, the switchable guest-host retarder 300 provides no overall transformation of polarisation component 360, 361 to output light rays 400 passing there through perpendicular to the plane of the switchable retarder or at an acute angle to the perpendicular to the plane of the switchable retarder, such as for light rays 402.

Polarisation component 362 is substantially the same as polarisation component 360 and polarisation component 364 is substantially the same as polarisation component 361. Thus the angular transmission profile of FIG. 4J is substantially uniformly transmitting across a wide polar region.

In other words, when the layer of liquid crystal material 414 is in the first orientation state of said two orientation states, the plural retarders 330, 301 provide no overall retardance to light passing therethrough perpendicular to the plane of the retarders or at an acute angle to the perpendicular to the plane of the retarders 330, 301.

Advantageously the variation of display luminance with viewing angle in the first state is substantially unmodified. Multiple users may conveniently view the display from a wide range of viewing angles.

Further the wide angle profile of FIG. 3F is provided with such an arrangement due to the action of the guest dichroic material 414B. Thus the wide angle mode performance may be substantially unmodified by the dichroic material 414B. Advantageously a display that can be observed from a large field of view may be provided.

The operation of the guest-host retarder 300 and additional polariser 318 in a narrow angle mode for example for use in a privacy mode of operation will now be described.

Figure 5A:
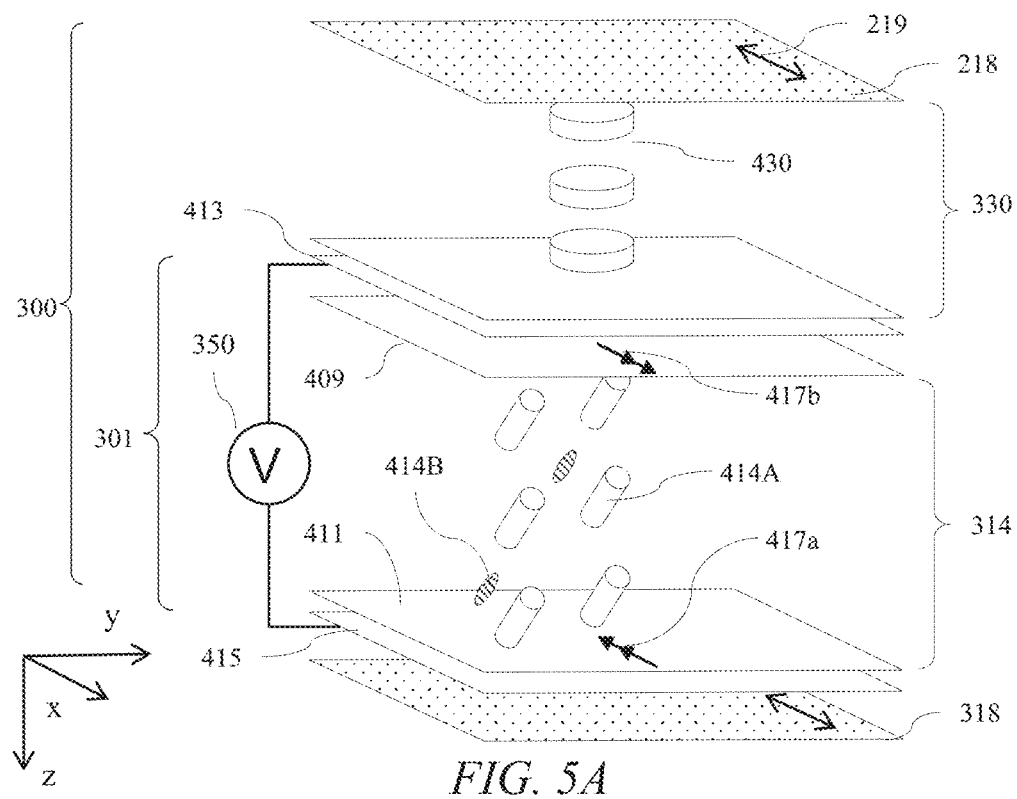
FIG. 5A is a schematic diagram illustrating in perspective side view an arrangement of a switchable compensated guest-host liquid crystal retarder comprising a negative C-plate in a privacy mode of operation.

FIG. 5A is a schematic diagram illustrating in perspective side view an arrangement of retarders 300 in a privacy mode of operation comprising a negative C-plate passive compensation retarder 330 and homeotropically aligned switchable guest-host liquid crystal retarder 301 in a privacy mode of operation.

The guest-host liquid crystal retarder 301 further comprises transparent electrodes 413, 415 such as ITO electrodes arranged on opposite sides of the switchable guest-host liquid crystal retarder 301. Electrodes 413, 415 control the switchable guest-host liquid crystal retarder 301 by adjusting the voltage being applied by the electrodes 413, 415 to the guest-host liquid crystal retarder 301. The applied voltage is capable of switching host material between at least two states, in one of which states the optical axis of the guest-host liquid crystal retarder has an alignment component perpendicular to the plane of the guest-host liquid crystal retarder 301.

Control system 352 is arranged to control the voltage applied by voltage driver 350 across the electrodes 413, 415 of the switchable guest-host liquid crystal retarder 301.

Returning to FIG. 4H, when a voltage is applied the splayed tilt profile 444 of is provided for switchable guest-host liquid crystal retarder 301 such that the retardance of the layer 314 of liquid crystal material 414 is modified.

The direction of optimum privacy performance may be adjusted in response to observer position by control of the drive voltage. In another use or to provide controlled luminance to off-axis observers for example in an automotive environment when a passenger or driver may wish some visibility of the displayed image, without full obscuration, by means of intermediate voltage levels.

Figure 5B:
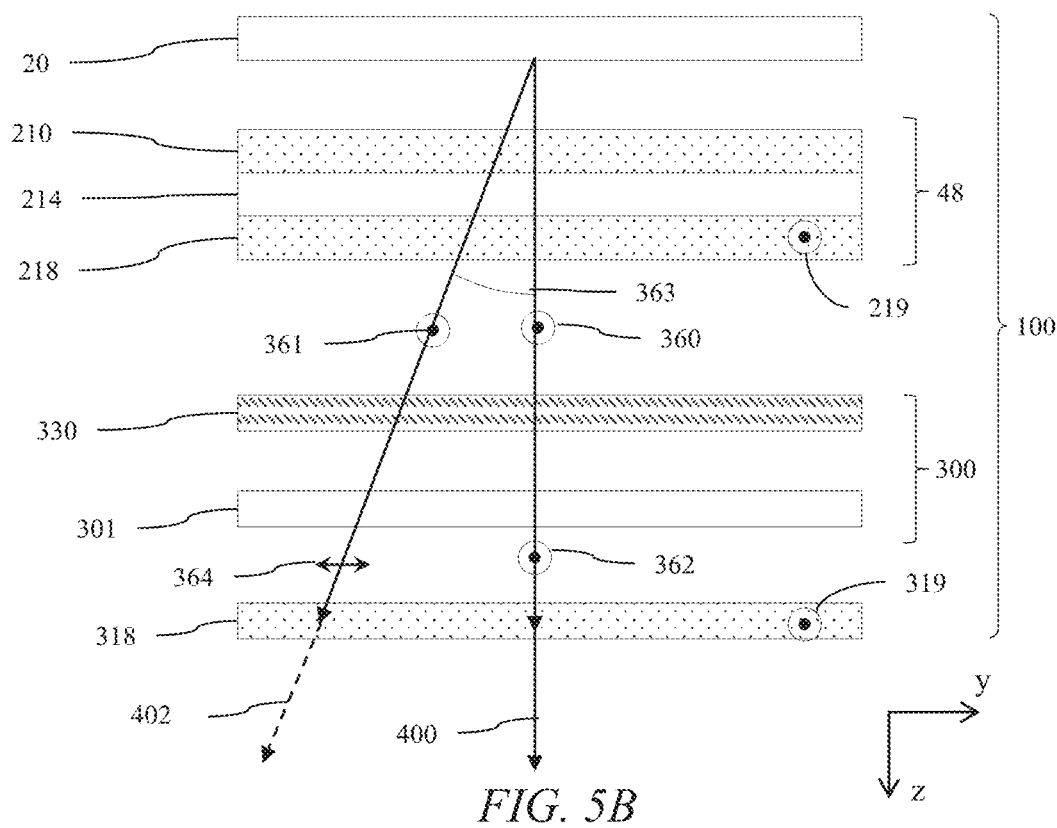
FIG. 5B is a schematic diagram illustrating in side view propagation of output light from a spatial light modulator through the optical stack of FIG. 5A in a privacy mode of operation.

FIG. 5B is a schematic diagram illustrating in side view propagation of output light from the spatial light modulator 48 through the optical stack of FIG. 1A in a privacy mode of operation wherein the switchable guest-host liquid crystal retarder 301 is oriented by means of an applied voltage.

In the present embodiments, the compensated switchable liquid crystal retarder 330 may be configured, in combination with the display polariser 210, 218, 316 and the additional polariser 318, to have the effect that the luminance of light output from the display device at an acute angle to the optical axis (off-axis) is reduced, i.e. compared to the retarder not being present. The compensated switchable liquid crystal retarder 330 may also be configured, in combination with the display polariser 210, 218, 316 and the additional polariser 318, to have the effect that the luminance of light output from the display device along the optical axis (on-axis) is not reduced, i.e. compared to the retarder not being present.

Polarisation component 360 from the output display polariser 218 is transmitted by output display polariser 218 and incident on switchable guest-host retarder 300. On-axis light has a polarisation component 362 that is unmodified from component 360 while off-axis light has a polarisation component 364 that is transformed by retarders of switchable guest-host retarder 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

Thus when the retarder switchable guest-host liquid crystal retarder 301 is in the second orientation state of said two orientation states, the plural retarders 301, 330 provide no overall retardance to light passing therethrough along an axis perpendicular to the plane of the retarders, but provides a non-zero overall retardance to light passing therethrough for some polar angles 363 that are at an acute angle to the perpendicular to the plane of the retarders 301, 330.

In other words when the switchable guest-host liquid crystal retarder 301 is in a second state of said two states, the switchable compensated retarder 330 provides no overall transformation of polarisation component 360 to output light rays 400 passing therethrough along an axis perpendicular to the plane of the switchable retarder 301, but provides an overall transformation of polarisation component 361 to light rays 402 passing therethrough for some polar angles which are at an acute angle to the perpendicular to the plane of the retarders 301, 330.

An illustrative material system will be described for narrow angle operation.

Figure 5C:
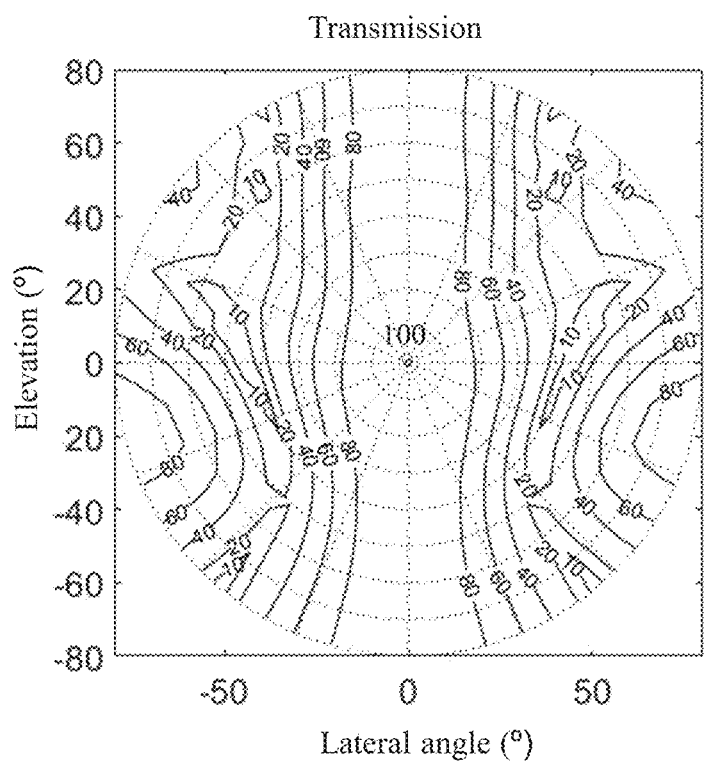
FIG. 5C is a schematic graph illustrating the simulated variation of output transmission with polar direction for the transmitted light rays in FIG. 5B with no guest dichroic dye material.
Figure 5D:
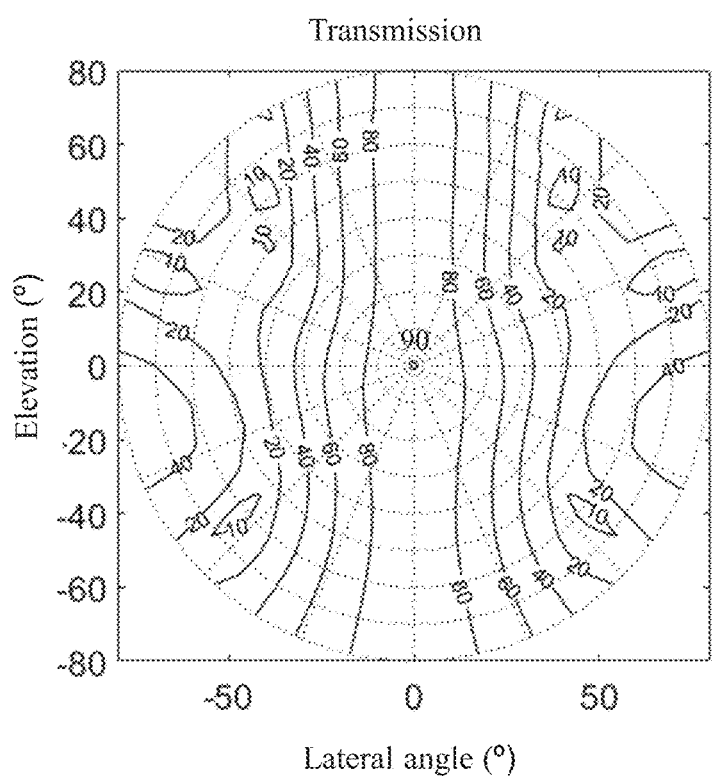
FIG. 5D is a schematic graph illustrating the simulated variation of output transmission with polar direction for the transmitted light rays in FIG. 5B with a first concentration of guest dichroic dye material.
Figure 5E:
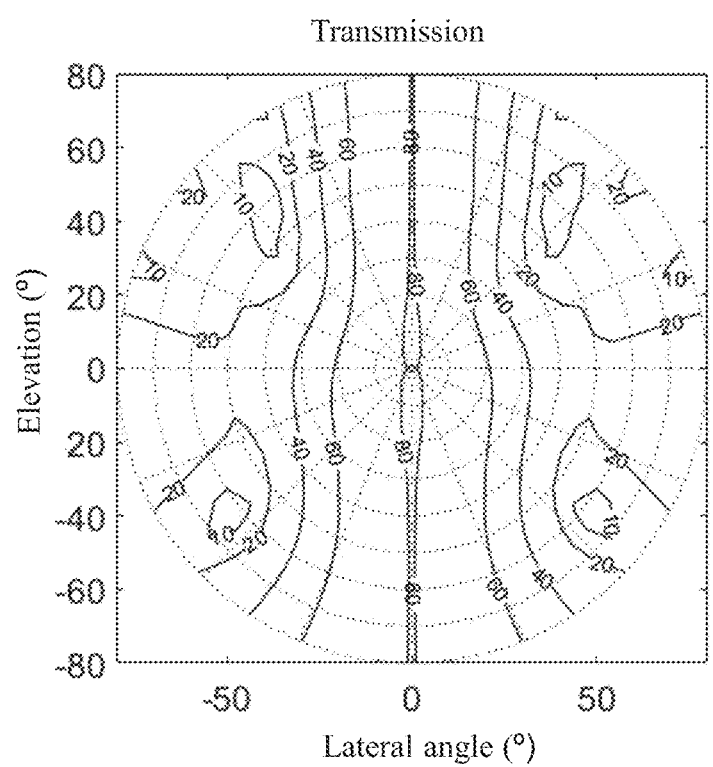
FIG. 5E is a schematic graph illustrating the simulated variation of output transmission with polar direction for the transmitted light rays in FIG. 5B with a second concentration of guest dichroic dye material.

FIG. 5C, FIG. 5D and FIG. 5E are schematic graphs illustrating the variation of output transmission with polar direction for the transmitted light rays in FIG. 5B, with the parameters described in TABLE 3.

TABLE 3

| FIG. | Mode | Passive compensation retarder(s) Type | Δn.d/ nm | Guest-host liquid crystal retarder Order parameter | Guest-host concentration | LC tilt/ deg | Δn.d/ nm | Additional polariser |
|---|---|---|---|---|---|---|---|---|
| 5C | Privacy | Negative C | −700 | 0.8 | 0% | 65 | 810 | Yes |
| 5D | | | | | 0.5% | | | |
| 5E | | | | | 1.0% | | | |
| 4J | Wide | | | | 0.0% | 0 | | |

In the present embodiments, desirable ranges for retardations and voltages have been established by means of simulation of retarder stacks and experiment with display optical stacks.

The switchable liquid crystal retarder 300 comprises a first surface alignment layer 409 disposed on a first side of the layer of liquid crystal material 414, and a second surface alignment layer 411 disposed on the second side of the layer of liquid crystal material 414 opposite the first side; wherein the first surface alignment layer 409 is a homeotropic alignment layer and the second surface alignment layer 411 is a homeotropic alignment layer, wherein the layer of liquid crystal material has an retardance for light of a wavelength of 550 nm between 500 nm and 1000 nm, preferably between 600 nm and 900 nm and most preferably between 700 nm and 850 nm.

When the passive compensation retarder 330 comprises a retarder having an optical axis perpendicular to the plane of the retarder, the passive retarder has a retardance for light of a wavelength of 550 nm between −300 nm and −900 nm, preferably between −450 nm and −800 nm and most preferably between −500 nm and −725 nm.

In comparison to the output of FIG. 4B the polar distribution of light transmission illustrated in FIG. 5C modifies the polar distribution of luminance output from the underlying spatial light modulator 48 and where applicable the backlight 20.

Considering now the addition of guest dichroic dye material 414B, in comparison to the output of FIG. 4C the profile of FIG. 5D provides increased luminance reduction over a wider field of view.

Advantageously off-axis luminance may be further reduced. A privacy display is provided that has low luminance to an off-axis snooper while maintaining high luminance for an on-axis observer. A large polar region is provided over which the luminance of the display to an off-axis snooper is reduced. Further the on-axis luminance is substantially unaffected for the primary display user in privacy mode of operation.

The voltage applied across the electrodes is zero for the first orientation state and non-zero for the second orientation state. Advantageously the wide mode of operation may have no additional power consumption, and the failure mode for driving of the switchable guest-host liquid crystal retarder 301 is for wide angle mode.

In the further exemplary embodiments described below comprising guest-host liquid crystal retarders, such guest material may serve to further reduce off-axis luminance in privacy mode while having a smaller effect on the wide angle mode of operation. Unless otherwise stated, the field-of-view profiles below are provided for no added guest material 414B, however, the trends as illustrated above in regards to the addition of additional polarisers 318, compensation retarders 330 and varying concentration of guest material 414B apply to provide reduced off-axis luminance.

The operation of the privacy mode of the display of FIG. 1A will now be described further.

Figure 6A:
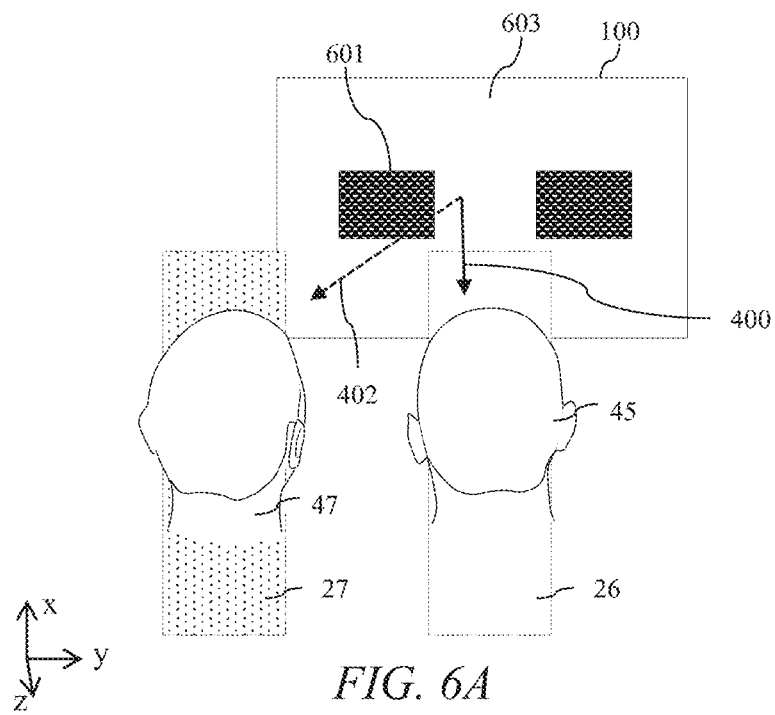
FIG. 6A is a schematic diagram illustrating in front perspective view observation of transmitted output light for a display operating in privacy mode.

FIG. 6A is a schematic diagram illustrating in front perspective view observation of transmitted output light for a display operating in privacy mode. Display device 100 may be provided with white regions 603 and black regions 601. A snooper may observe an image on the display if luminance difference between the observed regions 601, 603 can be perceived. In operation, primary user 45 observes a full luminance images by rays 400 to viewing locations 26 that may be optical windows of a directional display. Snooper 47 observes reduced luminance rays 402 in viewing locations 27 that may be optical windows of a directional display. Regions 26, 27 further represent on-axis and off-axis regions of FIG. 5C.

Figure 6B:
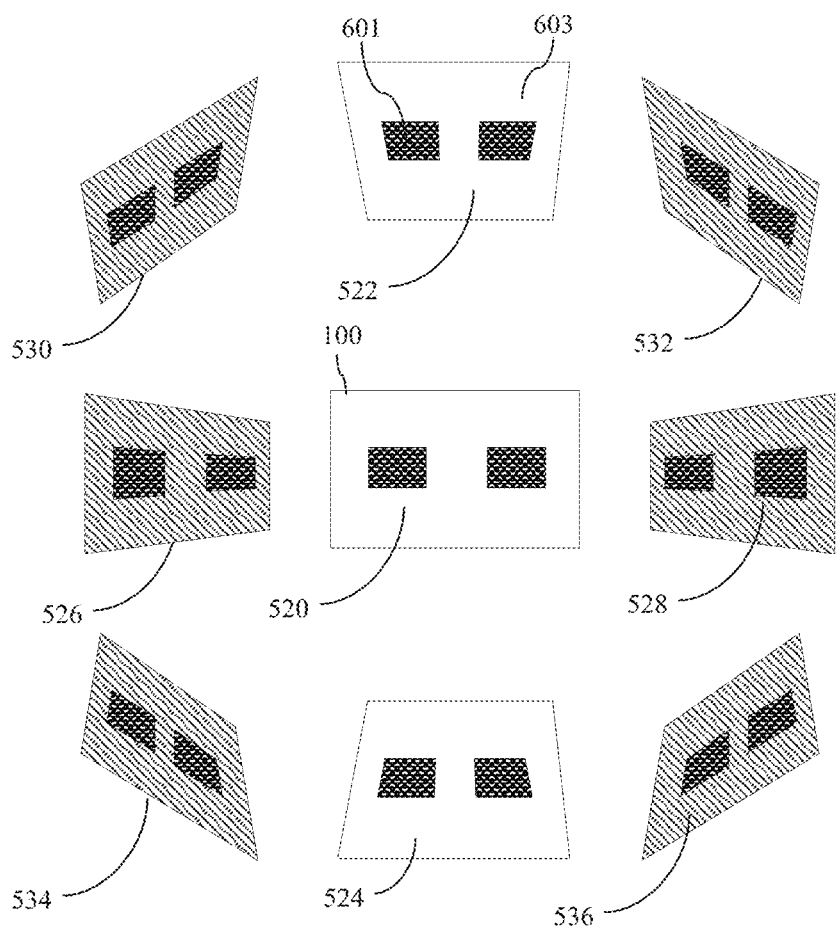
FIG. 6B is a schematic diagram illustrating in front perspective views the appearance of the display of FIGS. 1A-1C operating in privacy mode.

FIG. 6B is a schematic diagram illustrating in front perspective views the appearance of the display of FIG. 1A operating in privacy mode 1 with luminance variations as illustrated in FIG. 5C. Thus upper viewing quadrants 530, 532, lower viewing quadrants 534, 536 and lateral viewing positions 526, 528 provide reduced luminance, whereas up/down central viewing regions 522, 520 and head-on viewing provides much higher luminance.

It may be desirable to provide controllable display illumination in an automotive vehicle.

Figure 6C:
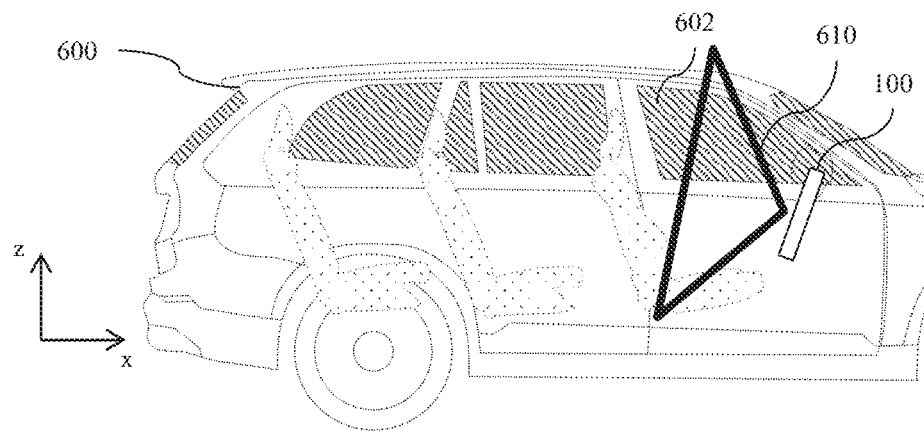
FIG. 6C is a schematic diagram illustrating in side view an automotive vehicle with a switchable directional display arranged within the vehicle cabin for both entertainment and sharing modes of operation.

FIG. 6C is a schematic diagram illustrating in side view an automotive vehicle with a switchable directional display 100 arranged within the vehicle cabin 602 of an automotive vehicle 600 for both entertainment and sharing modes of operation. Light cone 610 (for example representing the cone of light within which the luminance is greater than 50% of the peak luminance) may be provided by the luminance distribution of the display 100 in the elevation direction and is not switchable.

Figure 6D:
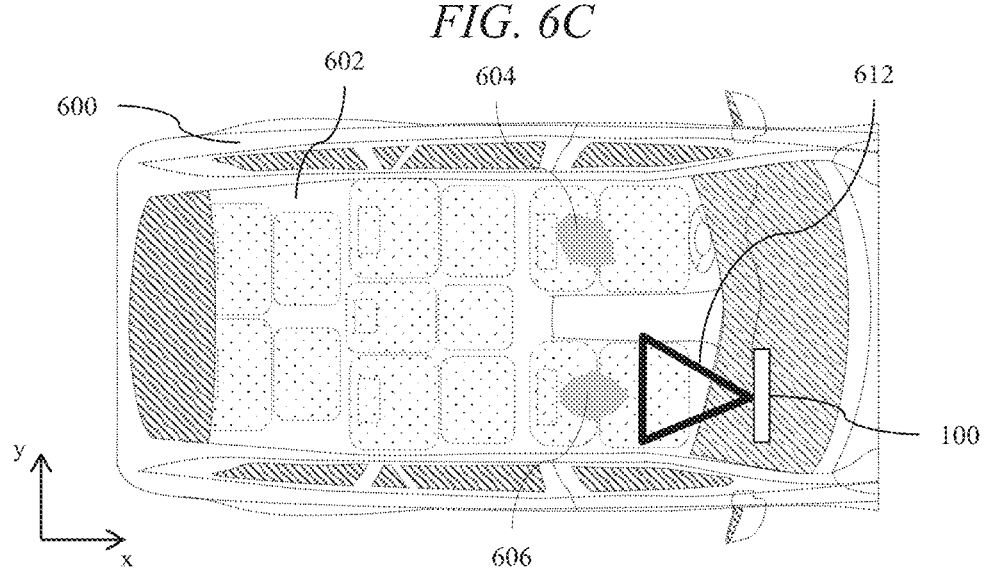
FIG. 6D is a schematic diagram illustrating in top view an automotive vehicle with a switchable directional display arranged within the vehicle cabin in an entertainment mode of operation.

FIG. 6D is a schematic diagram illustrating in top view an automotive vehicle with a switchable directional display 100 arranged within the vehicle cabin 602 in an entertainment mode of operation and operates in a similar manner to a privacy display. Light cone 612 is provided with a narrow angular range such that passenger 606 may see the display 100 whereas driver 604 may not see an image on the display 100. Advantageously entertainment images may be displayed to the passenger 606 without distraction to the driver 604.

Figure 6E:
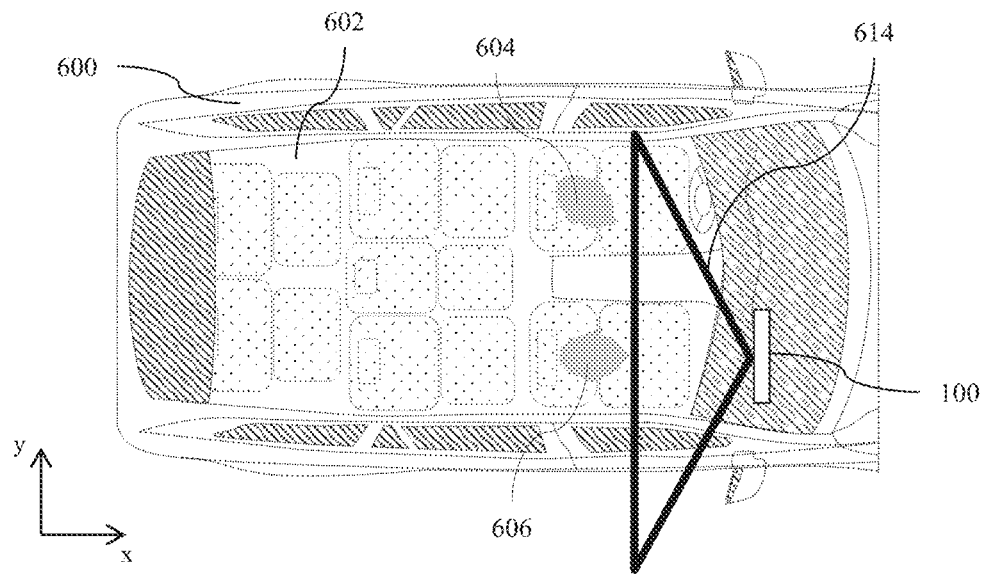
FIG. 6E is a schematic diagram illustrating in top view an automotive vehicle with a switchable directional display arranged within the vehicle cabin in a sharing mode of operation.

FIG. 6E is a schematic diagram illustrating in top view an automotive vehicle with a switchable directional display 100 arranged within the vehicle cabin 602 in a sharing mode of operation. Light cone 614 is provided with a wide angular range such that all occupants may perceive an image on the display 100, for example when the display is not in motion or when non-distracting images are provided.

Figure 6F:
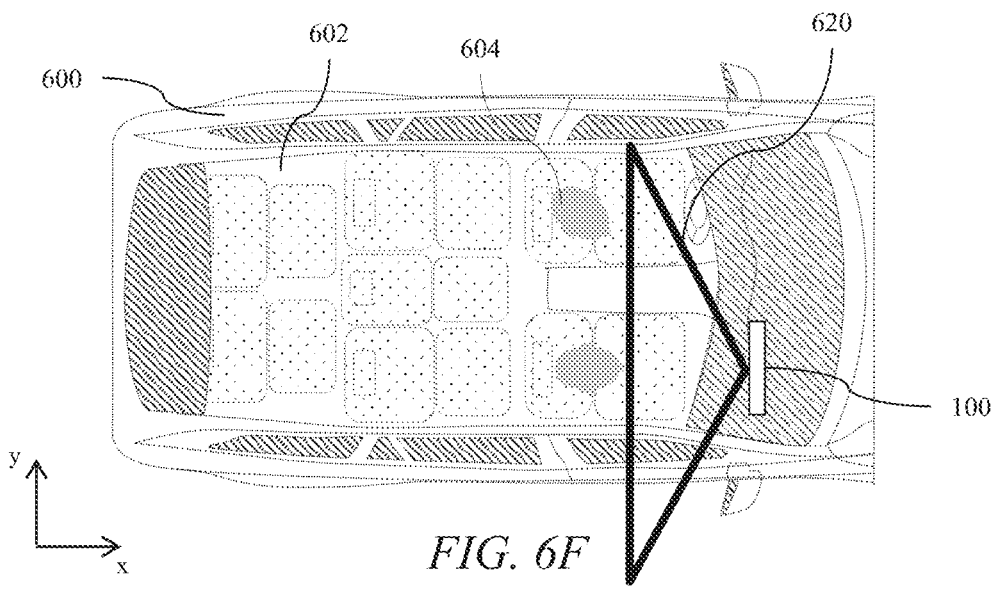
FIG. 6F is a schematic diagram illustrating in top view an automotive vehicle with a switchable directional display arranged within the vehicle cabin for both night-time and day-time modes of operation.

FIG. 6F is a schematic diagram illustrating in top view an automotive vehicle with a switchable directional display 100 arranged within the vehicle cabin 602 for both night-time and day-time modes of operation. In comparison to the arrangements of FIGS. 6C-E, the optical output is rotated so that the display elevation direction is along an axis between the driver 604 and passenger 606 locations. Light cone 620 illuminates both driver 604 and passenger 606.

Figure 6G:
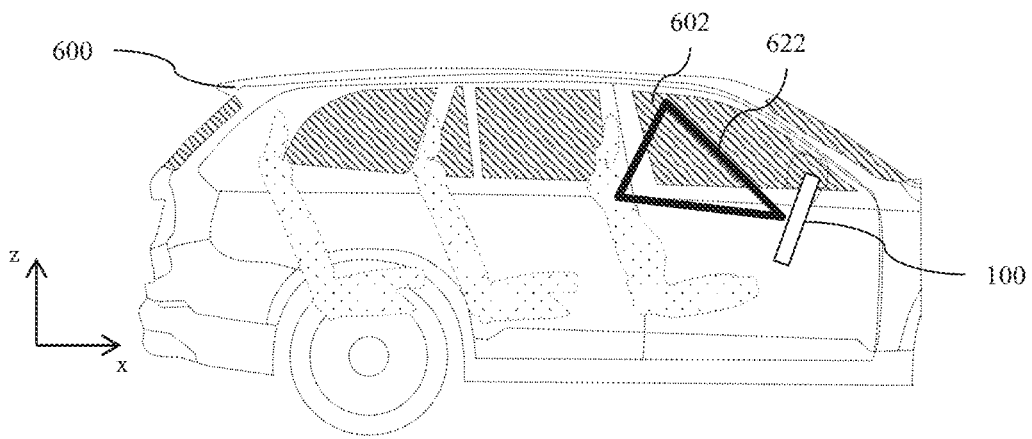
FIG. 6G is a schematic diagram illustrating in side view an automotive vehicle with a switchable directional display arranged within the vehicle cabin in a night-time mode of operation.

FIG. 6G is a schematic diagram illustrating in side view an automotive vehicle with a switchable directional display 100 arranged within the vehicle cabin 602 in a night-time mode of operation. Thus the display may provide a narrow angular output light cone 622. Stray light that illuminates internal surfaces and occupants of the vehicle cabin 602 and cause distraction to driver 604 may advantageously be substantially reduced. Both driver 604 and passenger 606 may advantageously be able to observe the displayed images.

Figure 6H:
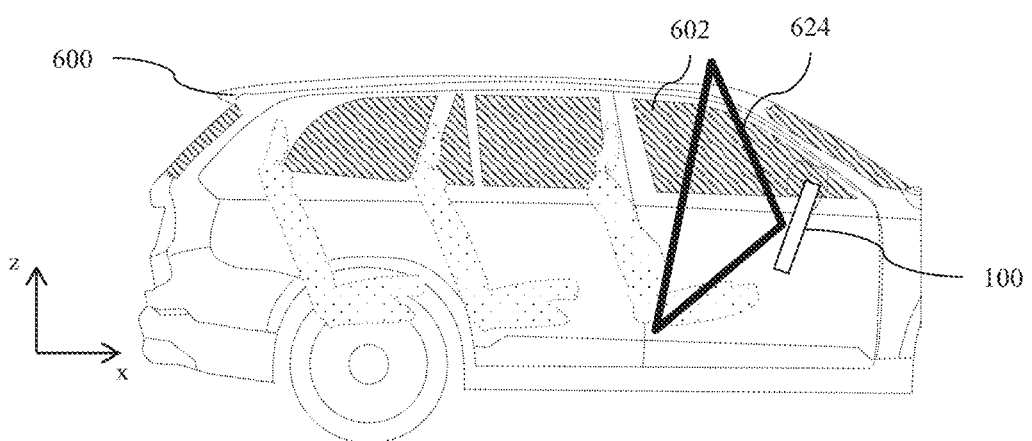
FIG. 6H is a schematic diagram illustrating in side view an automotive vehicle with a switchable directional display arranged within the vehicle cabin in a day-time mode of operation.
Figure 7A:
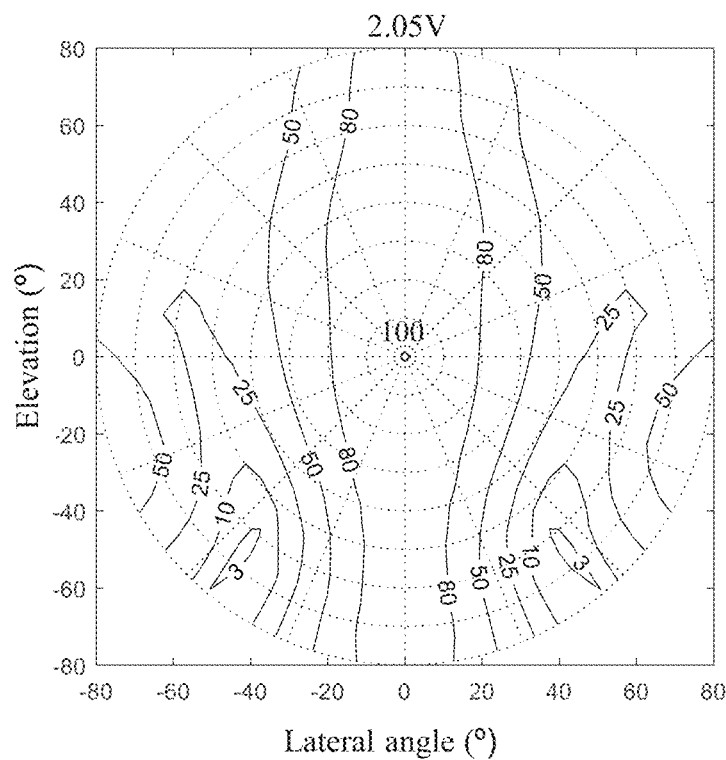
FIG. 7A, FIG. 7B, FIG. 7C, and FIG. 7D are schematic diagrams illustrating the variation of output transmission with polar direction for different drive voltages.
Figure 7B:
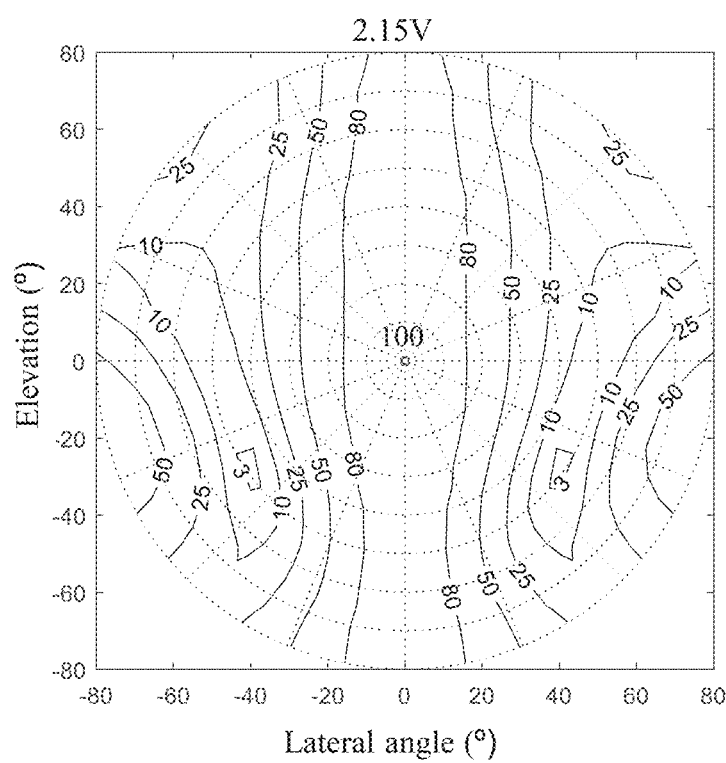
Figure 7C:
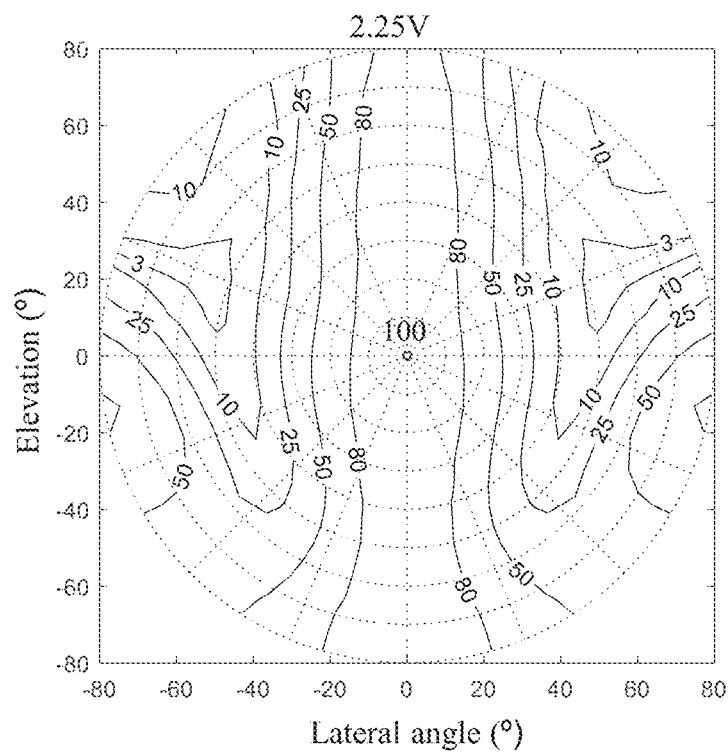
Figure 7D:
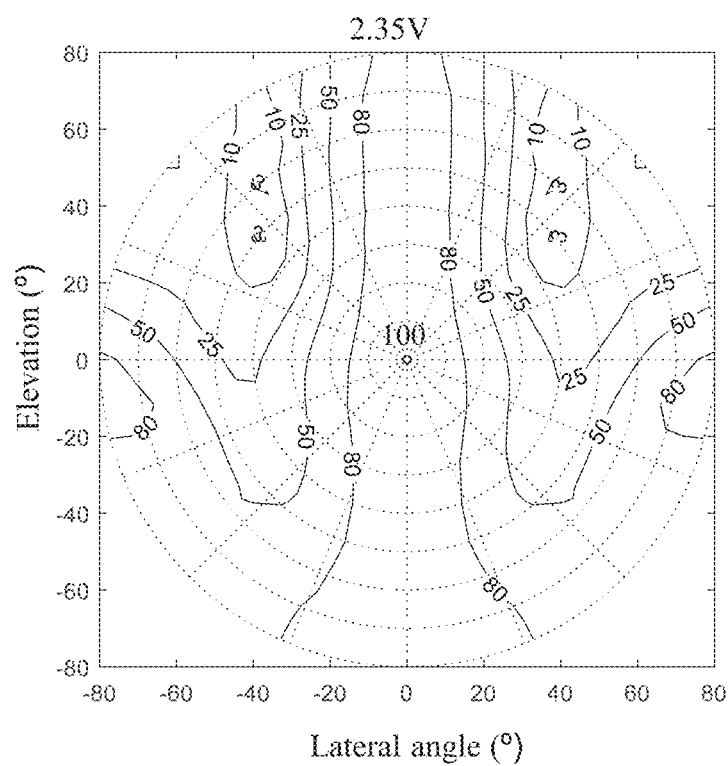

FIG. 6H is a schematic diagram illustrating in side view an automotive vehicle with a switchable directional display 100 arranged within the vehicle cabin 602 in a day-time mode of operation. Thus the display may provide a narrow angular output light cone 624. Advantageously the display may be conveniently observed by all cabin 602 occupants.

The displays 100 of FIGS. 6C-H may be arranged at other vehicle cabin locations such as driver instrument displays, centre console displays and seat-back displays.

FIGS. 7A-D are schematic diagrams illustrating the variation of output transmission with polar direction for four different drive voltages from 2.05V to 2.35V in 0.1V increments. Thus the applied voltage may provide control of the luminance field-of-view minima locations in the privacy mode of operation. Further the luminance minima may be controlled between an elevation that is zero or less to elevations that are in the upper quadrants of the polar profile.

Returning to the discussion of the present embodiments, further arrangements of compensated switchable retarders 300 will now be described.

Figure 8A:
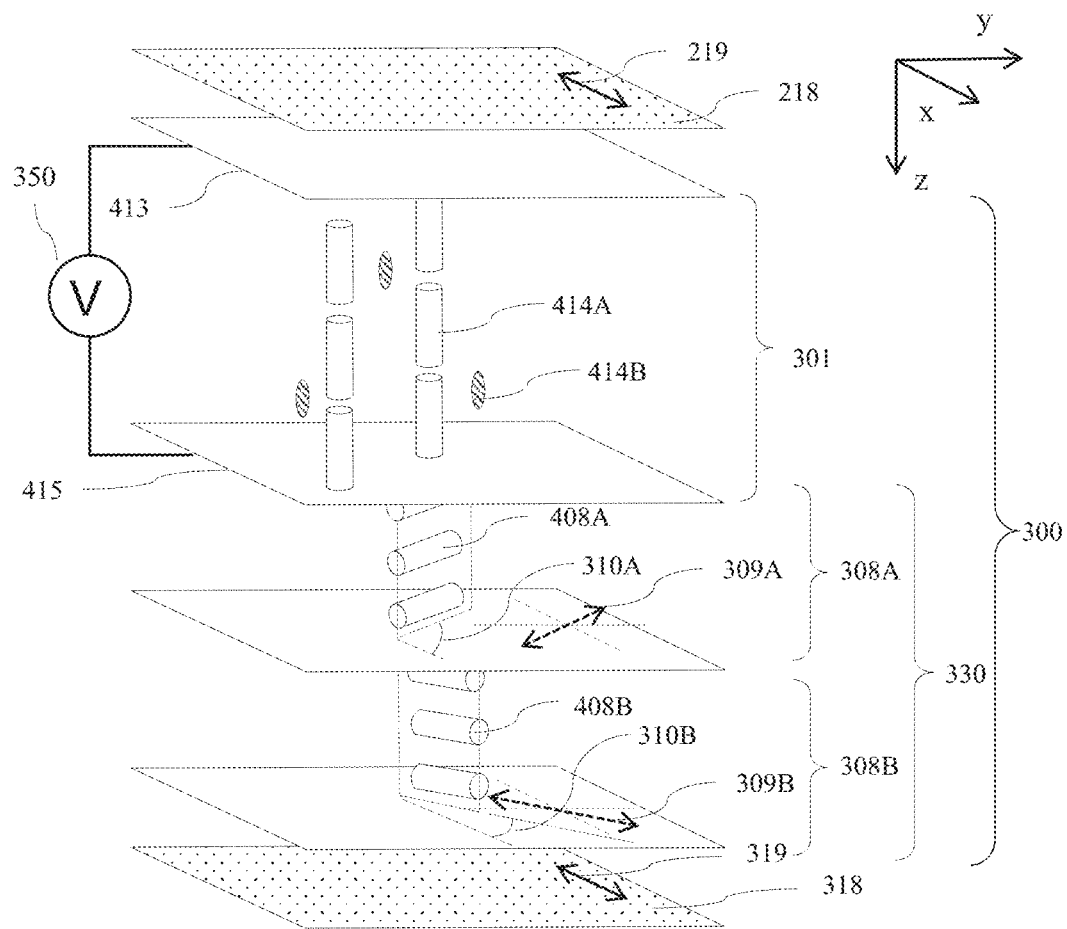
FIG. 8A is a schematic diagram illustrating in perspective side view an arrangement of a switchable compensated retarder in a wide angle mode of operation comprising crossed A-plate passive compensation retarders and homeotropically aligned switchable liquid crystal retarder.
Figure 8B:
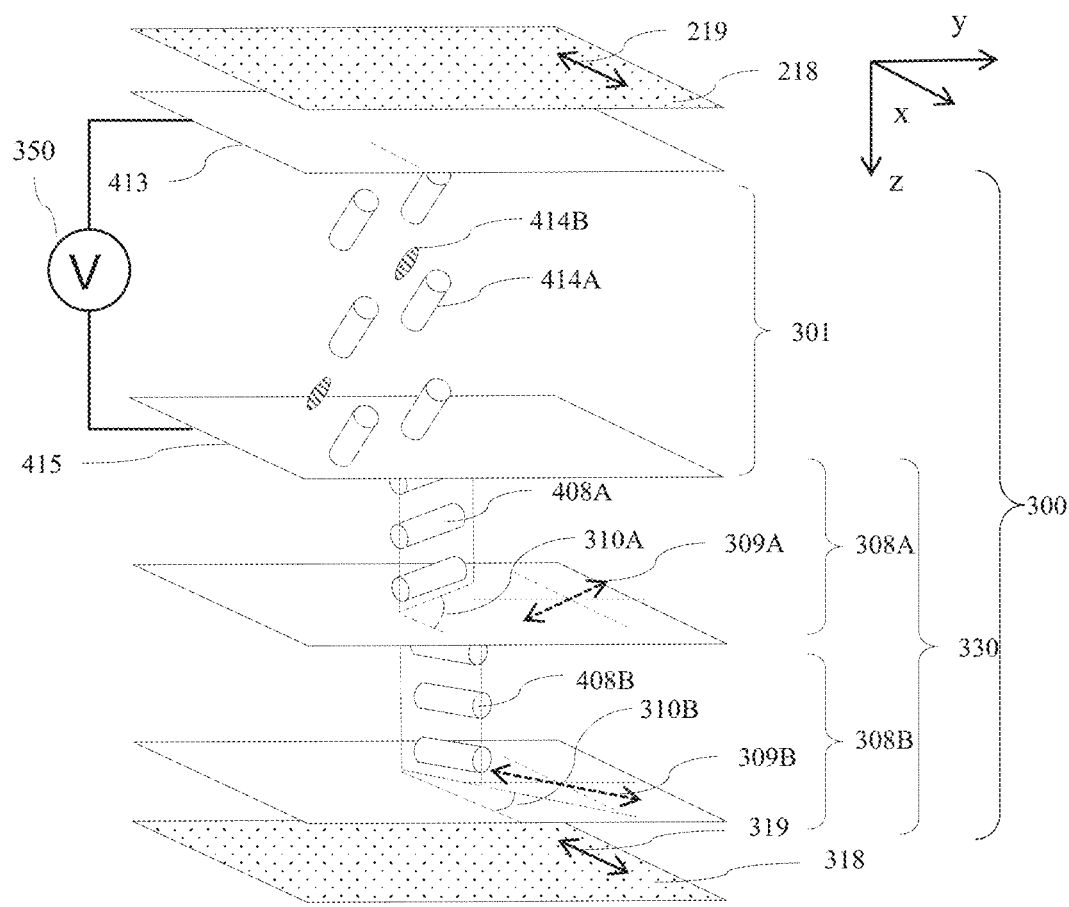
FIG. 8B is a schematic diagram illustrating in perspective side view an arrangement of a switchable compensated retarder in a privacy mode of operation comprising crossed A-plate passive compensation retarders and homeotropically aligned switchable liquid crystal retarder.

FIG. 8A is a schematic diagram illustrating in perspective side view an arrangement of a switchable retarder in a privacy mode of operation comprising crossed A-plate passive compensation retarders 308A, 308B and homeotropically aligned switchable guest-host liquid crystal retarder 301; and FIG. 8B is a schematic diagram illustrating in perspective side view an arrangement of a switchable compensated retarder in a privacy mode of operation comprising crossed A-plate passive compensation retarders and homeotropically aligned switchable liquid crystal retarder.

In comparison to the arrangement of FIG. 4G and FIG. 5A, the compensation retarder 330 may alternatively comprise a pair of retarders 308A, 308B which have optical axes in the plane of the retarders that are crossed. The compensation retarder 330 thus comprises a pair of retarders 308A, 308B that each comprise a single A-plate.

The pair of retarders 308A, 308B each comprise plural A-plates having respective optical axes 309A, 309B aligned at different angles with respect to each other. The pair of retarders have optical axes 309A, 309B that each extend at 45° with respect to an electric vector transmission direction that is parallel to the electric vector transmission direction 211 of the input display polariser 210 in the case that the additional polariser 318 is arranged on the input side of the input display polariser or is parallel to the electric vector transmission direction 219 of the output display polariser 218 in the case that the additional polariser 318 is arranged on the output side of the input display polariser 218.

Figure 9A:
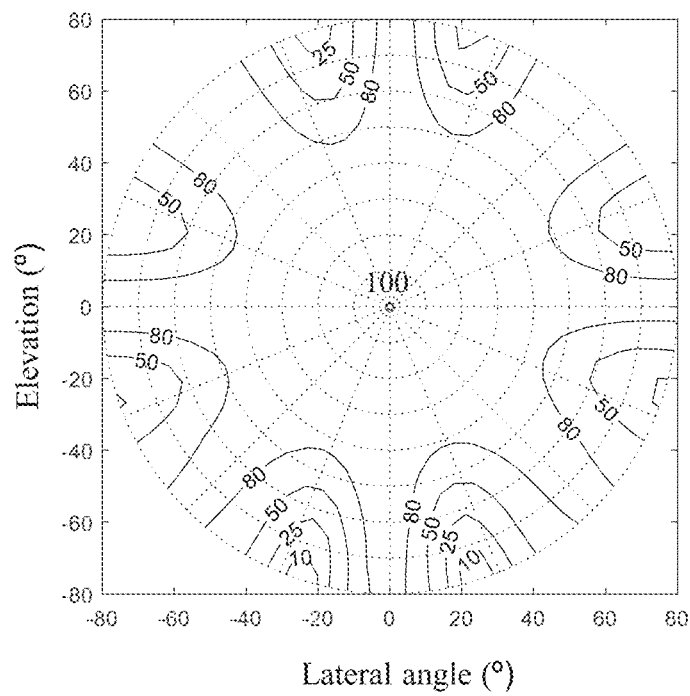
FIG. 9A is a schematic graph illustrating the variation of output transmission with polar direction for transmitted light rays in FIG. 8A in a wide angle mode of operation.
Figure 9B:
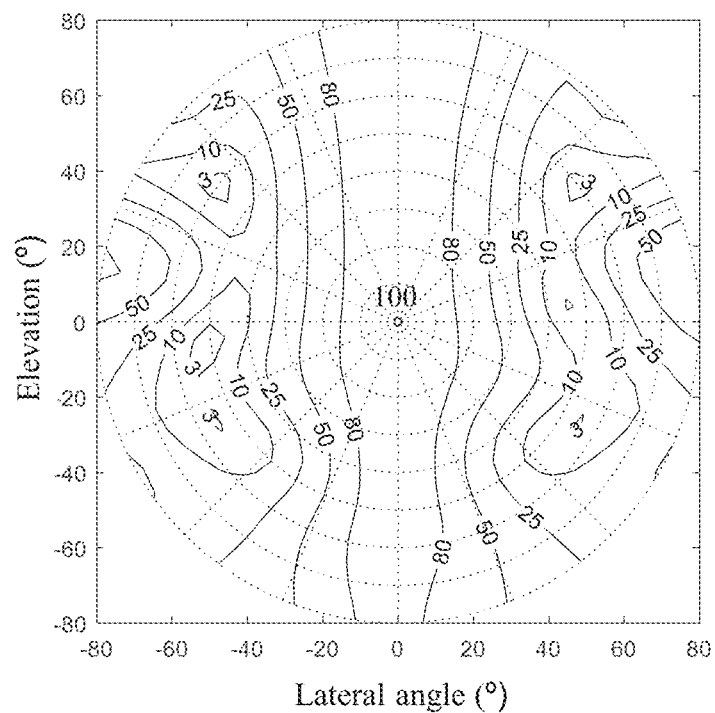
FIG. 9B is a schematic graph illustrating the variation of output transmission with polar direction for transmitted light rays in FIG. 8B in a privacy mode of operation.

FIG. 9A is a schematic graph illustrating the variation of output transmission with polar direction for transmitted light rays in FIG. 8A in a wide angle mode of operation; and FIG. 9B is a schematic graph illustrating the variation of output transmission with polar direction for transmitted light rays in FIG. 8B in a privacy mode of operation provided by the illustrative embodiment of TABLE 4.

TABLE 4

| FIG. | Mode | Passive compensation retarder(s) | | Active LC retarder | | | | |
| --- | --- | --- | --- | --- | --- | --- | --- | --- |
| | | Type | Δn.d/ nm | Alignment layers | Pretilt/ deg | Δn.d/ nm | Δε | Voltage/ V |
| 9A | Wide | Crossed A | +650 @ 45° | Homeotropic | 88 | 810 | −4.3 | 0 |
| 9D | Privacy | | +650 @ 135° | Homeotropic | 88 | | | 2.3 |

When the passive compensation retarder 330 comprises a pair of retarders which have optical axes in the plane of the retarders that are crossed, each retarder of the pair of retarders has a retardance for light of a wavelength of 550 nm between 300 nm and 800 nm, preferably between 500 nm and 700 nm and most preferably between 550 nm and 675 nm.

Advantageously A-plates may be more conveniently manufactured at lower cost than for the C-plate retarder of FIG. 4G and FIG. 5A. Further a zero voltage state may be provided for the wide angle mode of operation, minimising power consumption during wide angle operation.

In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle 310A is at least 35° and at most 55°, more preferably at least 40° and at most 50° and most preferably at least 42.5° and at most 47.5°. Preferably the angle 310B is at least 125° and at most 145°, more preferably at least 130° and at most 135° and most preferably at least 132.5° and at most 137.5°.

During mechanical distortion, such as when touching the display, the homeotropically aligned liquid crystal retarders 301 of FIGS. 9A-9B may have undesirably long recovery times creating visible misalignment artefacts. It would be desirable to provide fast recovery times after mechanical distortion.

Figure 10A:
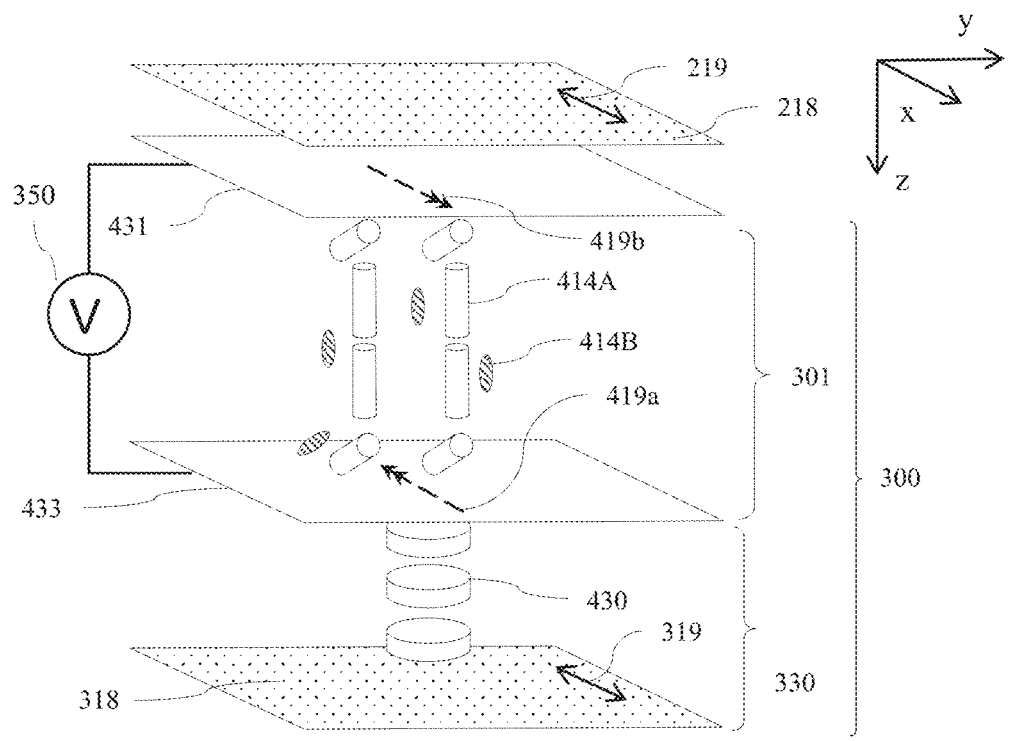
FIG. 10A and FIG. 10B are schematic diagrams illustrating in perspective side view an arrangement of a switchable compensated retarder in a wide angle mode and a privacy mode of operation respectively comprising a homogeneously aligned switchable liquid crystal retarder and a passive negative C-plate retarder.
Figure 10B:
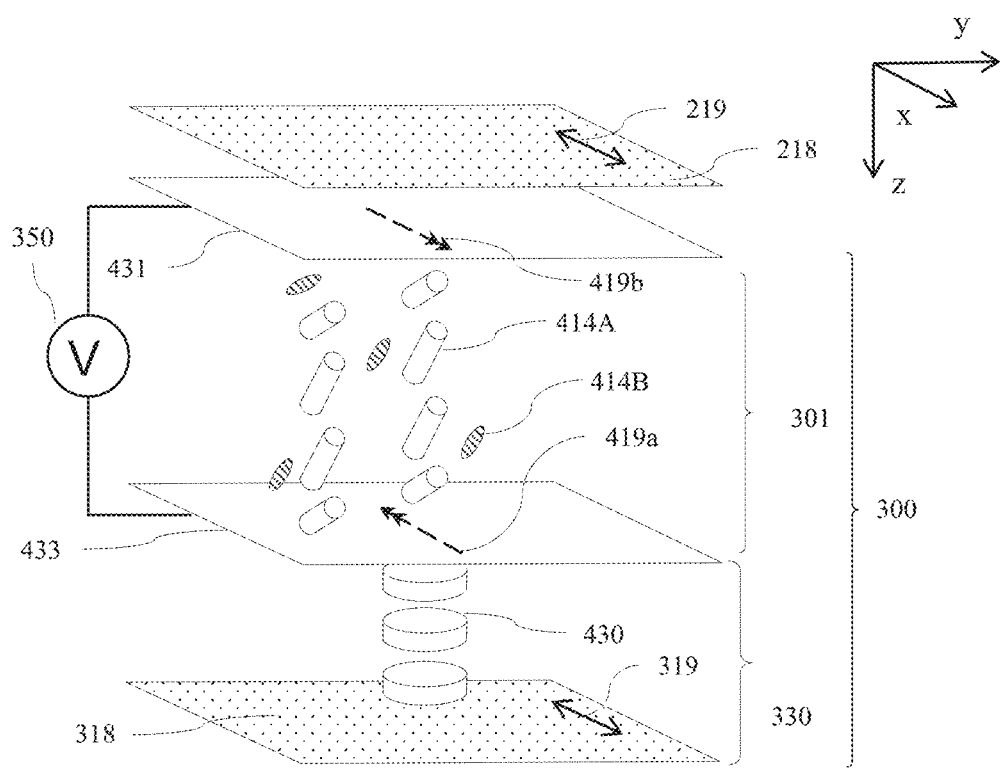

FIGS. 10A-10B are schematic diagrams illustrating in perspective side view an arrangement of a switchable retarder in a wide angle and privacy mode of operation respectively comprising a homogeneously aligned switchable liquid crystal retarder comprising liquid crystal material 414 with a positive dielectric anisotropy and a passive negative C-plate retarder 330 for first and second drive voltages respectively.

The switchable liquid crystal retarder further comprises surface alignment layers 431, 433 disposed adjacent to the layer of liquid crystal material 414 and each arranged to provide homogeneous alignment in the adjacent liquid crystal material. In other words, the switchable liquid crystal retarder comprises two surface alignment layers 431, 433 disposed adjacent to the layer of liquid crystal material 414 and on opposite sides thereof and each arranged to provide homogeneous alignment in the adjacent liquid crystal material 414.

Figure 10C:
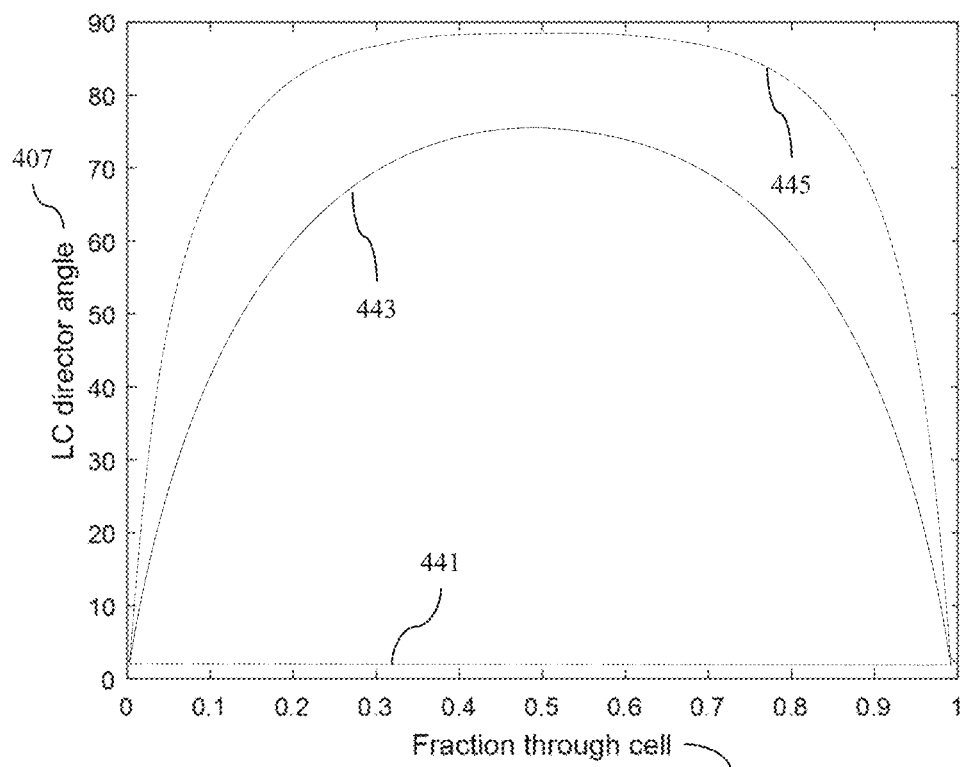
FIG. 10C is a schematic diagram illustrating a graph of liquid crystal director angle against fractional location through the switchable liquid crystal retarder cell of FIG. 10A for different applied voltages.

FIG. 10C is a schematic diagram illustrating a graph of liquid crystal director angle 407 against fractional location 440 through the switchable guest-host liquid crystal retarder 301 of FIG. 10A for various different applied voltages. FIG. 10C differs from FIG. 4H wherein the pretilt angle is small and increases with applied voltage. Profile 441 illustrates a liquid crystal material 414 tilt angle for 0V applied voltage, tilt profile 443 illustrates director orientations for 2.5V and tilt profile 445 illustrates director orientations for 5V. Thus the liquid crystal layers are typically splayed in desirable switched states, and compensated by the compensation retarders 330. Increasing the voltage above 2.5V to 10V progressively reduces the thickness of the retarder 301 in which splay is present, and advantageously increases the polar field of view over which the transmission is maximised.

Resolved component 419a, 419b of liquid crystal tilt compared to the direction perpendicular to the plane of the retarder is substantially higher than components 417a, 417b of FIG. 5A.

The increased magnitude of resolved component 419a, 419b may provide increased restoring force after mechanical distortion in comparison to the arrangement of FIG. 8A for example. Sensitivity to mechanical distortions such as during touching the display may advantageously be reduced.

The voltage of operation may be reduced below 10V for acceptable wide angle field of view, reducing power consumption; and reducing cost and complexity of electrical driving.

Figure 11A:
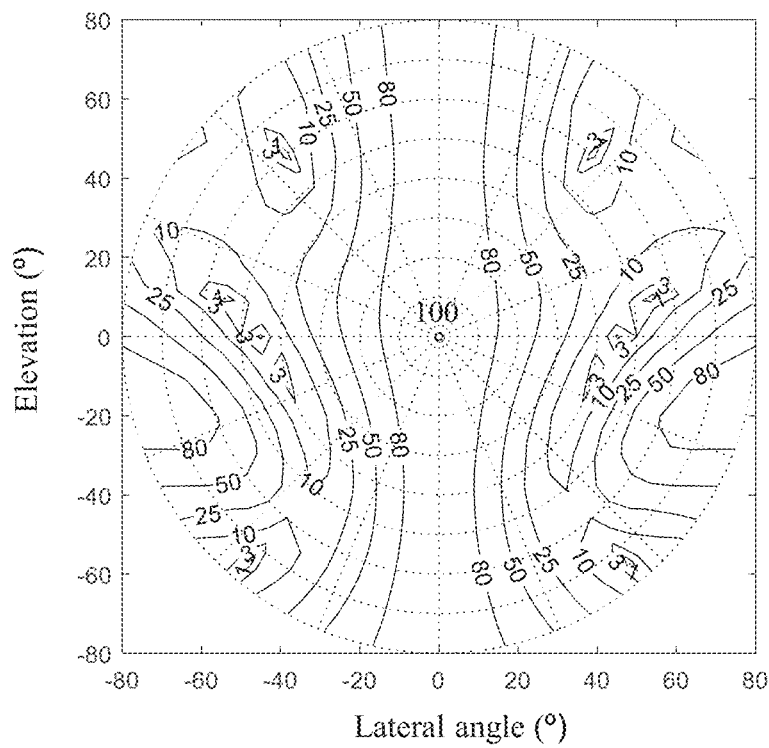
FIG. 11A, FIG. 11B, and FIG. 11C are schematic graphs illustrating the variation of output transmission with polar direction for transmitted light rays of switchable compensated retarder comprising a homogeneously aligned liquid crystal cell and a negative C-plate in a privacy mode and for two different wide angle mode addressing drive voltages respectively.
Figure 11B:
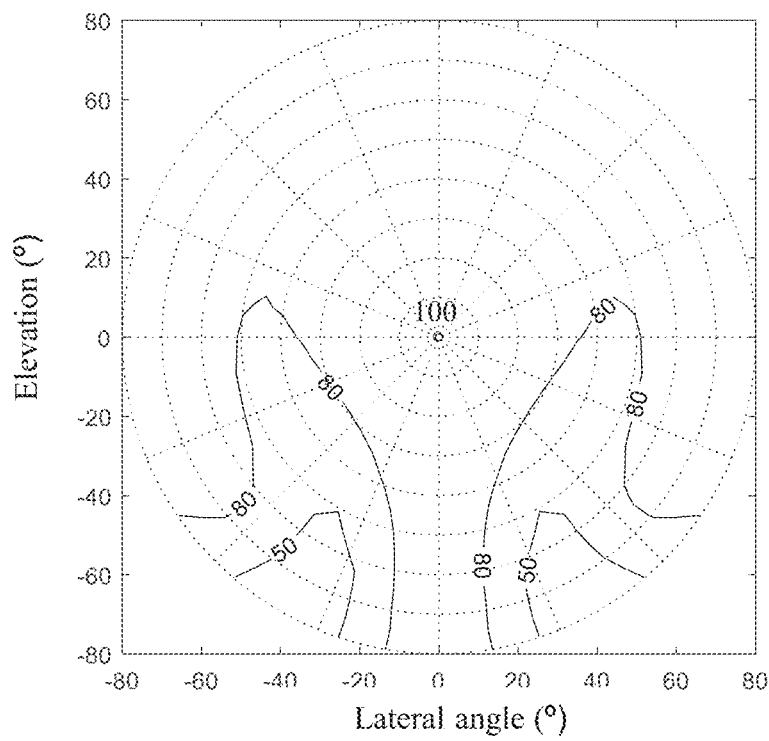
Figure 11C:
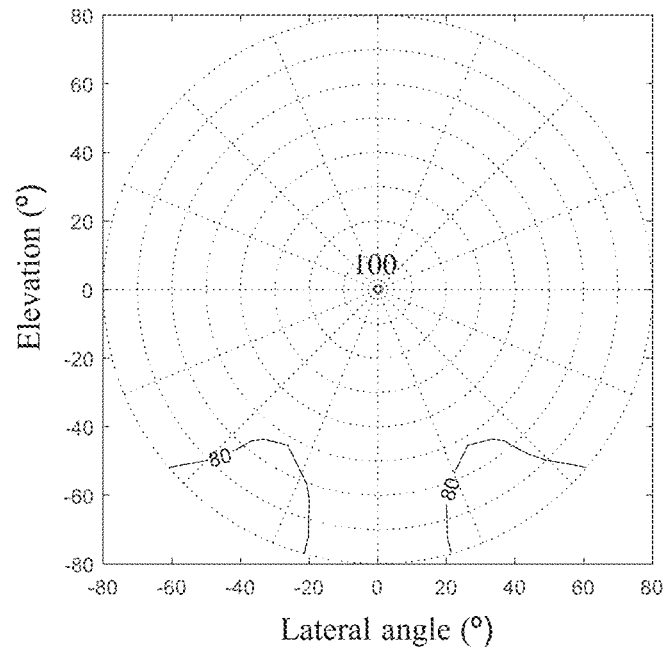

FIGS. 11A-11C are schematic graphs illustrating the variation of output transmission with polar direction for transmitted light rays of switchable compensated retarder comprising a homogeneously aligned guest-host liquid crystal retarder 301 and a passive negative C-plate compensation retarder 330, similar to the display device of FIGS. 10A and 10B, in a privacy mode and two different wide angle modes for different drive voltages comprising the embodiments illustrated in TABLE 5.

Desirable ranges for optical retardance for active LC retarder 301 comprising homogeneous alignment layers 431, 433 on both substrates and a passive negative C-plate compensation retarder 330 are further described in TABLE 6.

TABLE 6

| Active LC layer retardance/nm | Minimum negative C-plate retardance/nm | Typical negative C-plate retardance/nm | Maximum negative C-plate retardance/nm |
|---|---|---|---|
| 600 | −300 | −400 | −500 |
| 750 | −350 | −450 | −600 |
| 900 | −400 | −500 | −700 |

The switchable liquid crystal retarder 300 thus comprises a first surface alignment layer 431 disposed on a first side of the layer of liquid crystal material 414, and a second surface alignment layer 433 disposed on the second side of the layer of liquid crystal material 414 opposite the first side; wherein the first surface alignment layer 409 is a homogeneous alignment layer and the second surface alignment layer is a homogeneous alignment layer; wherein the layer of liquid crystal material has a retardance for light of a wavelength of 550 nm in a range from 500 nm to 1000 nm, preferably in a range from 600 nm to 850 nm and most preferably in a range from 700 nm to 800 nm. Thus when the first and second alignment layers are each homogeneous alignment layers and when the passive compensation retarder 330 comprises a retarder having an optical axis perpendicular to the plane of the retarder, the passive retarder has a retardance for light of a wavelength of 550 nm in a range from −300 nm to −700 nm, preferably in a range from −350 nm to −600 nm and most preferably in a range from −400 nm to −500 nm.

Advantageously off-axis privacy can be provided by means of luminance reduction and privacy level increase over wide polar regions. Further resistance to visual artefacts arising from flow of liquid crystal material in the layer 314 may be improved in comparison to homeotropic alignment.

Various other configurations of the optical structure and driving of FIG. 10A will now be described.

Operation at 5V provides lower power consumption and lower cost electronics while achieving acceptable luminance roll-off in wide angle mode. Field of view in wide angle mode can further be extended by operation 10V.

Figure 12:
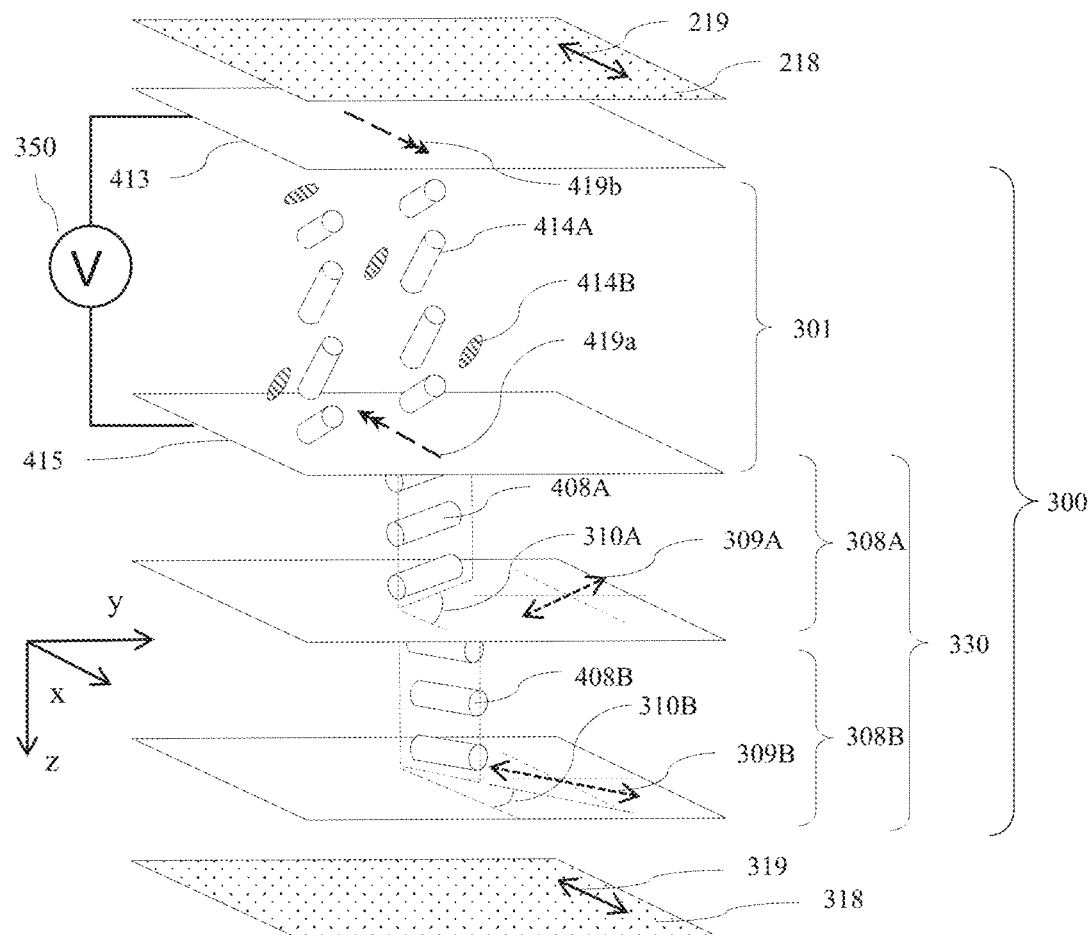
FIG. 12 is a schematic diagram illustrating in perspective side view an arrangement of a switchable compensated retarder in a privacy mode of operation comprising crossed A-plate passive compensation retarders and homogeneously aligned switchable liquid crystal retarder.
Figure 13:
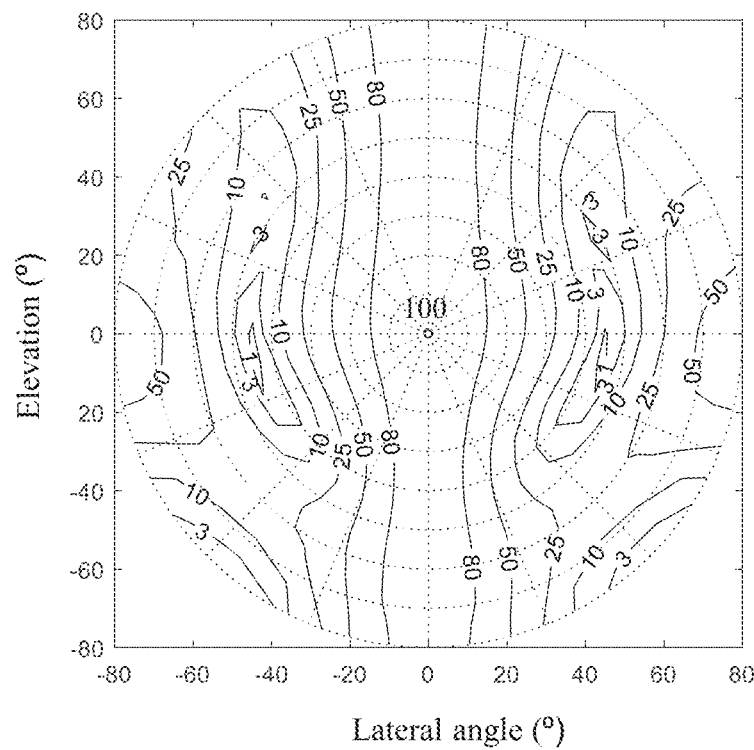
FIG. 13, FIG. 14, and FIG. 15 are schematic graphs illustrating the variation of output transmission with polar direction for transmitted light rays of switchable compensated retarder comprising a homogeneously aligned liquid crystal cell and crossed A-plates in a privacy mode and wide angle modes for different drive voltages.
Figure 14:
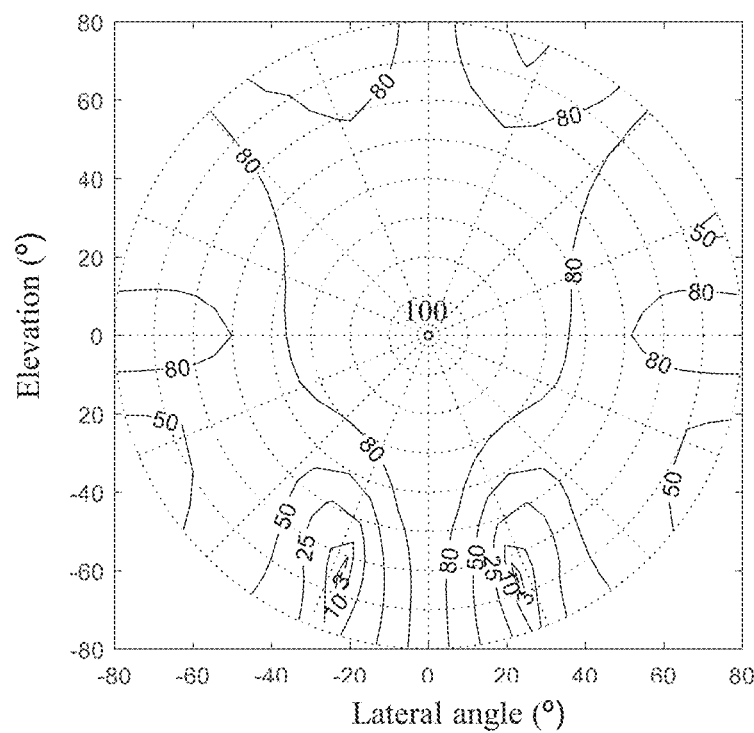
Figure 15:
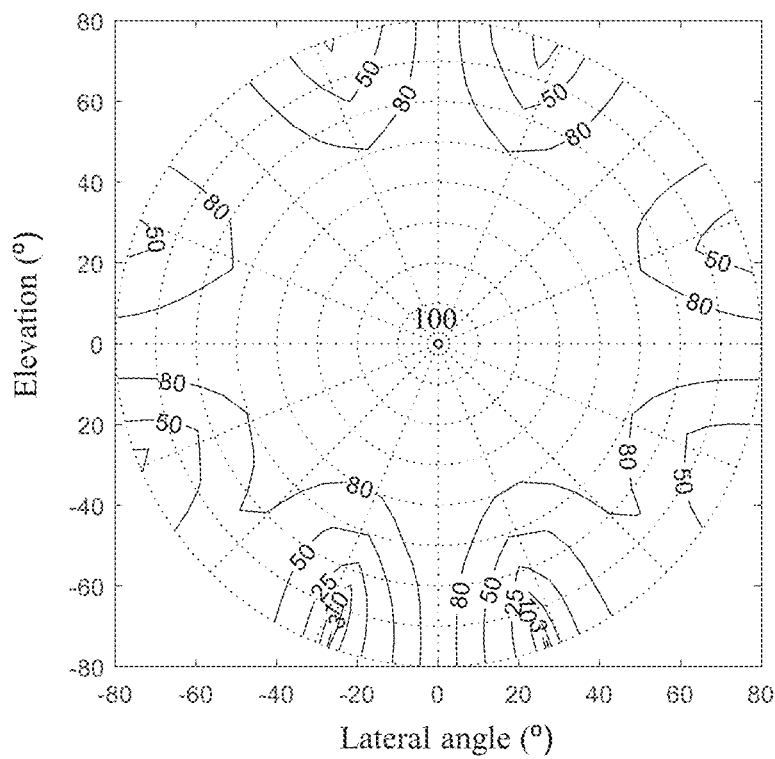

FIG. 12 is a schematic diagram illustrating in perspective side view an arrangement of a switchable compensated retarder in a privacy mode of operation, the arrangement comprising crossed A-plate passive compensation retarders 308A, 308B and homogeneously aligned switchable guest-host liquid crystal retarder 301; and FIGS. 13-15 are schematic graphs illustrating the variation of output transmission with polar direction for transmitted light rays of switchable compensated retarder 301 comprising a homogeneously aligned liquid crystal material 414 and passive crossed A-plate retarders 308A, 308B, in a privacy mode and a wide

TABLE 5

| FIG. | Mode | Passive compensation retarder(s) | | Active LC retarder | | | | |
|---|---|---|---|---|---|---|---|---|
| | | Type | Δn.d/nm | Alignment layers | Pretilt/deg | Δn.d/nm | Δε | Voltage/V |
| 11A | Privacy | Negative C | −500 | Homogeneous | 2 | 750 | +13.2 | 2.3 |
| 11B | Wide | | | Homogeneous | 2 | | | 5.0 |
| 11C | Wide | | | | | | | 10.0 | angle mode for different drive voltages comprising the respective embodiments illustrated in TABLE 7.

TABLE 7

| | | Passive compensation retarder(s) | | Active LC retarder | | | | |
|---|---|---|---|---|---|---|---|---|
| FIG. | Mode | Type | Δn.d/ nm | Alignment layers | Pretilt/ deg | Δn.d/ nm | Δε | Voltage/ V |
| 13 | Privacy | Crossed A | +500 @ 45° | Homogeneous | 2 | 750 | +13.2 | 2.3 |
| 14 | Wide | | +500 @ 135° | Homogeneous | 2 | | | 5 |
| 15 | Wide | | | | | | | 10 |

Desirable ranges for optical retardance for active LC retarder 301 comprising homogeneous alignment layers 409, 411 on both substrates and crossed positive A-plate retarders 308A, 308B are further described in TABLE 8.

TABLE 8

| Active LC layer retardance/ nm | Minimum positive A-plate retardance/nm | Typical positive A-plate retardance/nm | Maximum positive A-plate retardance/nm |
|---|---|---|---|
| 600 | +300 | +400 | +600 |
| 750 | +350 | +500 | +700 |
| 900 | +400 | +600 | +800 |

Thus when: the first and second alignment layers are each homogeneous alignment layers; the layer of liquid crystal material has a retardance for light of a wavelength of 550 nm in a range from 500 nm to 1000 nm, preferably in a range from 600 nm to 850 nm and most preferably in a range from 700 nm to 800 nm; and the passive compensation retarder 330 comprises a pair of retarders which have optical axes in the plane of the retarders that are crossed, then each retarder of the pair of retarders has an retardance for light of a wavelength of 550 nm between 300 nm and 800 nm, preferably between 350 nm and 650 nm and most preferably between 450 nm and 550 nm.

Further crossed A-plates may be conveniently provided from low cost materials.

By way of illustration various other example embodiments of the optical structure and driving of FIG. 12 will now be described. FIG. 14 and FIG. 15 further illustrate that by adjustment of addressing voltage and retardances, advantageously different wide angle fields of view may be achieved.

Arrangements of optical stack structures will now be further described.

Figure 16A:
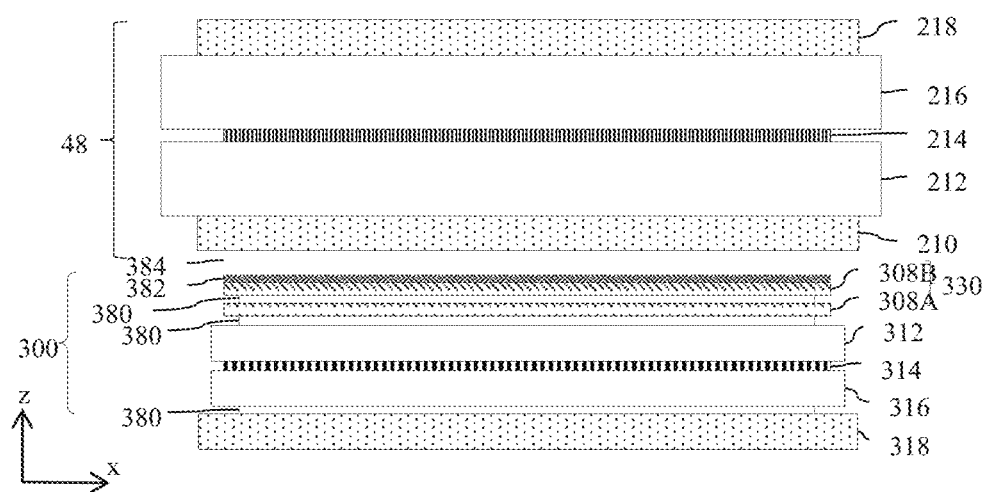
FIG. 16A and FIG. 16B are schematic diagrams illustrating in side views part of a display comprising a switchable compensated retarder and optical bonding layers.
Figure 16B:
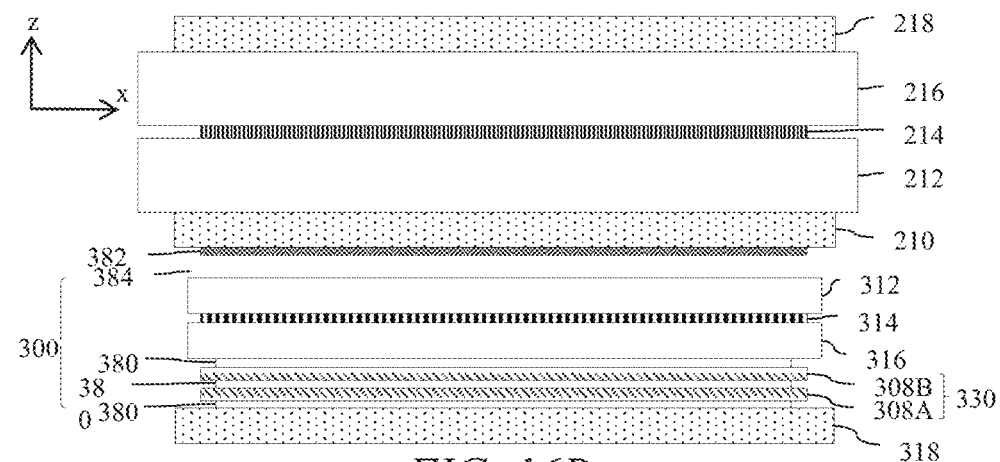

FIG. 16A and FIG. 16B are schematic diagrams illustrating in side views part of a display comprising a switchable compensated retarder and optical bonding layers 380. Optical bonding layers 380 may be provided to laminate films and substrates, achieving increased efficiency and reduced luminance at high viewing angles in privacy mode. Further an air gap 384 may be provided between the spatial light modulator 48 and the switchable guest-host retarder 301 which in this instance is arranged on the input side of the spatial light modulator 48. To reduce wetting of the two surfaces at the air gap 384, an anti-wetting surface 382 may be provided to at least one of the switchable guest-host retarder 300 or spatial light modulator 48.

The passive compensation retarder 330 may be provided between the switchable liquid crystal layer 301 and spatial light modulator 48 as illustrated in FIG. 16A, or may be provided between the additional polariser 318 and switchable guest-host liquid crystal retarder 301 as illustrated in FIG. 16B. Substantially the same optical performance is provided in both systems.

FIG. 16A illustrates that optical layers are bonded to outer sides of the substrates 312, 316. Advantageously, bending of the substrates 312, 316 from the attached layers due to stored stresses during lamination may be reduced and display flatness maintained.

Similarly, switchable guest-host retarder 300 may be arranged wherein the output polariser 218 is the display polariser. Scatter that may be provided by spatial light modulator 48, such as from phase structures at the pixels 220, 222, 224 do not degrade the output luminance profile in comparison to arrangements wherein the switchable compensated retarder 301 is arranged behind the spatial light modulator 48.

It may be desirable to provide the additional polariser with a different electric vector transmission direction to the electric vector transmission direction of the display polariser.

Figure 17:
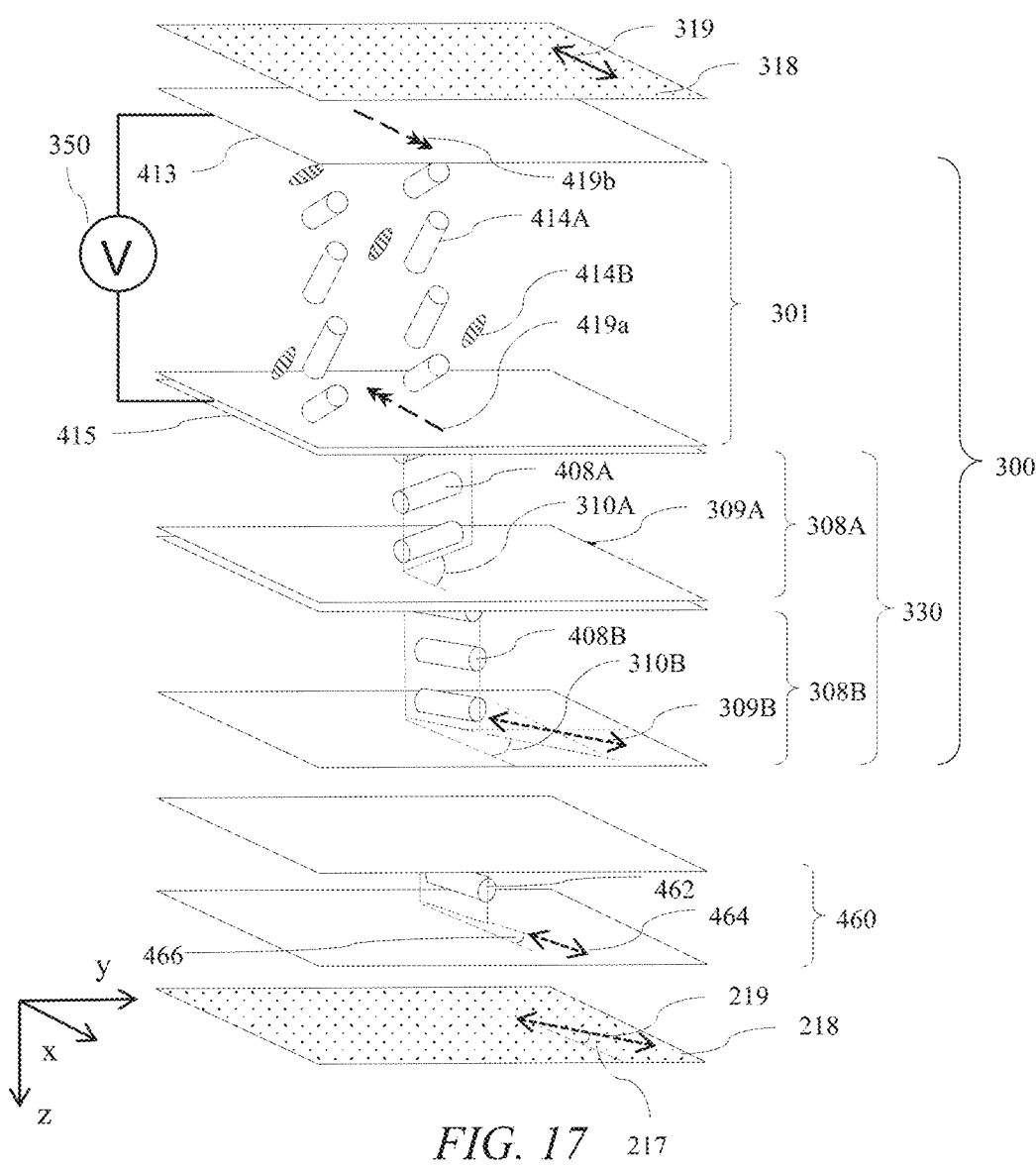
FIG. 17 is a schematic diagram illustrating in perspective side view an arrangement of a switchable compensated retarder in a privacy mode of operation comprising crossed A-plate passive compensation retarders and homogeneously aligned switchable liquid crystal retarder, further comprising a passive rotation retarder.

FIG. 17 is a schematic diagram illustrating in perspective side view an arrangement of a switchable compensated retarder in a privacy mode of operation comprising the crossed A-plate passive compensation retarders 308A, 308B and homogeneously aligned switchable guest-host liquid crystal retarder 301, as described above but further comprising a passive rotation retarder 460.

The display polariser 218 may be provided with an electric vector transmission direction 219, that may be for example at an angle 317 of 45 degrees in the case of a twisted nematic LCD display. The additional polariser 318 may be arranged to provide vertically polarised light to a user whole may be wearing polarising sunglasses that typically transmit vertically polarised light.

The passive rotation retarder 460 is different to the compensation retarder 330 of the present embodiments and its operation will now be described.

Passive rotation retarder 460 may comprise a birefringent material 462 and be a half waveplate, with retardance at a wavelength of 550 nm of 275 nm for example.

Passive rotation retarder 460 has a fast axis orientation 464 that is inclined at an angle 466 that may be 22.5 degrees to the electric vector transmission direction 319 of the additional polariser 318. The passive rotation retarder 460 thus rotates the polarisation from the output polariser 218 such that the polarisation direction of the light that is incident onto the compensation retarder 308B is parallel to the direction 319.

The passive rotation retarder 460 modifies the on-axis polarisation state, by providing an angular rotation of polarisation component from the display polariser 218. In comparison to the compensation retarders 308A, 308B together do not modify the on-axis polarisation state.

Further, the passive rotation retarder 460 provides a rotation of polarisation that may be substantially independent of viewing angle. In comparison the compensation retarders 308A, 308B provide substantial modifications of output luminance with viewing angle.

Advantageously a display may be provided with an output polarisation direction 319 that is different from the display polariser polarisation direction 219, for example to provide viewing with polarising sunglasses.

In an alternative embodiment the separate retarder 460 may be omitted and the retardance of the retarder 308B of FIG. 11A increased to provide an additional half wave rotation in comparison to the retardance of retarder 308A. To continue the illustrative embodiment, the retardance of retarder 308B at a wavelength of 550 nm may be 275 nm greater than the retardance of retarder 308A. Advantageously the number of layers, complexity and cost may be reduced.

Hybrid aligned structures comprising both homogeneous and homeotropic alignment layers will now be described.

Figure 18:
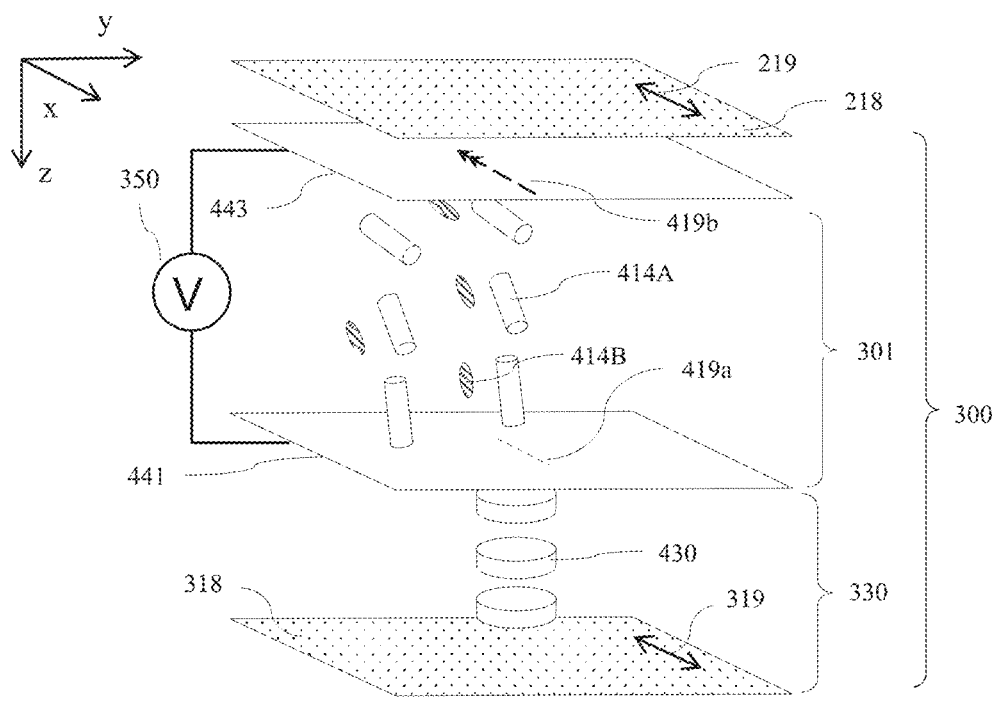
FIG. 18 is a schematic diagram illustrating in perspective side view an arrangement of a switchable compensated retarder in a privacy mode of operation comprising a homogeneously and homeotropically aligned switchable liquid crystal retarder and a passive negative C-plate retarder.

FIG. 18 is a schematic diagram illustrating in perspective side view an arrangement of a switchable retarder in a privacy mode of operation comprising a homogeneously and homeotropically aligned switchable guest-host liquid crystal retarder 301 comprising liquid crystal material 423 and a passive negative C-plate retarder 330.

Figure 19:
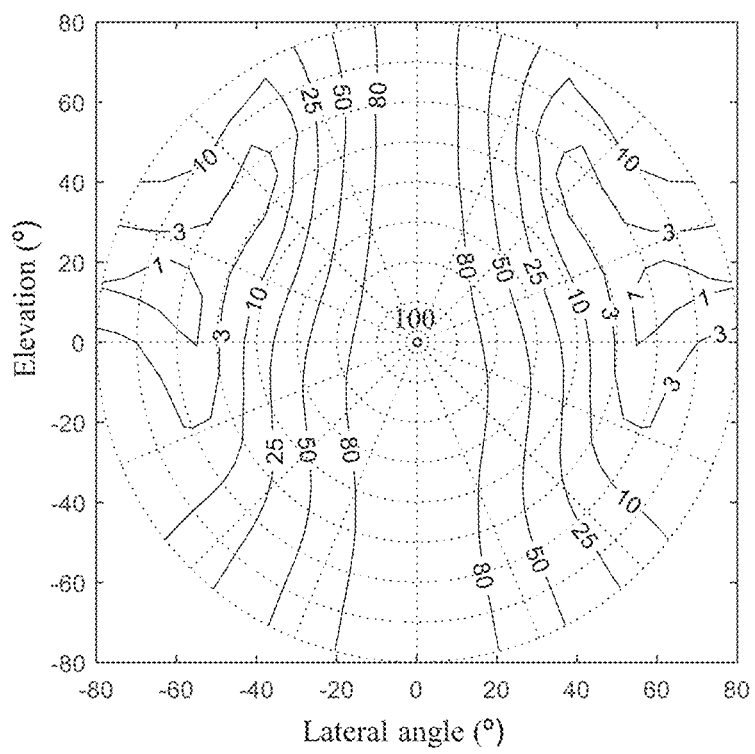
FIG. 19 is a schematic graph illustrating the variation of output transmission with polar direction for transmitted light rays in FIG. 18 in a privacy mode of operation.
Figure 20:
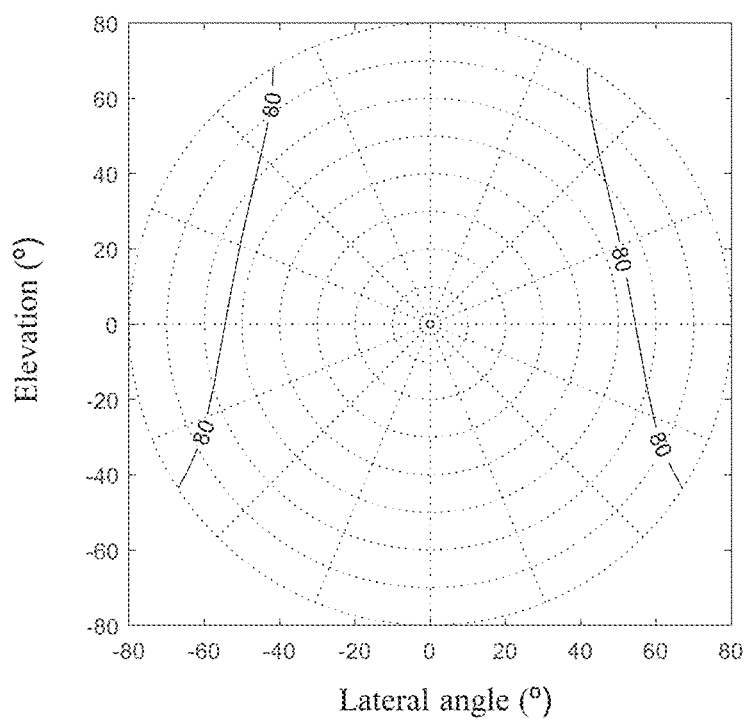
FIG. 20 is a schematic graph illustrating the variation of output transmission with polar direction for transmitted light rays in FIG. 18 in a wide angle mode of operation.

FIGS. 19-20 are schematic graphs illustrating the variation of output transmission with polar direction for transmitted light rays in FIG. 18 in a wide angle and privacy mode of operation respectively, and provided by the arrangement of TABLE 9.

of a wavelength of 550 nm in a range from 500 nm to 1800 nm, preferably in a range from 700 nm to 1500 nm and most preferably in a range from 900 nm to 1350 nm. When the surface alignment layer 443 arranged to provide homogeneous alignment is between the layer of liquid crystal material 423 and the compensation retarder 330, the passive compensation retarder may comprise a retarder 330 having its optical axis perpendicular to the plane of the retarder as shown in FIG. 18, the passive retarder 330 having a retardance for light of a wavelength of 550 nm in a range from −300 nm to −1600 nm, preferably in a range from −500 nm to −1300 nm and most preferably in a range from −700 nm to −1150 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm.

When the surface alignment layer 441 arranged to provide homeotropic alignment is between the layer of liquid crystal material 423 and the compensation retarder 330, the layer of liquid crystal material 423 has a retardance for light of a wavelength of 550 nm in a range from 700 nm to 2000 nm, preferably in a range from 1000 nm to 1700 nm and most preferably in a range from 1200 nm to 1500 nm. When the surface alignment layer 441 arranged to provide homeotropic alignment is between the layer of liquid crystal material 423 and the compensation retarder 330, the passive compensation retarder may comprise a retarder 330 having its

TABLE 9

| | | Passive compensation retarder(s) | | Active LC retarder | | | | |
|---|---|---|---|---|---|---|---|---|
| FIGURE | Mode | Type | Δn.d/ nm | Alignment layers | Pretilt/ deg | Δn.d/ nm | Δε | Voltage/ V |
| 20 | Wide | Negative C | −1100 | Homogeneous | 2 | 1300 | +4.3 | 15.0 |
| 19 | Privacy | | | Homeotropic | 88 | | | 2.8 |
| Not shown | Wide | Crossed A | +500 @ 45° | Homeotropic | 2 | 1300 | +4.3 | 15.0 |
| Not shown | Privacy | | +500 @ 135° | Homogeneous | 88 | | | 2.8 |

The hybrid aligned switchable guest-host liquid crystal retarder 301 has variable tilt such that for a given material and cell thickness choice, reduced effective birefringence is provided. Thus the retarder design must be adjusted to compensate in comparison to the arrangements wherein the alignment layers are the same. The switchable liquid crystal retarder 330 comprises a first surface alignment layer 441 disposed on a first side of the layer of liquid crystal material 423, and a second surface alignment layer 443 disposed on the second side of the layer of liquid crystal material 423 opposite the first side. The first surface alignment layer 441 is a homeotropic alignment layer arranged to provide homeotropic alignment in the adjacent liquid crystal material 423 and the second surface alignment layer 443 is a homogeneous alignment layer arranged to provide homogeneous alignment in the adjacent liquid crystal material 423.

Further, the optimum designs of retarders are related to the relative location of the passive compensation retarder 330 with respect to the homeotropic and homogeneous alignment layers.

When the surface alignment layer 443 arranged to provide homogeneous alignment is between the layer of liquid crystal material 423 and the compensation retarder 330, the layer of liquid crystal material 423 has a retardance for light optical axis perpendicular to the plane of the retarder as shown in FIG. 18, the passive retarder having a retardance for light of a wavelength of 550 nm in a range from −400 nm to −1800 nm, preferably in a range from −700 nm to −1500 nm and most preferably in a range from −900 nm to −1300 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

In comparison to the arrangement of FIG. 5A, the privacy mode of operation may advantageously achieve increased resilience to the appearance of material flow when the liquid crystal retarder is pressed.

It may be desirable to provide further control of off-axis privacy field of view.

Figure 21:
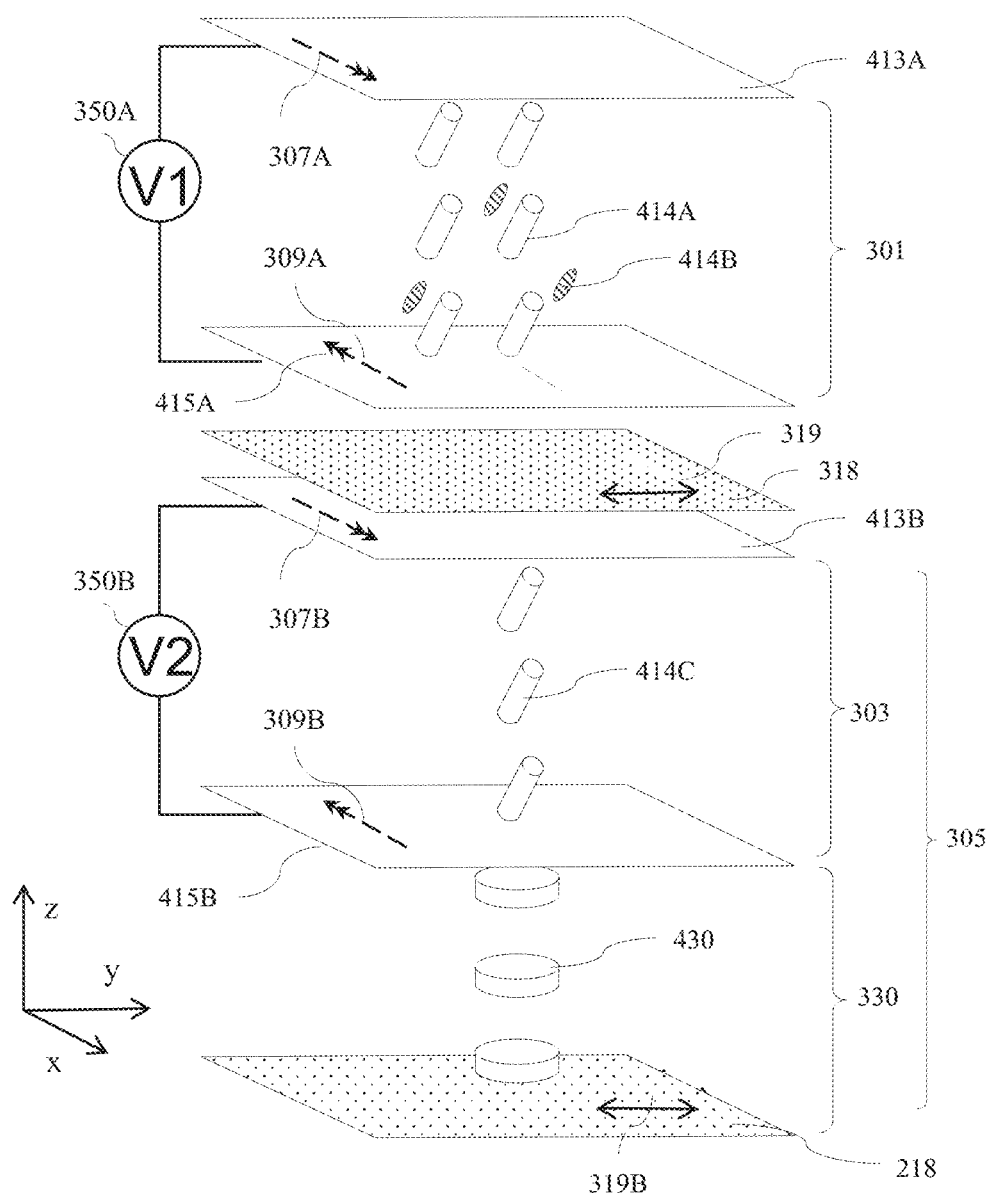
FIG. 21 is a schematic diagram illustrating in perspective side view an arrangement of a switchable compensated retarder in a privacy mode of operation comprising a negative C-plate passive compensation retarder and homeotropically aligned switchable liquid crystal retarder arranged between the output polariser and additional polariser; and a negative C-plate passive compensation retarder and homeotropically aligned switchable liquid crystal retarder arranged between the first-mentioned additional polariser and further additional polariser in a privacy mode of operation.

FIG. 21 is a schematic diagram illustrating in perspective side view an arrangement of a switchable retarder in a privacy mode of operation, comprising: a switchable guest-host retarder 301 (in this case, a homeotropically aligned switchable guest-host liquid crystal retarder 301, but this is merely an example and may be replaced by any of the other arrangements of guest-host liquid crystal retarders disclosed herein) arranged on the output side of the spatial light modulator 48 (not shown in FIG. 21) at the output of an additional polariser 318; and a switchable transmissive retarder 305 (in this case, a negative C-plate passive compensation retarder 330 and homeotropically aligned switchable transparent liquid crystal retarder 303, but this is merely an example and may be replaced by any of the other arrangements of plural retarders disclosed herein) arranged between the display polariser 218 and additional polariser 318 with electric vector transmission direction 319.

For the purposes of the present disclosure, liquid crystal retarders that are not provided by guest-host liquid crystals are termed transparent liquid crystal retarders as there is substantially no light absorption within the liquid crystal layer.

As an alternative, the additional polariser 318 may be arranged on the input side of the input display polariser 210, in which case the additional polariser 318 may be arranged on the input side of the input display polariser 210 between the input polariser 210 and the backlight 20, and the switchable guest-host liquid crystal retarder 301 may be arranged between the additional polariser 318 and the backlight 20. As a further alternative the retarders 301, 305 may be arranged on opposite sides of the spatial light modulator 48.

In each of these alternatives, each of the retarders 301, 305 (and/or passive guest-host liquid crystal retarder 340 if incorporated) so have an effect similar to that of the corresponding structure in the devices described above.

The pretilt directions 307A, 309A of the alignment layers of the switchable guest-host liquid crystal retarder 301 may have a component in the plane of the liquid crystal layer that is aligned parallel or antiparallel or orthogonal to the pretilt directions of the alignment layers 307B, 309B of the switchable transparent liquid crystal retarder 303. In a wide mode of operation, both switchable guest-host liquid crystal retarders 301 and switchable transparent liquid crystal retarder 303 are driven to provide a wide viewing angle. In a privacy mode of operation, switchable liquid crystal retarders 301, 303 may cooperate to advantageously achieve increased luminance reduction and thus improved privacy in a single axis.

The retardation provided by the first switchable guest-host liquid crystal retarder 301 and further liquid crystal retarders 303 may be different. The switchable guest-host liquid crystal retarder 301 and further switchable transparent liquid crystal retarder 303 may be driven by a common voltage.

The liquid crystal material 414A in the switchable guest-host liquid crystal retarder 301 may be different to the liquid crystal material 414C in the switchable transparent liquid crystal retarder 303. Chromatic variation of the polar luminance profiles illustrated elsewhere herein may be reduced, so that advantageously off-axis colour appearance is improved.

Alternatively, switchable liquid crystal retarders 301, 303 may have orthogonal alignments so that reduced luminance is achieved in both horizontal and vertical directions, to advantageously achieve landscape and portrait privacy operation.

Alternatively as illustrated, the layers 303, 301 may be provided with different drive voltages. Advantageously increased control of roll-off of luminance profile may be achieved or switching between landscape and privacy operation may be provided.

Figure 22:
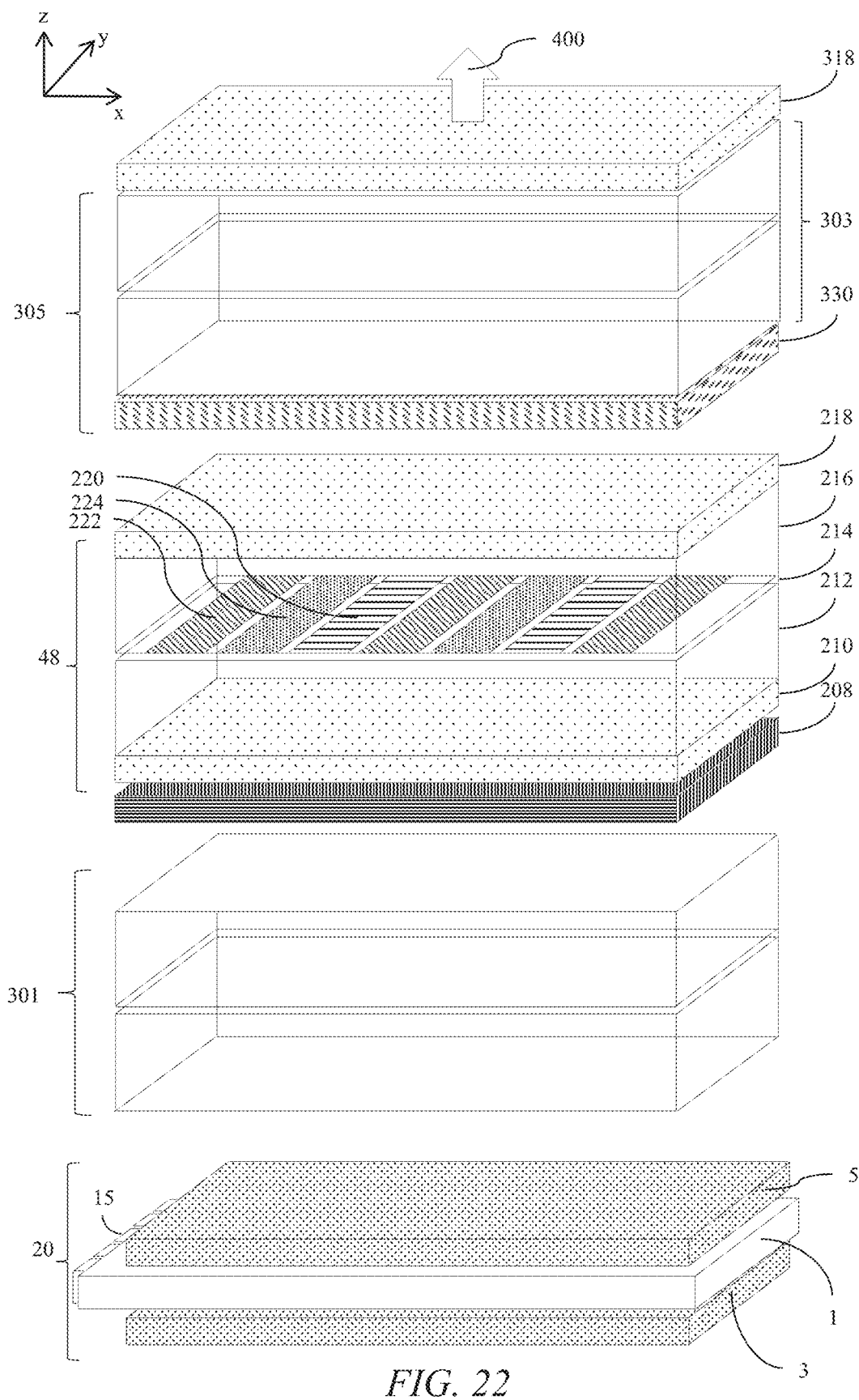
FIG. 22 is a schematic diagram illustrating in side perspective view a view angle control optical element comprising a first passive compensation retarder, a first switchable liquid crystal retarder, a first control polariser, a second passive compensation retarder, a second switchable liquid crystal retarder and a second control polariser.

FIG. 22 is a schematic diagram illustrating in perspective side view an arrangement of switchable compensated retarder 305 arranged on the output of spatial light modulator 48 and a switchable guest-host liquid crystal retarder 301 arranged on the input of the spatial light modulator 48.

An additional polariser 318 is arranged on the output side of the output display polariser 218 and transparent liquid crystal retarder 303 and compensation retarder 330 arranged between the additional polariser 318 and output polariser 218.

Further, a guest-host liquid crystal retarder 301 is provided between the backlight 20 and input reflective polariser 208 and input linear absorbing polariser 210 and arranged as described above.

Reflected off-axis light from the reflective polariser 208 may undergo further absorption in the guest-host liquid crystal retarder 301 and not be recycled in the backlight, achieving increased collimation and reducing off-axis luminance. Further reduction of off-axis luminance or landscape-portrait operation may be provided by the transparent liquid crystal retarder 303 and compensation retarder 330.

It may be desirable to provide both entertainment and night-time modes of operation in an automotive vehicle.

Figure 23A:
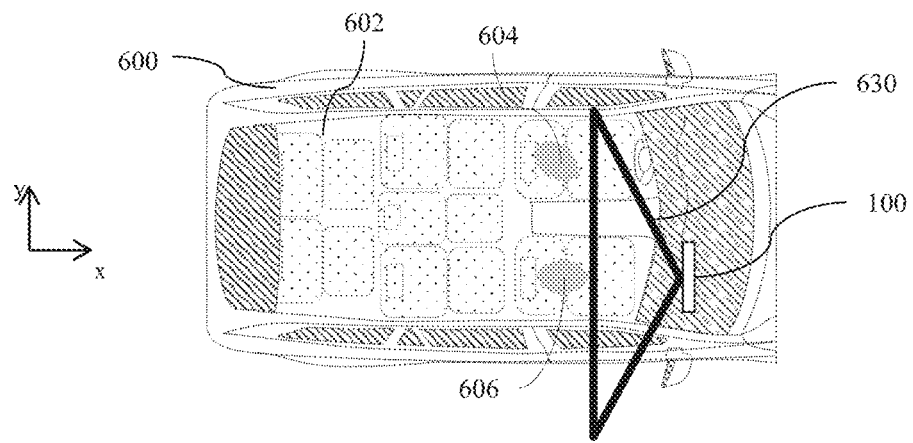
FIG. 23A is a schematic diagram illustrating in top view an automotive vehicle with a switchable directional display arranged within the vehicle cabin for day-time and/or sharing modes of operation.
Figure 23B:
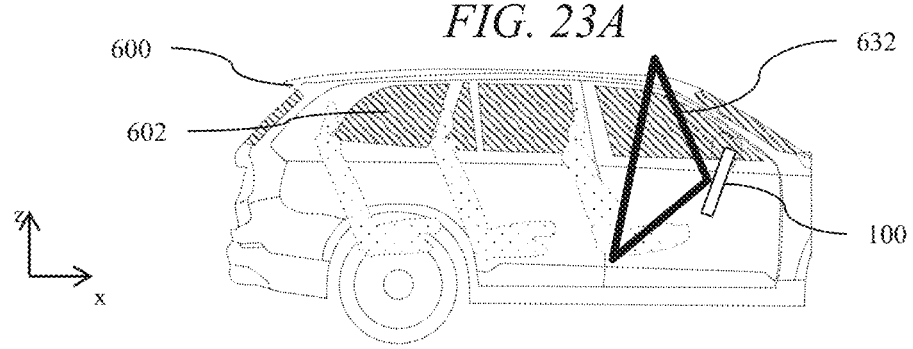
FIG. 23B is a schematic diagram illustrating in side view an automotive vehicle with a switchable directional display arranged within the vehicle cabin for day-time and/or sharing modes of operation.

FIG. 23A is a schematic diagram illustrating in top view an automotive vehicle with a switchable directional display such as that illustrated in FIG. 22 arranged within the vehicle cabin 602 for day-time and/or sharing modes of operation; and FIG. 23B is a schematic diagram illustrating in side view an automotive vehicle with a switchable directional display arranged within the vehicle cabin 602 for day-time and/or sharing modes of operation. Light cone 630, 632 is provided with a wide angular field of view and thus the display is advantageously visible by multiple occupants.

Figure 24A:
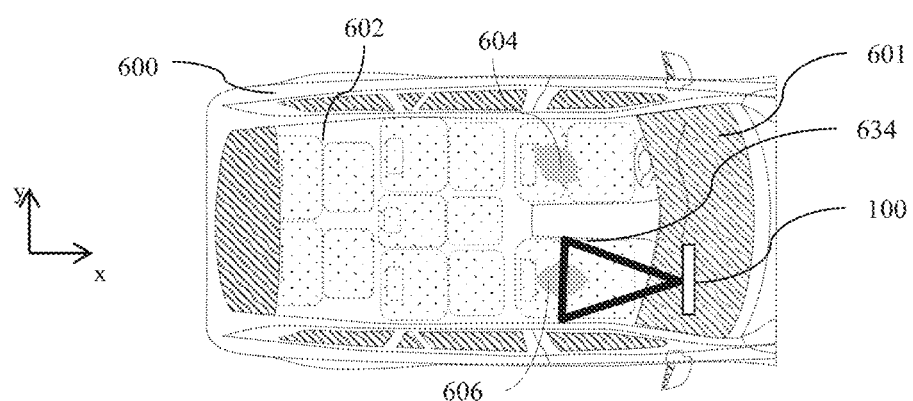
FIG. 24A is a schematic diagram illustrating in top view an automotive vehicle with a switchable directional display arranged within the vehicle cabin for night-time and/or entertainment modes of operation.
Figure 24B:
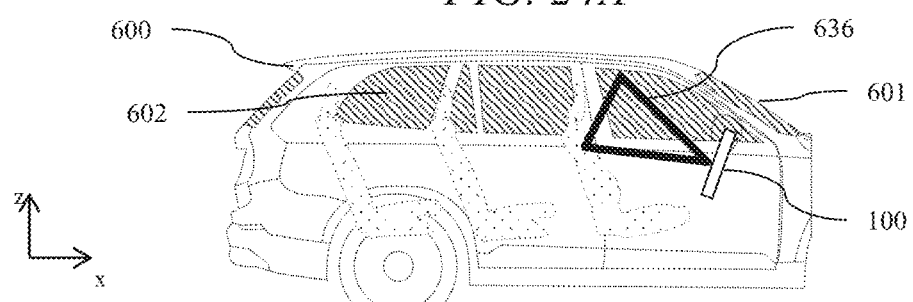
FIG. 24B is a schematic diagram illustrating in side view an automotive vehicle with a switchable directional display arranged within the vehicle cabin for night-time and/or entertainment modes of operation.

FIG. 24A is a schematic diagram illustrating in top view an automotive vehicle with a switchable directional display such as that illustrated in FIG. 22 arranged within the vehicle cabin 602 for night-time and/or entertainment modes of operation; FIG. 24B is a schematic diagram illustrating in side view an automotive vehicle with a switchable directional display arranged within the vehicle cabin 602 for night-time and/or entertainment modes of operation. Light cone 634, 636 is provided with a narrow angular field of view and thus the display is advantageously visible only by a single occupant. Advantageously stray light for night-time operation is reduced, increasing driver safety. Further, reflections of the display from windscreen 601 are reduced, minimising distraction to the driver 604.

It would be desirable to provide further reduction of off-axis luminance by means of directional illumination from the spatial light modulator 48. Directional illumination of the spatial light modulator 48 by directional backlights 20 will now be described.

Figure 25A:
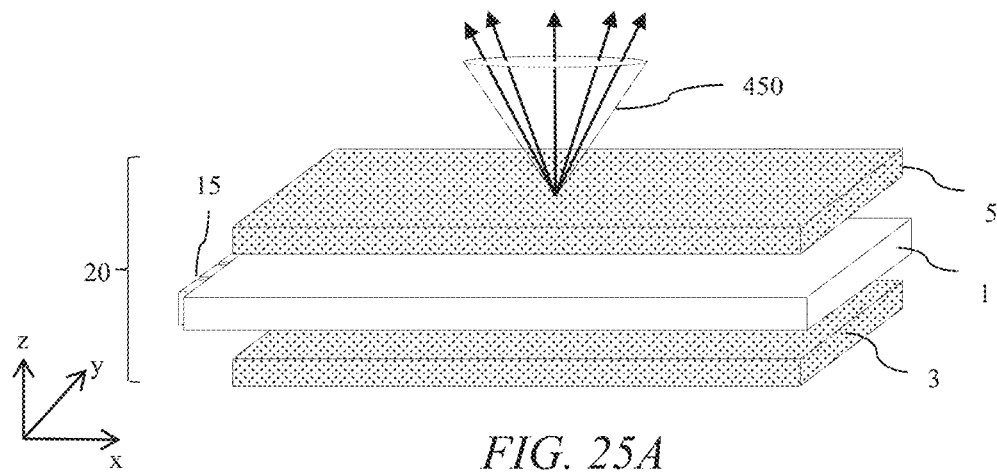
FIG. 25A is a schematic diagram illustrating in front perspective view a directional backlight.
Figure 25B:
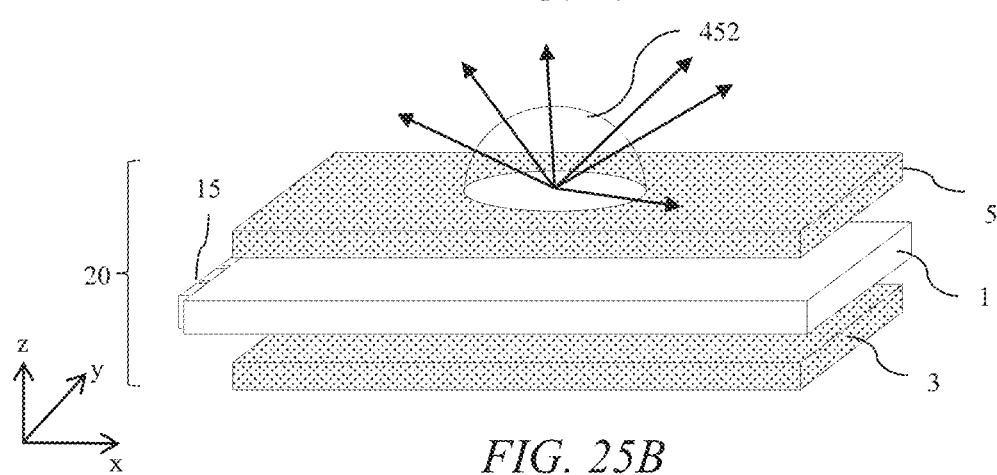
FIG. 25B is a schematic diagram illustrating in front perspective view a non-directional backlight.

FIG. 25A is a schematic diagram illustrating in front perspective view a directional backlight 20, and FIG. 25B is a schematic diagram illustrating in front perspective view a non-directional backlight 20, either of which may be applied in any of the devices described herein. Thus a directional backlight 20 as shown in FIG. 25A provides a narrow cone 450, whereas a non-directional backlight 20 as shown in FIG. 25B provides a wide angular distribution cone 452 of light output rays.

Figure 26:
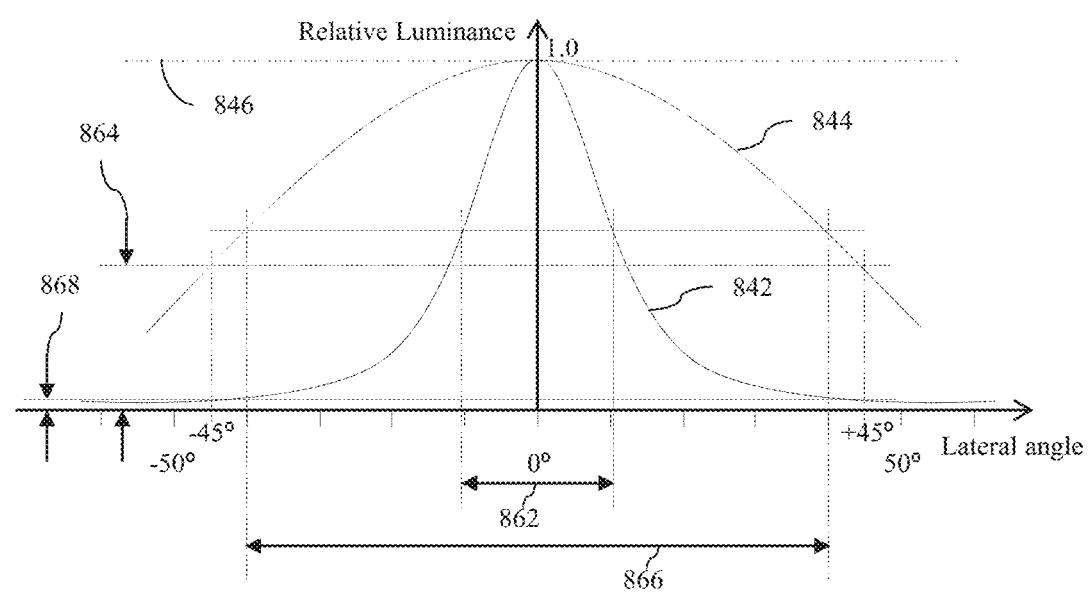
FIG. 26 is a schematic graph illustrating variation with luminance with lateral viewing angle of displays with different fields of view.

FIG. 26 is a schematic graph illustrating variation with luminance with lateral viewing angle for various different backlight arrangements. The graph of FIG. 26 may be a cross section through the polar field-of-view profiles described herein.

A Lambertian backlight has a luminance profile 846 that is independent of viewing angle.

A typical wide angle backlight has a roll-off at higher angles such that the full width half maximum 866 of relative luminance may be greater than 40°, preferably greater than 60° and most preferably greater than 80°. Further the relative luminance 864 at +/−45°, is preferably greater than 7.5%, more preferably greater than 10% and most preferably greater than 20%.

By way of comparison a directional backlight 20 has a roll-off at higher angles such that the full width half maximum 862 of relative luminance may be less than 60°, preferably less than 40° and most preferably less than 20°. Further the backlight 20 may provide a luminance at polar angles to the normal to the spatial light modulator 48 greater than 45 degrees that is at most 33% of the luminance along the normal to the spatial light modulator 48, preferably at most 20% of the luminance along the normal to the spatial light modulator 48, and most preferably at most 10% of the luminance along the normal to the spatial light modulator 48.

Scatter and diffraction in the spatial light modulator 48 may degrade privacy mode operation when the switchable retarder 300 is arranged between the input display polariser 210 and additional polariser 318. The luminance at polar angles to the normal to the spatial light modulator greater than 45 degrees may be increased in arrangements wherein the switchable retarder 300 is arranged between the output display polariser 218 and additional polariser 318 in comparison to arrangements wherein the switchable retarder 300 is arranged between the input display polariser 210 and additional polariser 318.

Advantageously lower off-axis luminance may be achieved for the arrangement of FIG. 1A in comparison to FIG. 2A for the same backlight 20.

In an illustrative embodiment of FIG. 1A, the luminance at polar angles to the normal to the spatial light modulator 48 greater than 45 degrees may be at most 18% whereas in an illustrative embodiment of FIG. 2A, the luminance at polar angles to the normal to the spatial light modulator 48 greater than 45 degrees may be at most 10%. Advantageously the embodiment of FIG. 1A may provide a wider viewing freedom in wide angle mode of operation while achieving similar viewing freedom to the embodiment of FIG. 2A in privacy mode of operation.

Such luminance profiles may be provided by the directional backlights 20 described below or may also be provided by wide angle backlights in combination with further additional polariser 318B and passive retarders 270 or additional compensated switching liquid crystal retarder 300B.

Figure 27A:
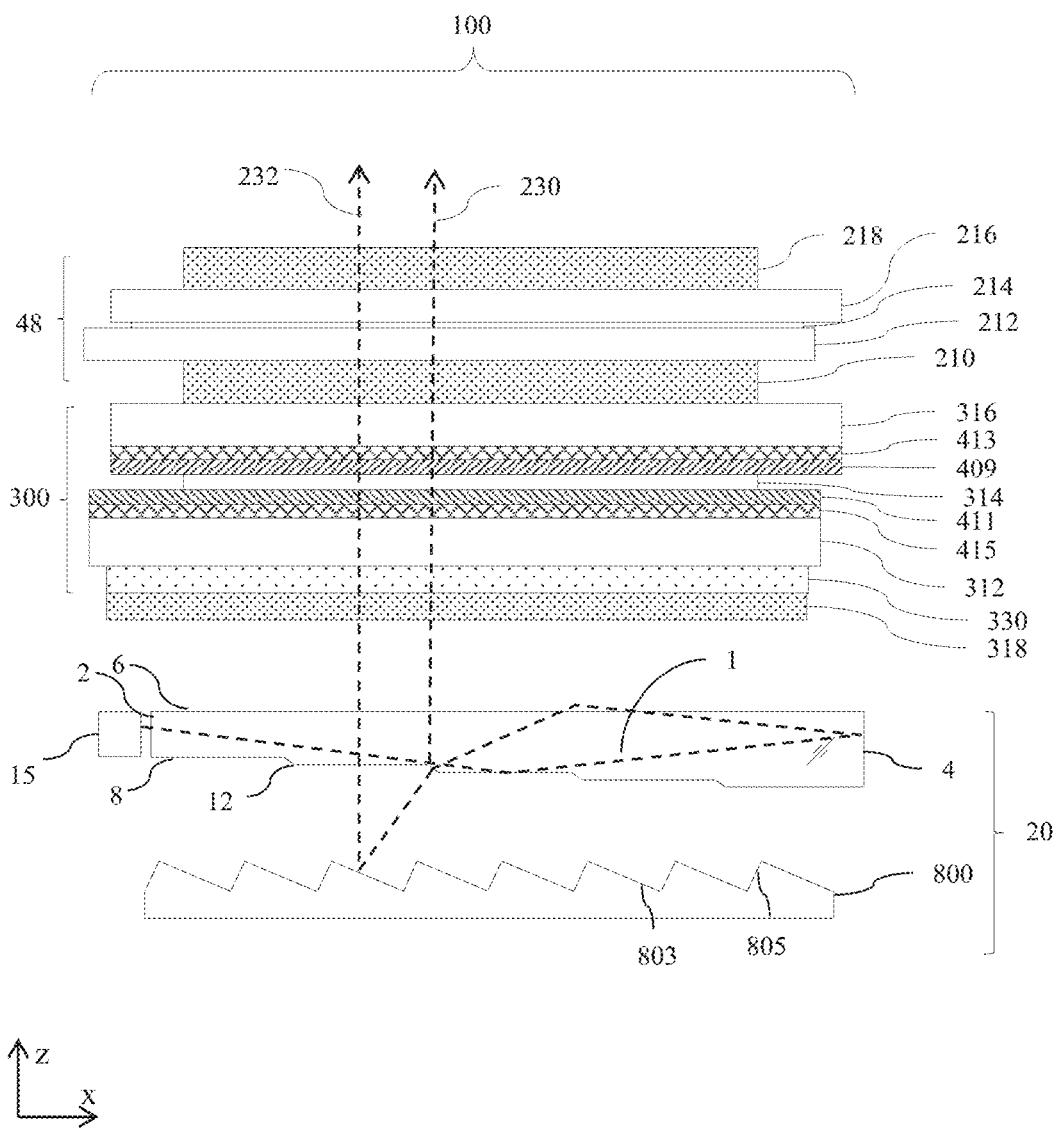
FIG. 27A is a schematic diagram illustrating in side view a switchable directional display apparatus comprising an imaging waveguide and switchable liquid crystal retarder.
Figure 27B:
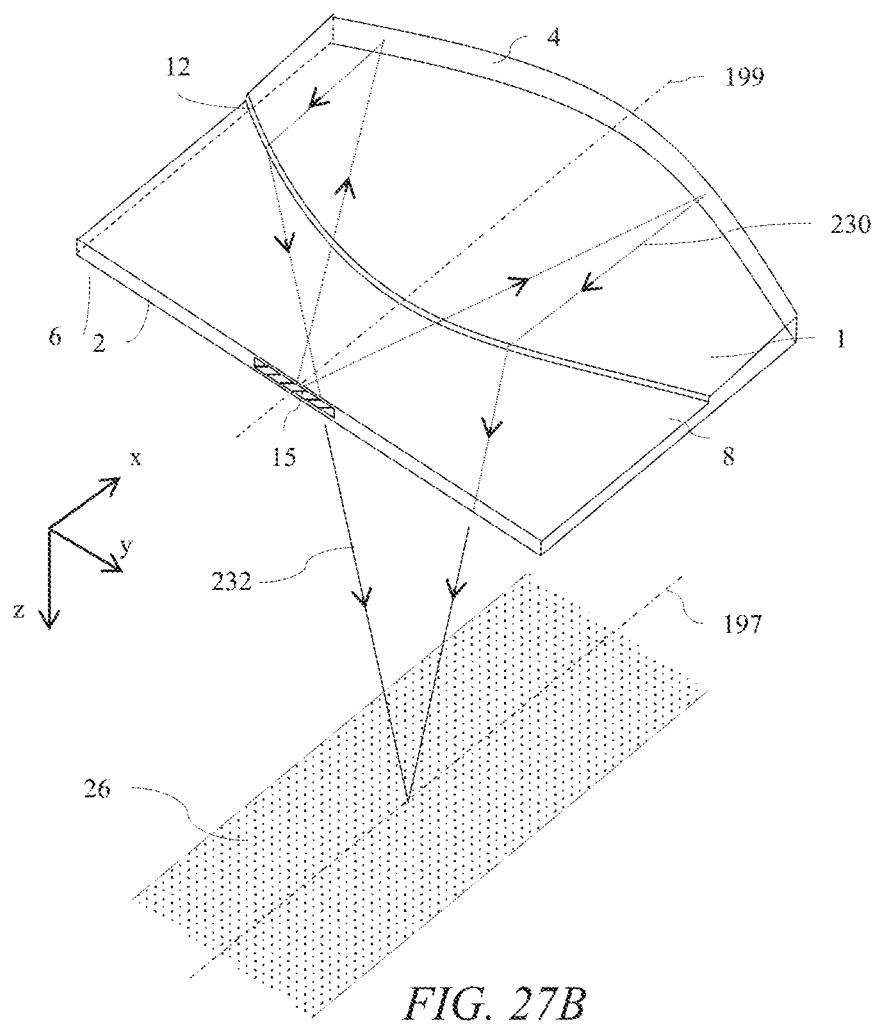
FIG. 27B is a schematic diagram illustrating in rear perspective view operation of an imaging waveguide in a narrow angle mode of operation.

FIG. 27A is a schematic diagram illustrating in side view a switchable directional display apparatus 100 comprising a switchable liquid crystal retarder 300 and backlight 20. The backlight 20 of FIG. 27A may be applied in any of the devices described herein and which comprises an imaging waveguide 1 illuminated by a light source array 15 through an input end 2. FIG. 27B which is a schematic diagram illustrating in rear perspective view operation of the imaging waveguide 1 of FIG. 27A in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 27B, optical power of the curved reflective end 4 and facets 12 provide an optical window 26 that is transmitted through the spatial light modulator 48 and has an axis 197 that is typically aligned to the optical axis 199 of the waveguide 1. Similar optical window 26 is provided by transmitted light rays 232 that are reflected by the rear reflector 800.

Figure 27C:
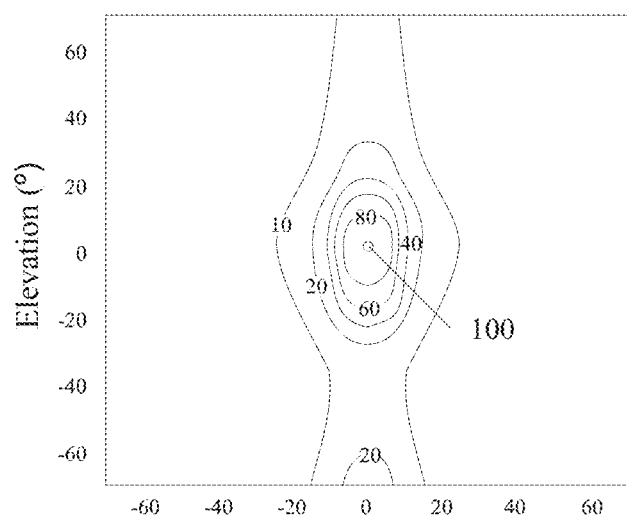
FIG. 27C is a schematic graph illustrating a field-of-view luminance plot of the output of FIG. 27B when used in a display apparatus with no switchable liquid crystal retarder.

FIG. 27C is a schematic graph illustrating field-of-view luminance plot of the output of FIG. 27B when used in a display apparatus with no switchable liquid crystal retarder.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Another type of directional backlight with low off-axis luminance will now be described.

Figure 28A:
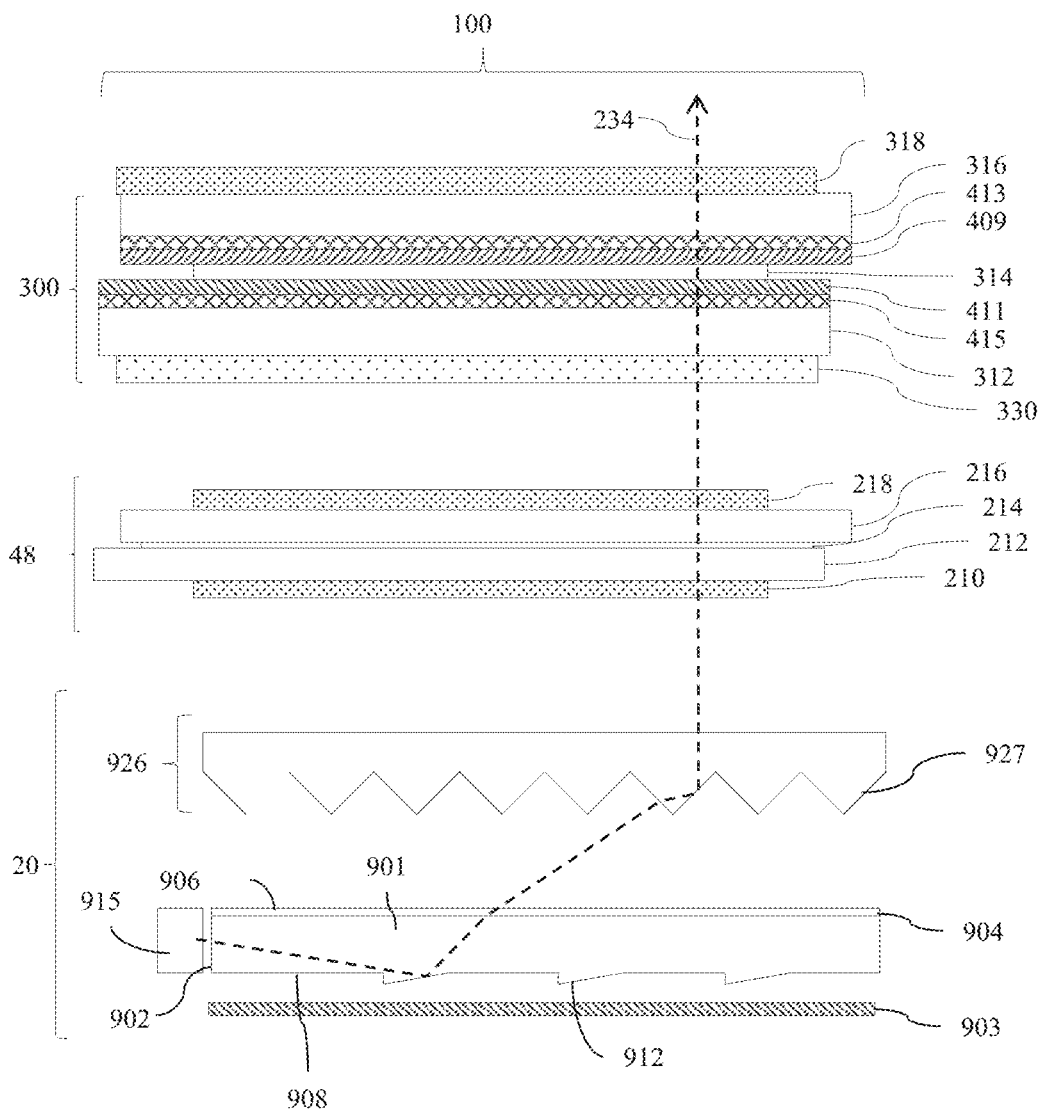
FIG. 28A is a schematic diagram illustrating in side view a switchable directional display apparatus comprising a switchable collimating waveguide and a switchable liquid crystal retarder operating in a privacy mode of operation.

FIG. 28A is a schematic diagram illustrating in side view a switchable directional display apparatus comprising a backlight 20 including a switchable collimating waveguide 901 and a switchable liquid crystal retarder 300 and additional polariser 318. The backlight 20 of FIG. 28A may be applied in any of the devices described herein and is arranged as follows.

The waveguide 901 has an input end 902 extending in a lateral direction along the waveguide 901. An array of light sources 915 are disposed along the input end 902 and input light into the waveguide 901. The waveguide 901 also has opposed first and second guide surfaces 906, 908 extending across the waveguide 901 from the input end 902 to a reflective end 904 for guiding light input at the input end 902 forwards and back along the waveguide 901. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the spatial light modulator 48 and compensated switchable liquid crystal retarder 300.

Figure 28B:
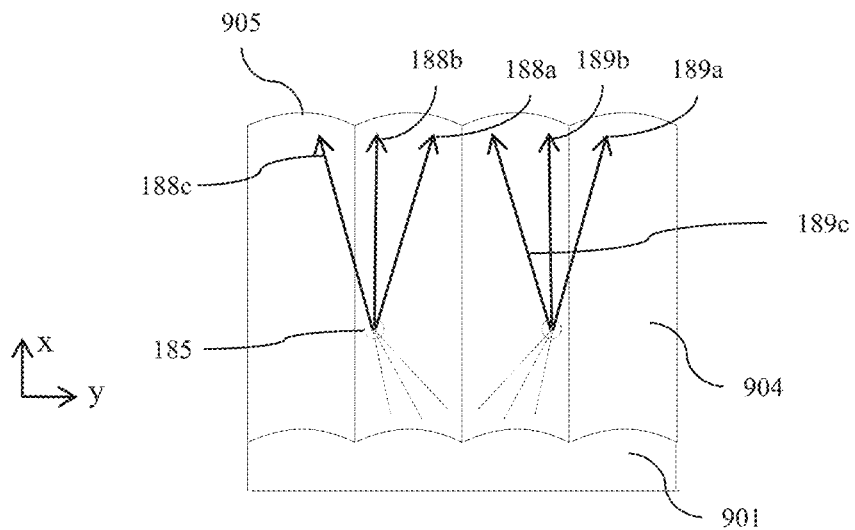
FIG. 28B is a schematic diagram illustrating in top view output of a collimating waveguide.

FIG. 28B is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188a-c and light rays 189a-c, with incidence on locations 185 of the lenticular structure 904 of the collimated waveguide 901.

Figure 28C:
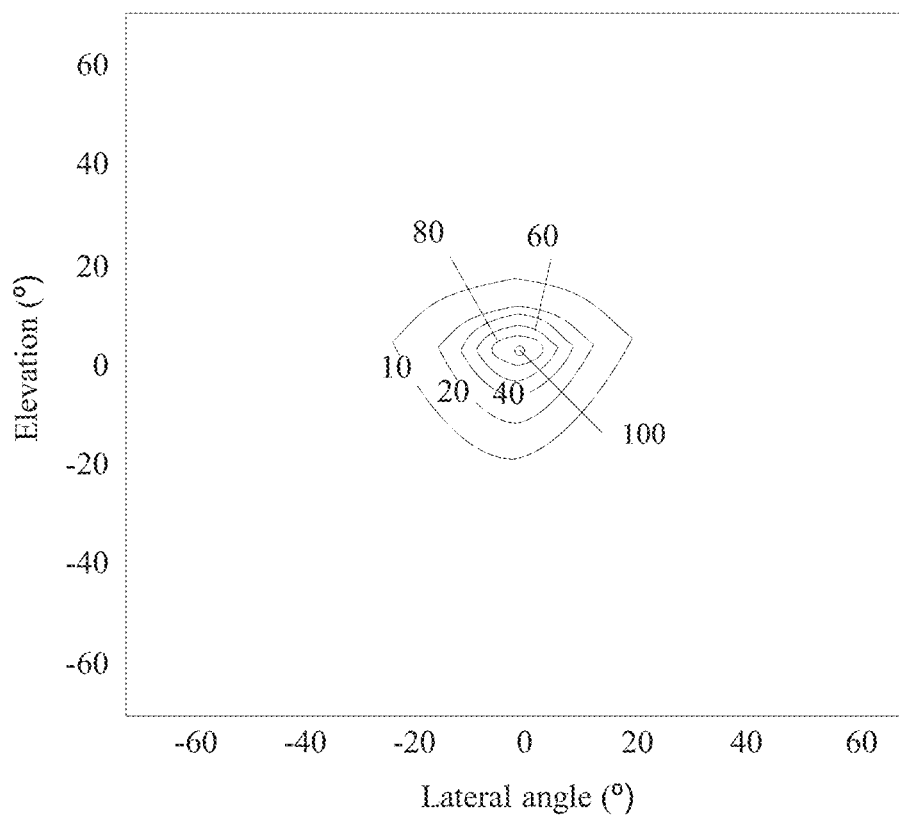
FIG. 28C is a schematic graph illustrating an iso-luminance field-of-view polar plot for the display apparatus of FIG. 28A.

FIG. 28C is a schematic graph illustrating an iso-luminance field-of-view polar plot for the display apparatus of FIG. 28A. Thus a narrow output light cone may be provided, with size determined by the structures of the structures 904, 912 and the turning film 926.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal retarder 300 and additional polariser 318 as illustrated in FIG. 28A. Advantageously a high performance privacy display with low off-axis luminance may be provided over a wide field of view.

Directional backlights such as the types described in FIG. 27A and FIG. 28A together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a wide angle mode by means of control of the switchable retarder 301 by means of control system 352 illustrated in FIG. 1A.

The operation of retarder layers between parallel polarisers for off-axis illumination will now be described further. In the various devices described above, retarders are arranged between a pair of polarisers (typically the additional polariser 318 and one of the input polariser 210 and output polariser 218) in various different configurations. In each case, the retarders are configured so that they not affect the luminance of light passing through the pair of polarisers and the plural retarders along an axis along a normal to the plane of the retarders but they do reduce the luminance of light passing through the pair of polarisers and the plural retarders along an axis inclined to a normal to the plane of the retarders, at least in one of the switchable states of the compensated switchable retarder 300. There will now be given a description of this effect in more detail, the principles of which may be applied in general to all of the devices described above.

Figure 29A:
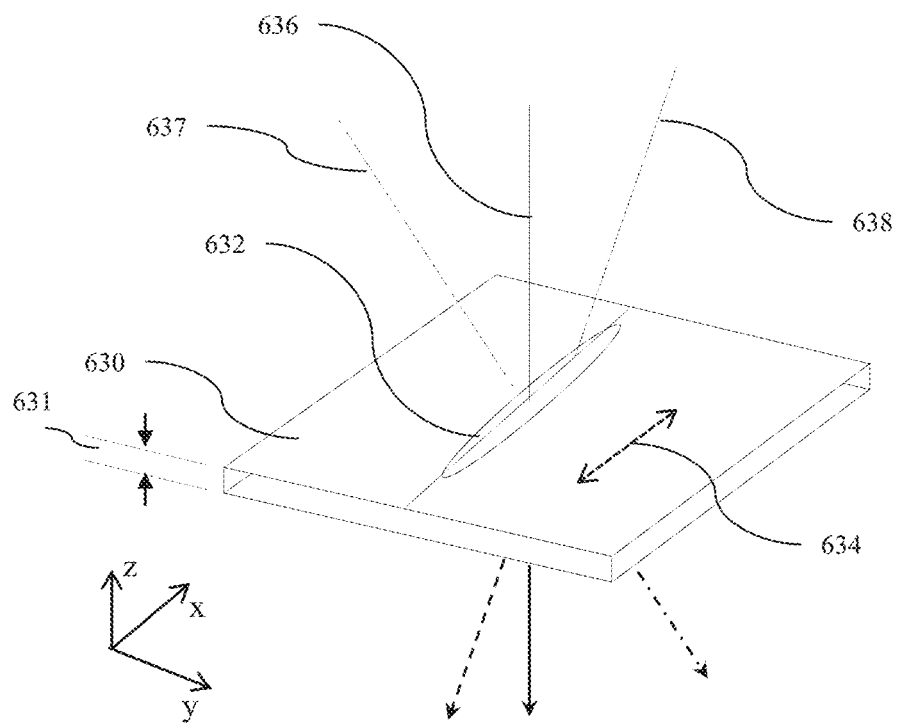
FIG. 29A is a schematic diagram illustrating in perspective view illumination of a retarder layer by off-axis light.

FIG. 29A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 29B:
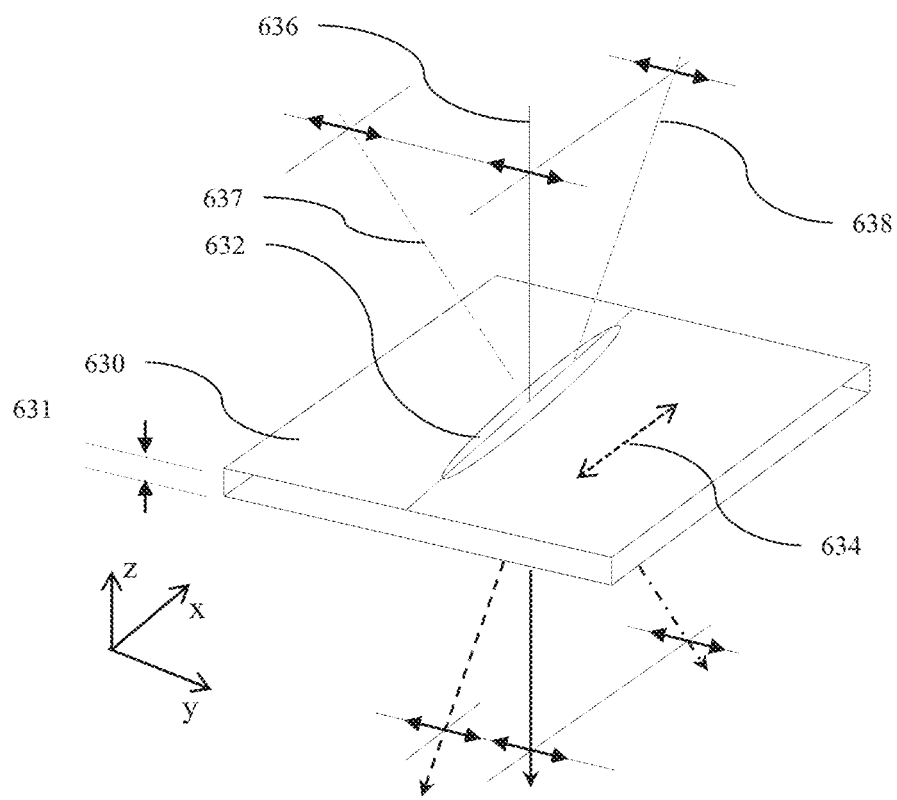
FIG. 29B is a schematic diagram illustrating in perspective view illumination of a retarder layer by off-axis light of a first linear polarization state at 0 degrees.
Figure 29C:
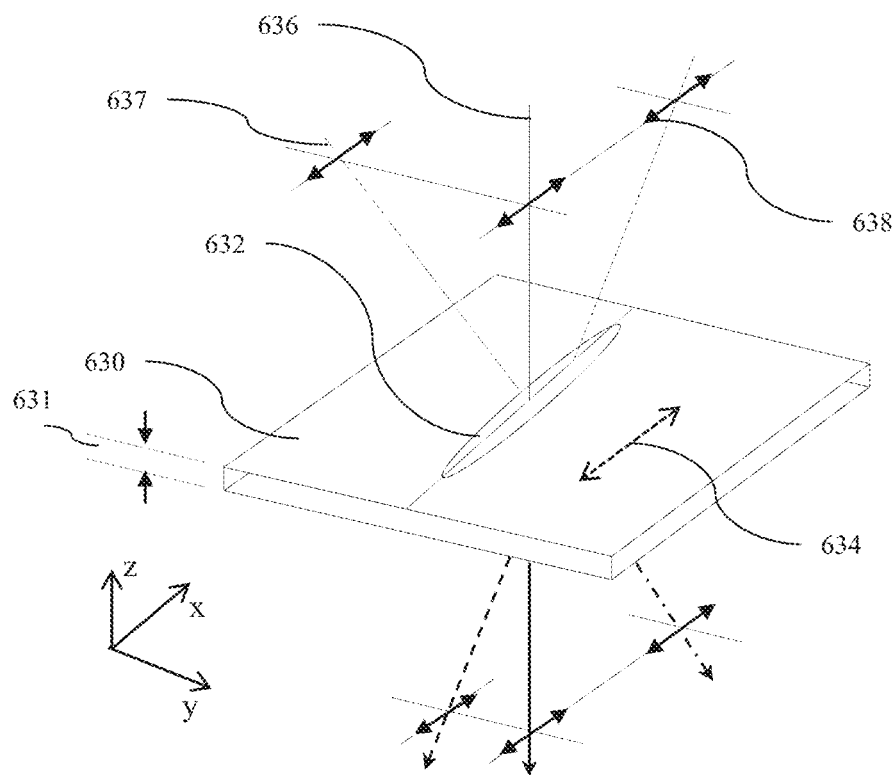
FIG. 29C is a schematic diagram illustrating in perspective view illumination of a retarder layer by off-axis light of a first linear polarization state at 90 degrees.

FIG. 29B is a schematic diagram illustrating in perspective view illumination of a retarder layer by off-axis light of a third linear polarization state at 90 degrees to the x-axis and FIG. 29C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by a switchable liquid crystal retarder and by plural retarders in the devices described above.

Figure 29D:
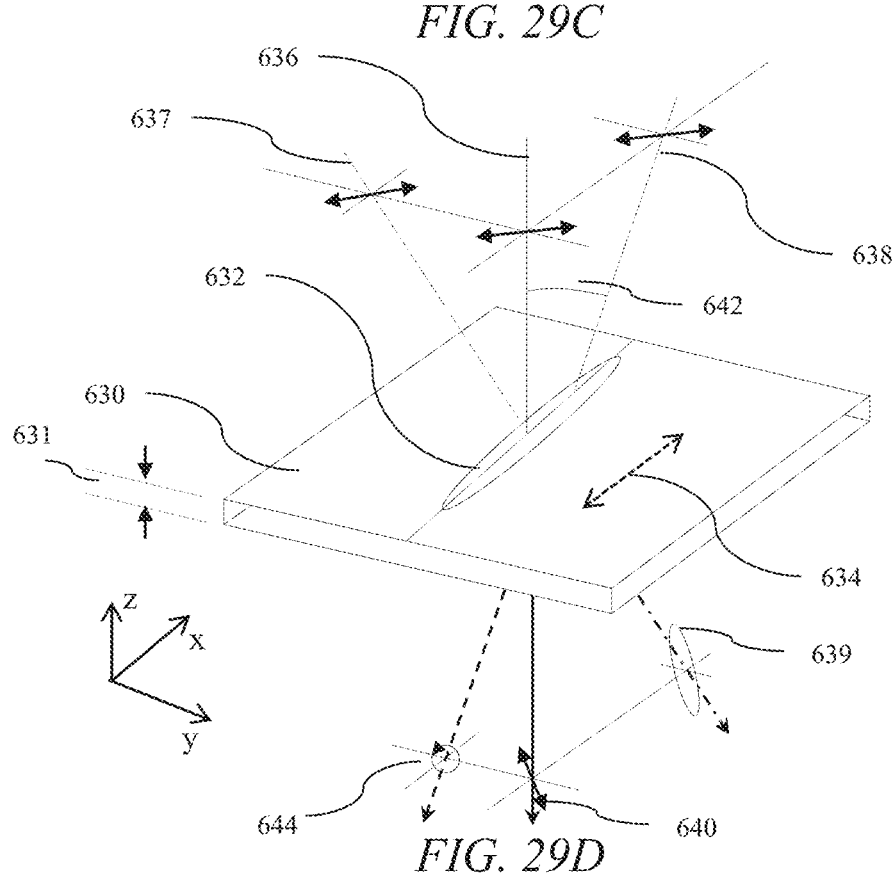
FIG. 29D is a schematic diagram illustrating in perspective view illumination of a retarder layer by off-axis light of a first linear polarization state at 45 degrees.

FIG. 29D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29D relates to the retarder 630 that is passive, a similar effect is achieved by a switchable liquid crystal retarder, and in the plural retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate 560 between the parallel polarisers 500, 210.

Figure 30A:
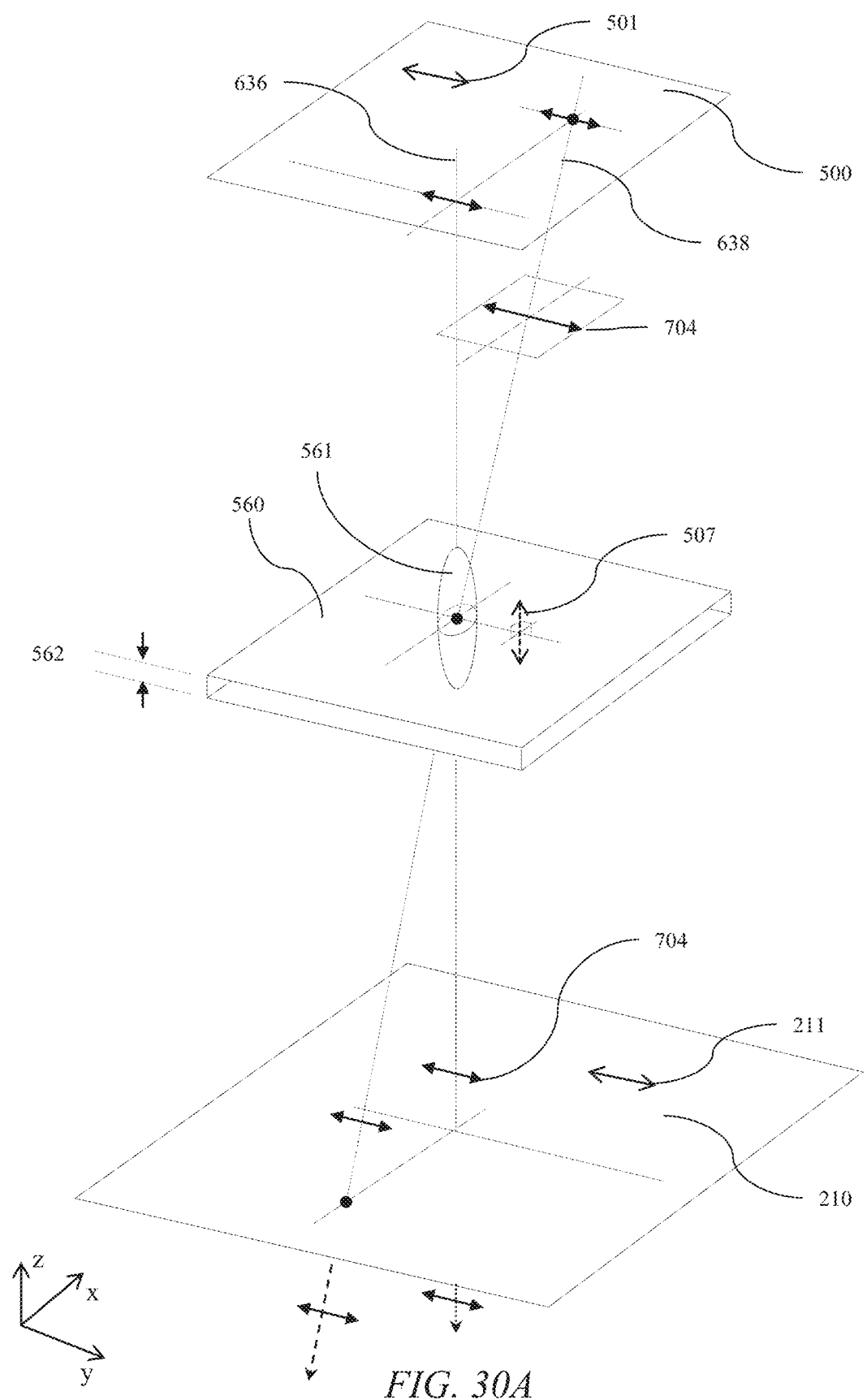
FIG. 30A is a schematic diagram illustrating in perspective view illumination of a C-plate retarder by off-axis polarised light with a positive elevation.

FIG. 30A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder comprises a retarder 560 having an optical axis 561 perpendicular to the plane of the retarder 560, that is the x-y plane. The retarder 560 having an optical axis perpendicular to the plane of the retarder comprises a C-plate.

Figure 30B:
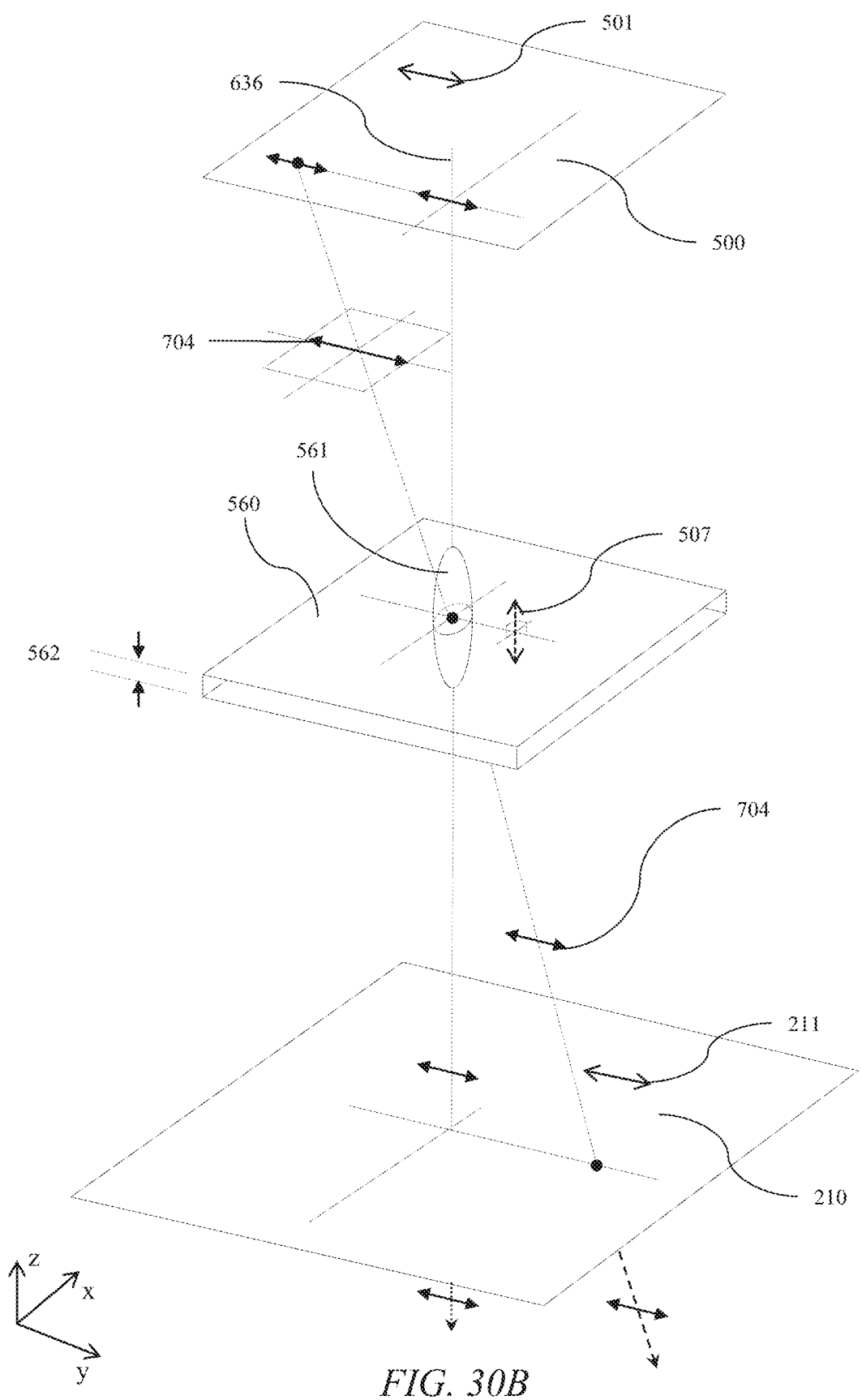
FIG. 30B is a schematic diagram illustrating in perspective view illumination of a C-plate retarder by off-axis polarised light with a negative lateral angle.

FIG. 30B is a schematic diagram illustrating in perspective view illumination of a C-plate layer by off-axis polarised light with a negative lateral angle. As with the arrangement of FIG. 30A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by a switchable liquid crystal retarder and by plural retarders in the devices described above.

Figure 30C:
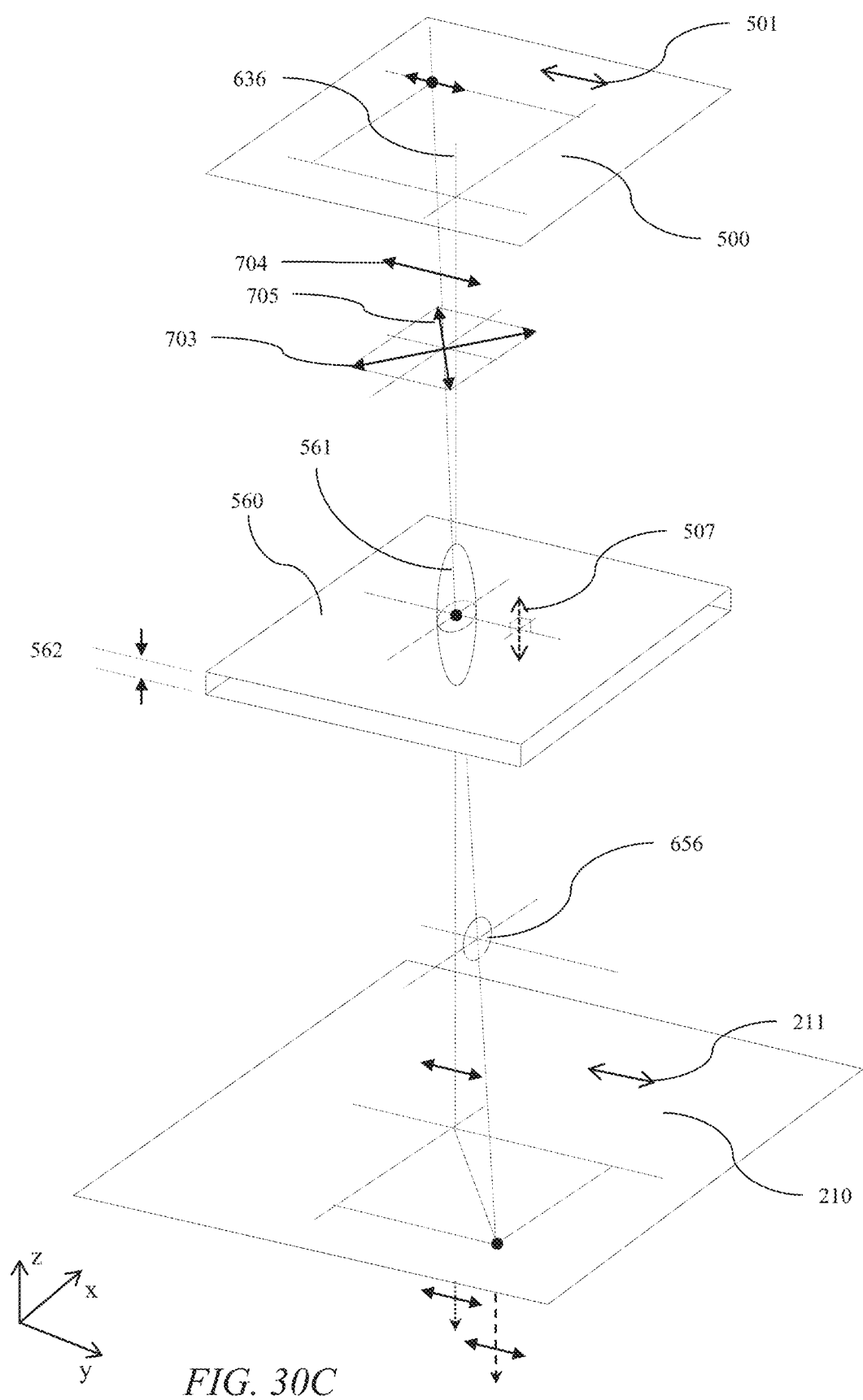
FIG. 30C is a schematic diagram illustrating in perspective view illumination of a C-plate retarder by off-axis polarised light with a positive elevation and negative lateral angle.

FIG. 30C is a schematic diagram illustrating in perspective view illumination of a C-plate layer by off-axis polarised light with a positive elevation and negative lateral angle. In comparison to the arrangement of FIGS. 30A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 30A-B.

Figure 30D:
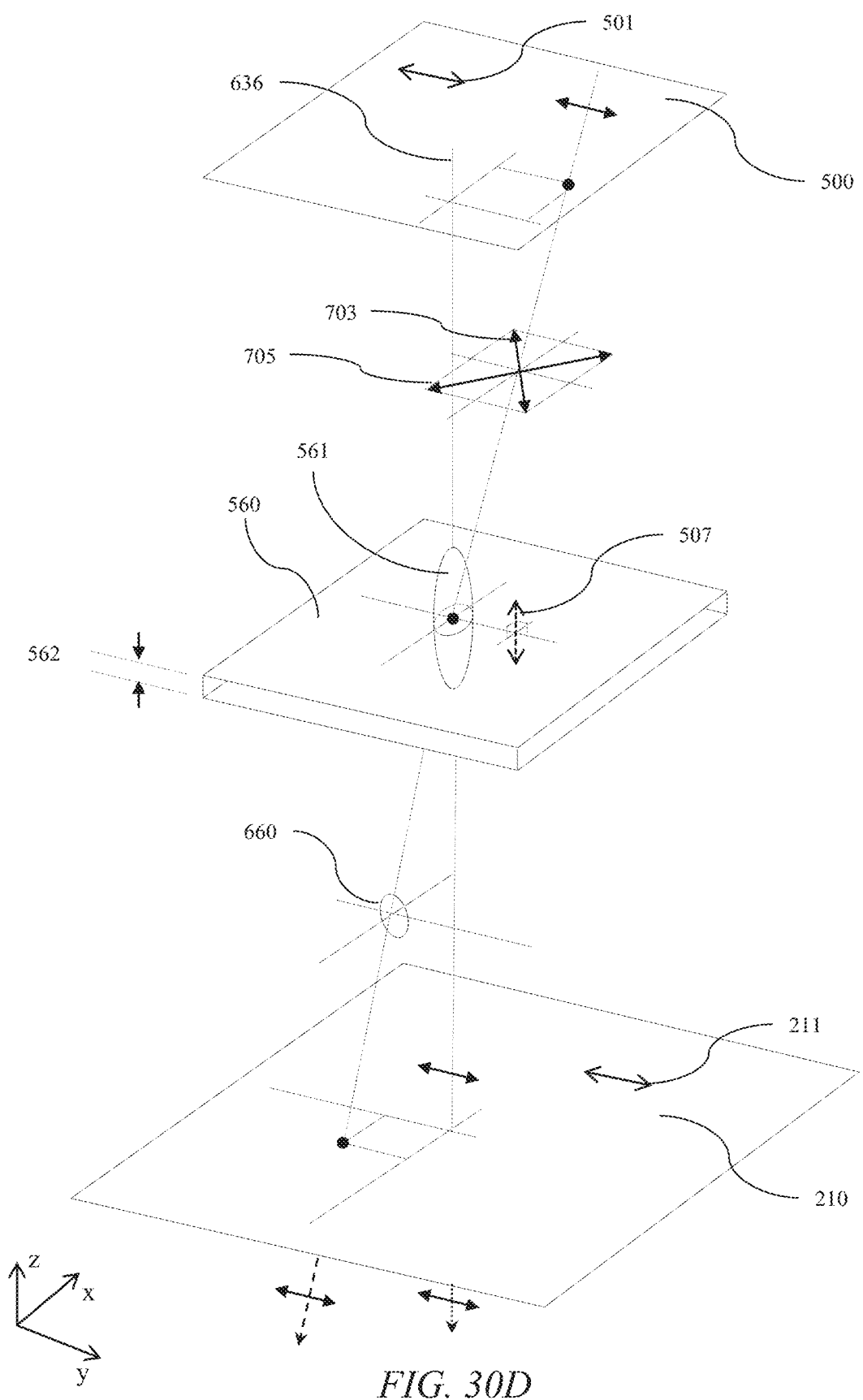
FIG. 30D is a schematic diagram illustrating in perspective view illumination of a C-plate retarder by off-axis polarised light with a positive elevation and positive lateral angle.

FIG. 30D is a schematic diagram illustrating in perspective view illumination of a C-plate layer by off-axis polarised light with a positive elevation and positive lateral angle. In a similar manner to FIG. 30C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29D relates to the retarder 560 that is passive, a similar effect is achieved by a switchable liquid crystal retarder, and in the plural retarders described above, in a switchable state of the switchable liquid crystal retarder corresponding to the privacy mode.

Figure 30E:
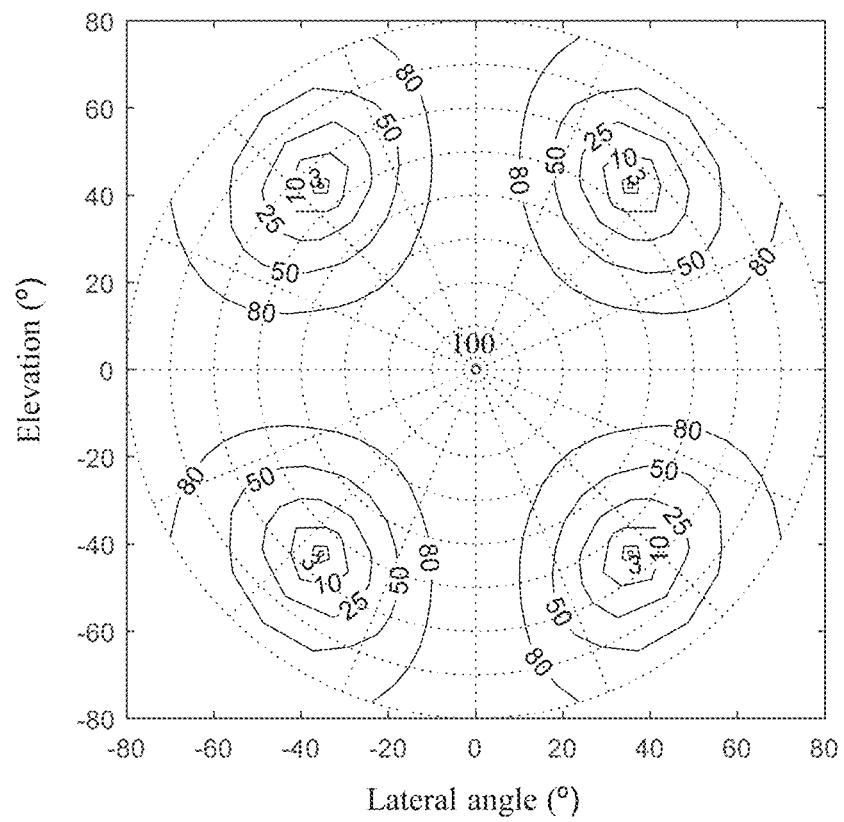
FIG. 30E is a schematic graph illustrating the variation of output transmission with polar direction for transmitted light rays in FIGS. 30A-D.

FIG. 30E is a schematic graph illustrating the variation of output transmission with polar direction for transmitted light rays in FIGS. 30A-D. Thus, the C-plate may provide luminance reduction in polar quadrants. In combination with switchable guest-host liquid crystal retarder 301 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 which is a linear polariser, will now be described for various off-axis illumination arrangements.

Figure 31A:
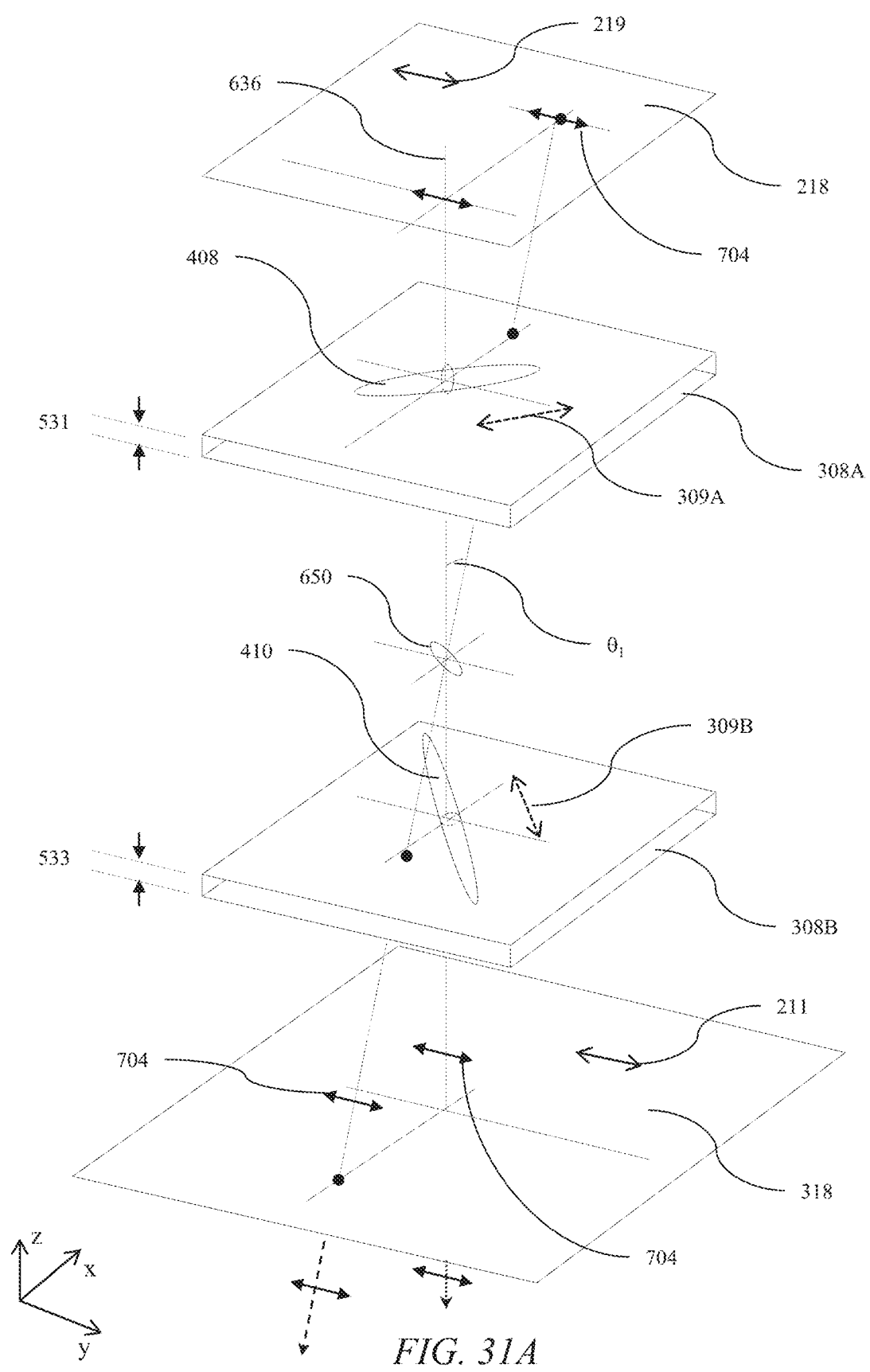
FIG. 31A is a schematic diagram illustrating in perspective view illumination of crossed A-plate retarder layers by off-axis polarised light with a positive elevation.

FIG. 31A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 31A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 31B:
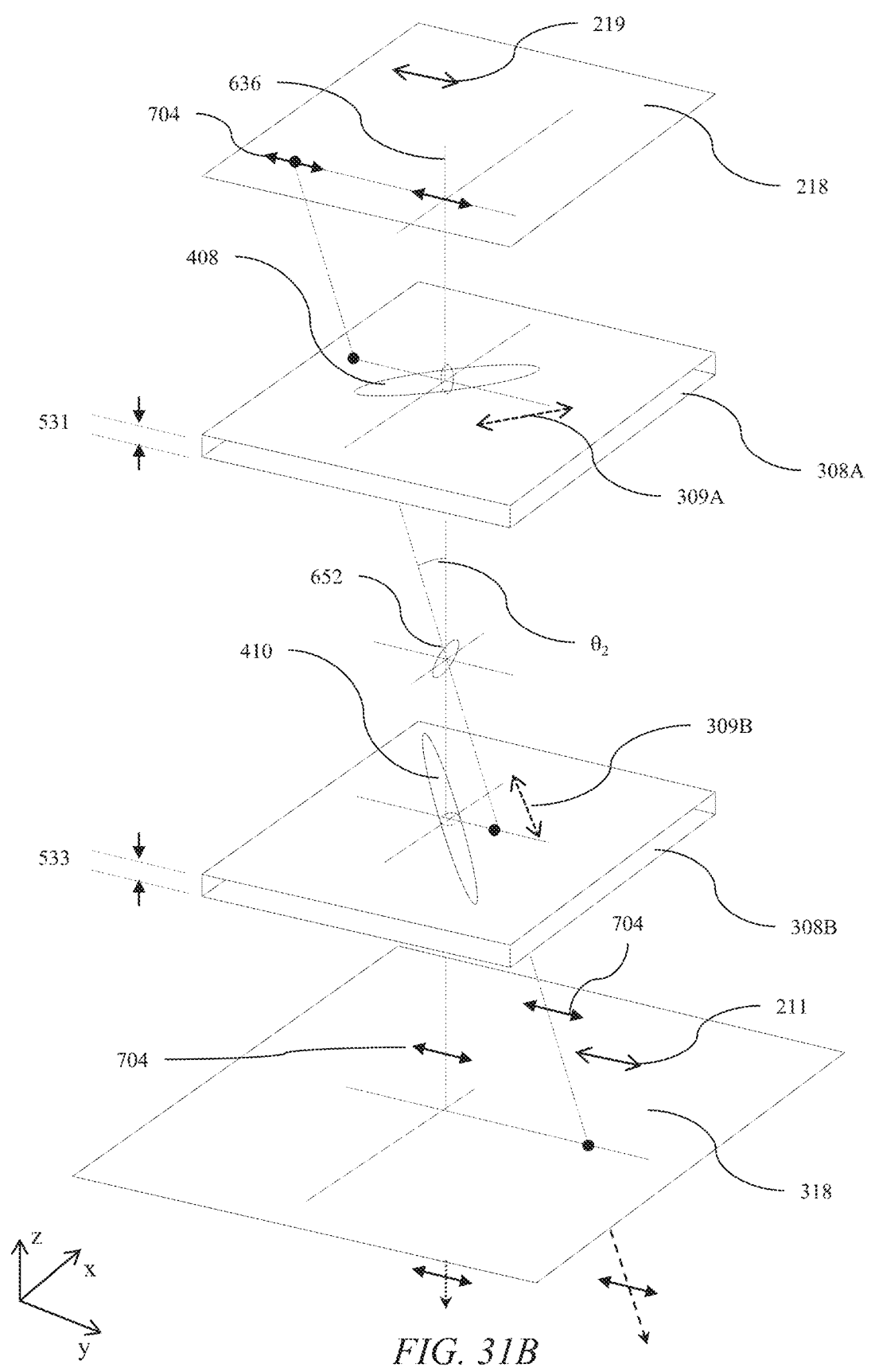
FIG. 31B is a schematic diagram illustrating in perspective view illumination of crossed A-plate retarder layers by off-axis polarised light with a negative lateral angle.

FIG. 31B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 31C:
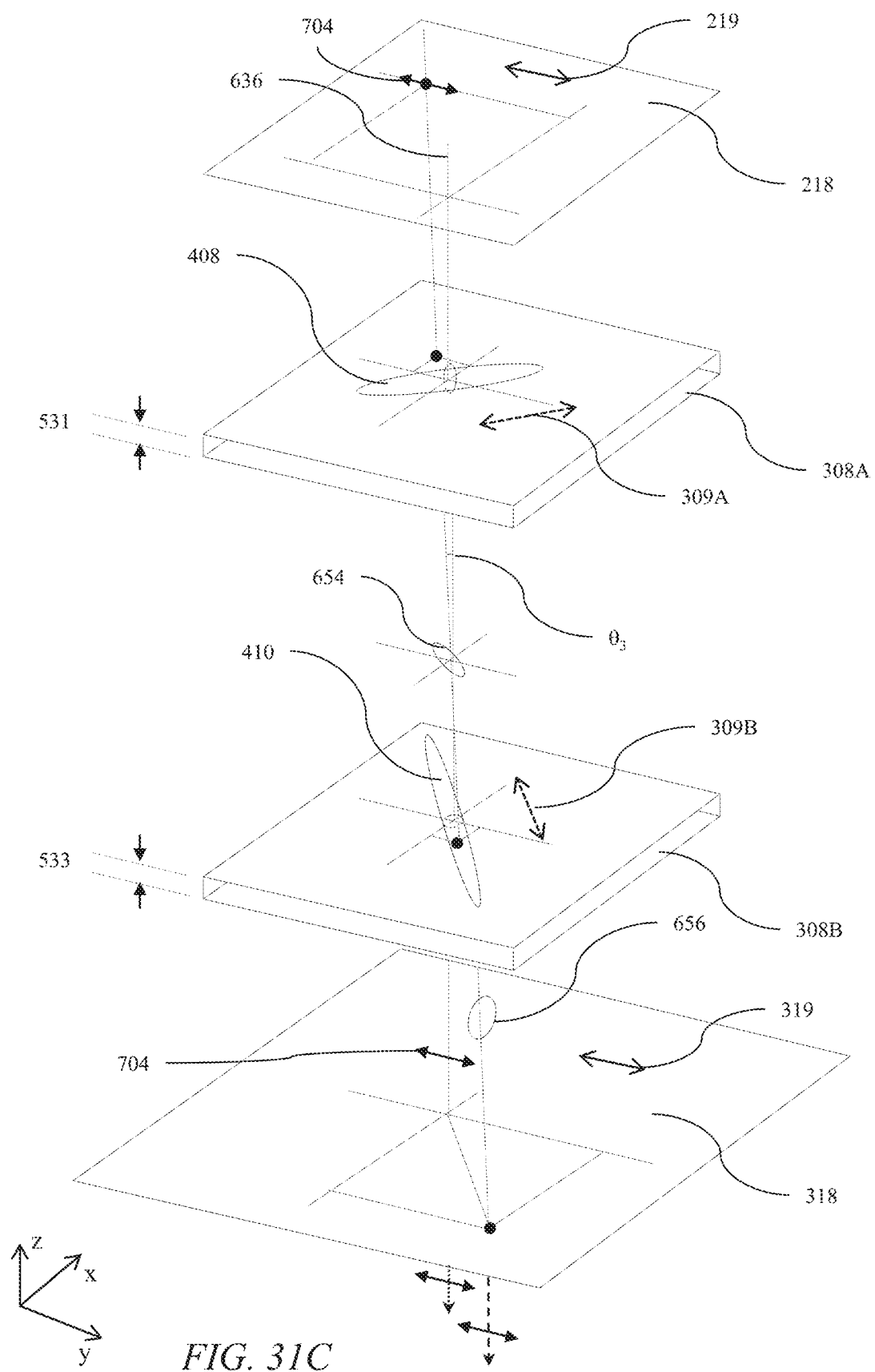
FIG. 31C is a schematic diagram illustrating in perspective view illumination of crossed A-plate retarder layers by off-axis polarised light with a positive elevation and negative lateral angle.

FIG. 31C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 31D:
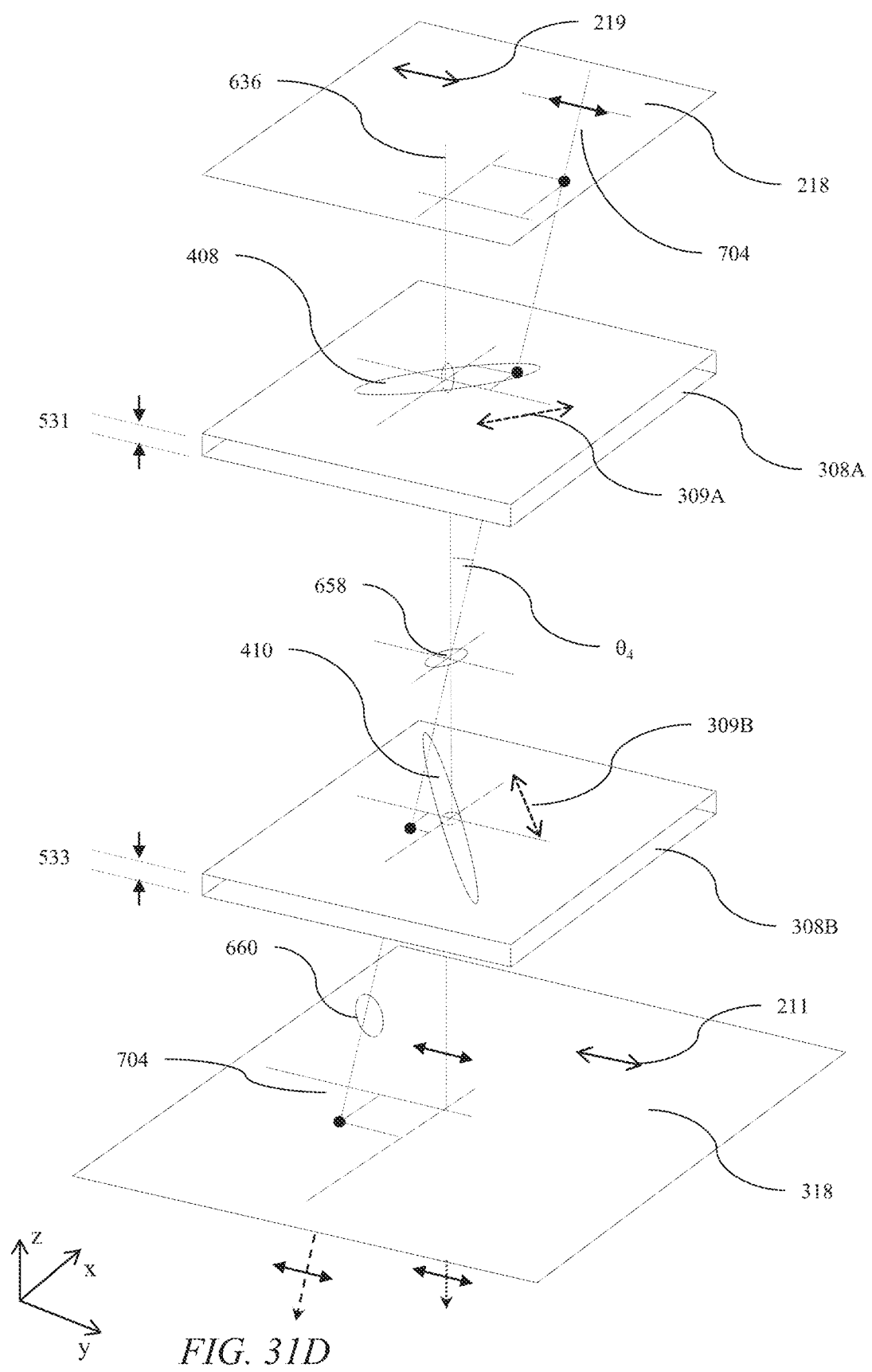
FIG. 31D is a schematic diagram illustrating in perspective view illumination of crossed A-plate retarder layers by off-axis polarised light with a positive elevation and positive lateral angle.

FIG. 31D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 31E:
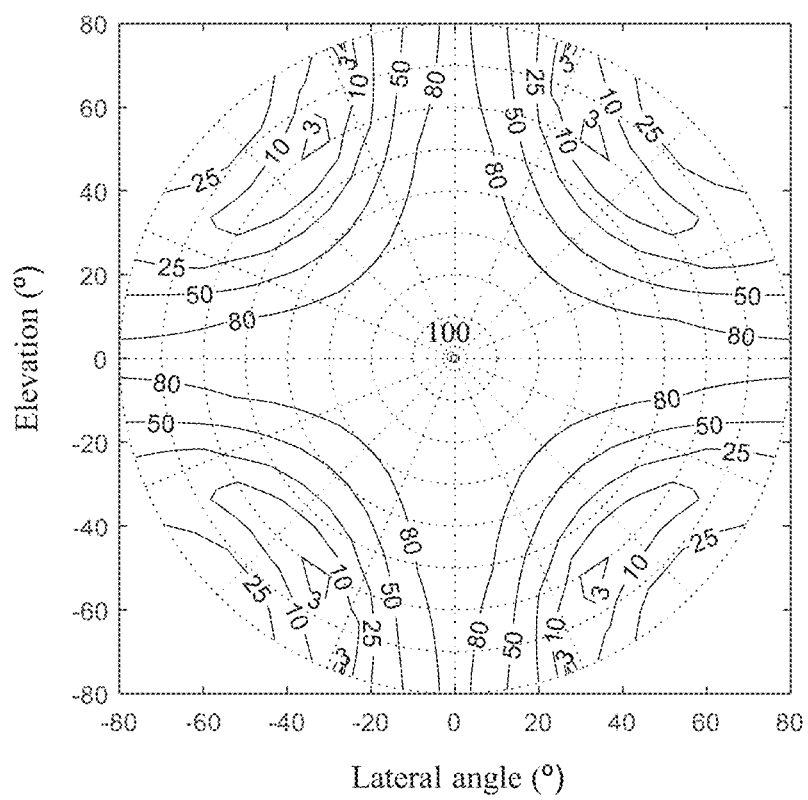
FIG. 31E is a schematic graph illustrating the variation of output transmission with polar direction for transmitted light rays in FIGS. 31A-D.

FIG. 31E is a schematic graph illustrating the variation of output transmission with polar direction for transmitted light rays in FIGS. 31A-D. In comparison to the arrangement of FIG. 30E, the area of luminance reduction is increased for off-axis viewing. However, the switchable guest-host liquid crystal retarder 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure.

Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
a spatial light modulator comprising a layer of addressable pixels;
a backlight arranged to output light, wherein the spatial light modulator is a transmissive spatial light modulator arranged to receive output light from the backlight;
a display polariser arranged on a side of the spatial light modulator, the display polariser being a linear polariser;
a guest-host liquid crystal retarder comprising a liquid crystal layer comprising a guest material and a host material, wherein the guest material is an anisotropic material and the host material is a liquid crystal material, the guest-host liquid crystal retarder being arranged on the same side of the spatial light modulator as the display polariser with the display polariser arranged between the guest-host liquid crystal retarder and the spatial light modulator; and
at least one passive retarder arranged between the display polariser and the guest-host liquid crystal retarder;
wherein the optical axis of the guest-host liquid crystal retarder has an alignment component perpendicular to the plane of the guest-host liquid crystal retarder in at least a state of the host material, and
wherein the backlight provides a luminance at polar angles to the normal to the spatial light modulator greater than 45 degrees that is at most 33% of the luminance along the normal to the spatial light modulator.

2. A display device according to claim 1, wherein the anisotropic material is an anisotropic absorber.

3. A display device according to claim 2, wherein the anisotropic material is a dichroic dye or a pleochroic dye.

4. A display device according to claim 1, wherein the anisotropic material comprises anisotropic metallic nanomaterial.

5. A display device according to claim 4, wherein the anisotropic metallic nanomaterial has a transparent electrically insulating surface layer.

6. A display device according to claim 1, wherein the volume of the guest material is less than 3% of the volume of the host material.

7. A display device according to claim 1, wherein the weight of the guest material is less than 3% of the weight of the host material.

8. A display device according to claim 1, comprising:
a spatial light modulator comprising a layer of addressable pixels;
a display polariser arranged on a side of the spatial light modulator, the display polariser being a linear polariser;
a guest-host liquid crystal retarder comprising a liquid crystal layer comprising a guest material and a host material, wherein the guest material is an anisotropic material and the host material is a liquid crystal material, the guest-host liquid crystal retarder being arranged on the same side of the spatial light modulator as the display polariser with the display polariser arranged between the guest-host liquid crystal retarder and the spatial light modulator; and at least one passive retarder arranged between the display polariser and the guest-host liquid crystal retarder;

wherein the optical axis of the guest-host liquid crystal retarder has an alignment component perpendicular to the plane of the guest-host liquid crystal retarder in at least a state of the host material, and wherein the guest material comprises a positive dichroic material or a positive pleochroic material and the optical axis of the guest-host liquid crystal retarder has an alignment component in the plane of the guest-host liquid crystal retarder that is orthogonal to the electric vector transmission direction of the display polariser.

9. A display device comprising:

a spatial light modulator comprising a layer of addressable pixels;

a display polariser arranged on a side of the spatial light modulator, the display polariser being a linear polariser;

a guest-host liquid crystal retarder comprising a liquid crystal layer comprising a guest material and a host material, wherein the guest material is an anisotropic material and the host material is a liquid crystal material, the guest-host liquid crystal retarder being arranged on the same side of the spatial light modulator as the display polariser with the display polariser arranged between the guest-host liquid crystal retarder and the spatial light modulator; and at least one passive retarder arranged between the display polariser and the guest-host liquid crystal retarder;

wherein the optical axis of the guest-host liquid crystal retarder has an alignment component perpendicular to the plane of the guest-host liquid crystal retarder in at least a state of the host material, and wherein the on-axis extinction coefficient of the guest-host liquid crystal retarder in at least one mode of operation is at least 60%.

10. A display device according to claim 1, wherein the guest material comprises liquid crystal material that is cured.

11. A display device comprising:

a spatial light modulator comprising a layer of addressable pixels;

a display polariser arranged on a side of the spatial light modulator, the display polariser being a linear polariser;

a guest-host liquid crystal retarder comprising a liquid crystal layer comprising a guest material and a host material, wherein the guest material is an anisotropic material and the host material is a liquid crystal material, the guest-host liquid crystal retarder being arranged on the same side of the spatial light modulator as the display polariser with the display polariser arranged between the guest-host liquid crystal retarder and the spatial light modulator; and at least one passive retarder arranged between the display polariser and the guest-host liquid crystal retarder;

wherein the optical axis of the guest-host liquid crystal retarder has an alignment component perpendicular to the plane of the guest-host liquid crystal retarder in at least a state of the host material, and further comprising an additional polariser that is a linear polariser and is arranged on the same side of the spatial light modulator as the display polariser with the guest-host liquid crystal retarder arranged between the display polariser and the additional polariser.

12. A display device according to claim 11, wherein the display polariser and the additional polariser have electric vector transmission directions that are parallel.

13. A display device according to claim 11, further comprising at least one passive retarder arranged between the guest-host liquid crystal retarder and the additional polariser.

14. A display device according to claim 1, wherein the guest-host liquid crystal retarder is a switchable liquid crystal retarder further comprising transparent electrodes arranged to apply a voltage capable of switching host material between at least two states, in one of which states the optical axis of the guest-host liquid crystal retarder has an alignment component perpendicular to the plane of the guest-host liquid crystal retarder.

15. A display device according to claim 14, further comprising a control system arranged to control the voltage applied across the electrodes of the at least one switchable liquid crystal retarder.

16. A display device according to claim 1, wherein the display polariser is an input display polariser arranged on the input side of the spatial light modulator between the backlight and the spatial light modulator, and the guest-host liquid crystal retarder is arranged between the input display polariser and the backlight.

17. A display device according to claim 1, wherein the display polariser is an output polariser arranged on the output side of the spatial light modulator.

18. A display device according to claim 1, wherein the at least one passive retarder has its optical axis perpendicular to the plane of the guest-host liquid crystal retarder.

19. A display device according to claim 8, wherein the anisotropic material is an anisotropic absorber.

20. A display device according to claim 19, wherein the anisotropic material is a dichroic dye or a pleochroic dye.

21. A display device according to claim 8, wherein the anisotropic material comprises anisotropic metallic nanomaterial.

22. A display device according to claim 21, wherein the anisotropic metallic nanomaterial has a transparent electrically insulating surface layer.

23. A display device according to claim 8, wherein the volume of the guest material is less than 3% of the volume of the host material.

24. A display device according to claim 8, wherein the weight of the guest material is less than 3% of the weight of the host material.

25. A display device according to claim 8, wherein the display polariser is an output polariser arranged on the output side of the spatial light modulator.

26. A display device according to claim 8, wherein the spatial light modulator comprises an emissive spatial light modulator arranged to output light and the display polariser is an output display polariser arranged on the output side of the emissive spatial light modulator.

27. A display device according to claim 8, wherein the at least one passive retarder has its optical axis perpendicular to the plane of the guest-host liquid crystal retarder.

28. A display device according to claim 9, wherein the anisotropic material is an anisotropic absorber.

29. A display device according to claim 28, wherein the anisotropic material is a dichroic dye or a pleochroic dye.

30. A display device according to claim 9, wherein the anisotropic material comprises anisotropic metallic nanomaterial.

31. A display device according to claim 30, wherein the anisotropic metallic nanomaterial has a transparent electrically insulating surface layer.

32. A display device according to claim 9, wherein the volume of the guest material is less than 3% of the volume of the host material.

33. A display device according to claim 9, wherein the weight of the guest material is less than 3% of the weight of the host material.

34. A display device according to claim 9, wherein the guest material comprises liquid crystal material that is cured.

35. A display device according to claim 9, wherein the guest-host liquid crystal retarder is a switchable liquid crystal retarder further comprising transparent electrodes arranged to apply a voltage capable of switching host material between at least two states, in one of which states the optical axis of the guest-host liquid crystal retarder has an alignment component perpendicular to the plane of the guest-host liquid crystal retarder.

36. A display device according to claim 35, further comprising a control system arranged to control the voltage applied across the electrodes of the at least one switchable liquid crystal retarder.

37. A display device according to claim 9, wherein the display polariser is an output polariser arranged on the output side of the spatial light modulator.

38. A display device according to claim 9, wherein the spatial light modulator comprises an emissive spatial light modulator arranged to output light and the display polariser is an output display polariser arranged on the output side of the emissive spatial light modulator.

39. A display device according to claim 9, wherein the at least one passive retarder has its optical axis perpendicular to the plane of the guest-host liquid crystal retarder.

40. A display device according to claim 11, wherein the anisotropic material is an anisotropic absorber.

41. A display device according to claim 40, wherein the anisotropic material is a dichroic dye or a pleochroic dye.

42. A display device according to claim 11, wherein the anisotropic material comprises anisotropic metallic nanomaterial.

43. A display device according to claim 42, wherein the anisotropic metallic nanomaterial has a transparent electrically insulating surface layer.

44. A display device according to claim 11, wherein the volume of the guest material is less than 3% of the volume of the host material.

45. A display device according to claim 11, wherein the weight of the guest material is less than 3% of the weight of the host material.

46. A display device according to claim 11, wherein the guest material comprises liquid crystal material that is cured.

47. A display device according to claim 11, wherein the guest-host liquid crystal retarder is a switchable liquid crystal retarder further comprising transparent electrodes arranged to apply a voltage capable of switching host material between at least two states, in one of which states the optical axis of the guest-host liquid crystal retarder has an alignment component perpendicular to the plane of the guest-host liquid crystal retarder.

48. A display device according to claim 47, further comprising a control system arranged to control the voltage applied across the electrodes of the at least one switchable liquid crystal retarder.

49. A display device according to claim 11, wherein the at least one passive retarder has its optical axis perpendicular to the plane of the guest-host liquid crystal retarder.

* * * * *

UNITED STATES PATENT AND TRADEMARK OFFICE
CERTIFICATE OF CORRECTION

PATENT NO. : 11,747,693 B2
APPLICATION NO. : 17/352520
DATED : September 5, 2023
INVENTOR(S) : Harrold et al.

It is certified that error appears in the above-identified patent and that said Letters Patent is hereby corrected as shown below:

In the Claims

Claim 8, should read:
A display device comprising:
    a spatial light modulator comprising a layer of addressable pixels;
    a display polariser arranged on a side of the spatial light modulator, the display polariser being a linear polariser;
    a guest-host liquid crystal retarder comprising a liquid crystal layer comprising a guest material and a host material, wherein the guest material is an anisotropic material and the host material is a liquid crystal material, the guest-host liquid crystal retarder being arranged on the same side of the spatial light modulator as the display polariser with the display polariser arranged between the guest-host liquid crystal retarder and the spatial light modulator; and
    at least one passive retarder arranged between the display polariser and the guest-host liquid crystal retarder;
    wherein the optical axis of the guest-host liquid crystal retarder has an alignment component perpendicular to the plane of the guest-host liquid crystal retarder in at least a state of the host material, and
    wherein the guest material comprises a positive dichroic material or a positive pleochroic material and the optical axis of the guest-host liquid crystal retarder has an alignment component in the plane of the guest-host liquid crystal retarder that is orthogonal to the electric vector transmission direction of the display polariser.

Signed and Sealed this
Twelfth Day of December, 2023

*Katherine Kelly Vidal*
Katherine Kelly Vidal
*Director of the United States Patent and Trademark Office*